United States Patent [19]

Miki et al.

[11] Patent Number: 4,720,790
[45] Date of Patent: Jan. 19, 1988

[54] APPARATUS FOR CONTROLLING STEER ANGLE OF REAR WHEELS OF VEHICLE

[75] Inventors: Kazuo Miki, Aichi; Kazumasa Sumi; Katsuhiko Fukui, both of Nagoya; Yasutaka Hayashi, Seto; Michio Ishiguro, Toyota, all of Japan

[73] Assignee: Kabushiki Kaisha Toyota Chuo Kenkyusho, Aichi, Japan

[21] Appl. No.: 734,332

[22] Filed: May 15, 1985

[30] Foreign Application Priority Data

May 21, 1984 [JP] Japan .................. 59-102202
Aug. 2, 1984 [JP] Japan .................. 59-163428

[51] Int. Cl.⁴ .................................. B62D 5/06
[52] U.S. Cl. .................... 364/424; 180/140; 180/142; 280/91
[58] Field of Search ............. 364/559, 424, 426; 180/140, 142, 143, 79.1; 280/91

[56] References Cited

U.S. PATENT DOCUMENTS

| | | | |
|---|---|---|---|
| 4,418,780 | 12/1983 | Ito et al. | 180/142 |
| 4,441,572 | 4/1984 | Ito et al. | 180/140 |
| 4,522,417 | 6/1985 | Sano et al. | 280/91 |
| 4,527,654 | 7/1985 | Shibahata et al. | 180/140 |
| 4,552,239 | 11/1985 | Kanazawa et al. | 180/140 |
| 4,566,710 | 1/1986 | Furukawa et al. | 180/140 X |
| 4,572,316 | 2/1986 | Kanazawa et al. | 180/143 |
| 4,597,462 | 7/1986 | Sano et al. | 180/140 |
| 4,598,788 | 7/1986 | Serizawa et al. | 180/140 |

FOREIGN PATENT DOCUMENTS 0150858 8/1985 European Pat. Off. .
0165706 12/1985 European Pat. Off. .
0044568 3/1982 Japan ................... 180/140

Primary Examiner—Parshotam S. Lall
Assistant Examiner—Thomas G. Black
Attorney, Agent, or Firm—Parkhurst & Oliff

[57] ABSTRACT

A rear wheel steer angle controlling apparatus for vehicles having steerable front and rear wheels, adapted for controlling the steer angle of rear wheels in response to the operation of the steering wheel for steering the front wheels. When the steering wheel is operated quickly, a rear wheel steer angle is formed in the counter direction to the direction of the front wheel steer angle, so that the response to the steering input for turning the vehicle is improved. Conversely, when the steering wheel is operated slowly, a rear wheel steer angle is formed in the same direction as the front wheel steer angle, thus enhancing the stability of the vehicle running straight. When the vehicle is running at a high speed, the rear wheel steer angle is formed always in the same direction as the front wheel steer angle regardless of the speed of operation of the steering wheel, so that the steering stability during high speed running is improved. When a yawing moment is generated due to a disturbance such as lateral wind, the rear wheel steer angle is automatically controlled in such a manner as to negate the yawing moment, thus compensating for the lateral displacement of the vehicle without requiring correcting steering operation by the driver.

35 Claims, 39 Drawing Figures

F I G. 3
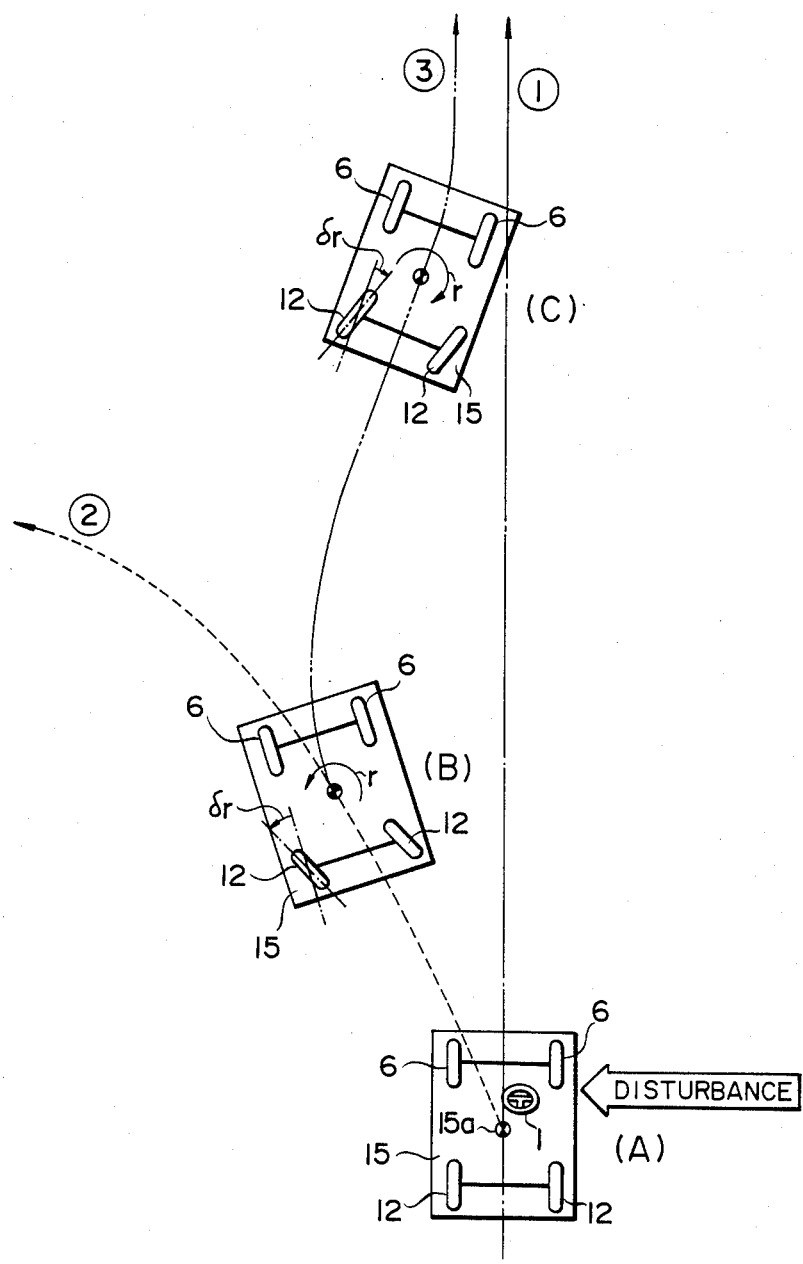

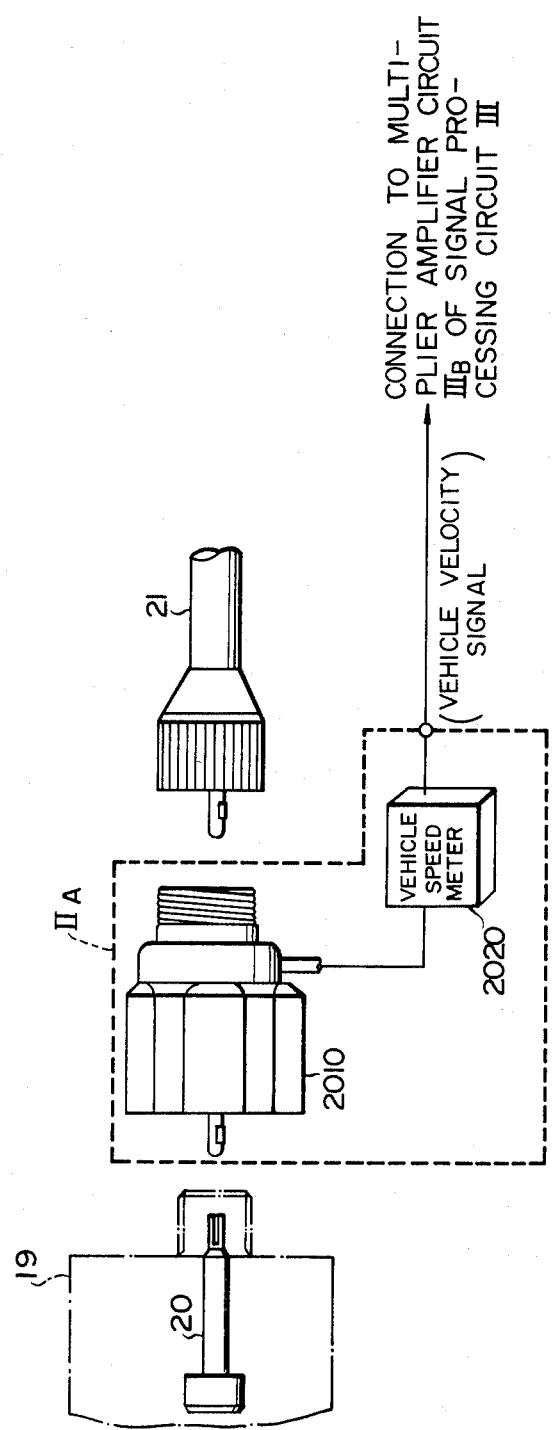

CONNECTION TO MULTIPLIER AMPLI-
FIER CIRCUIT IIIB OF
SIGNAL PROCESSING
CIRCUIT III

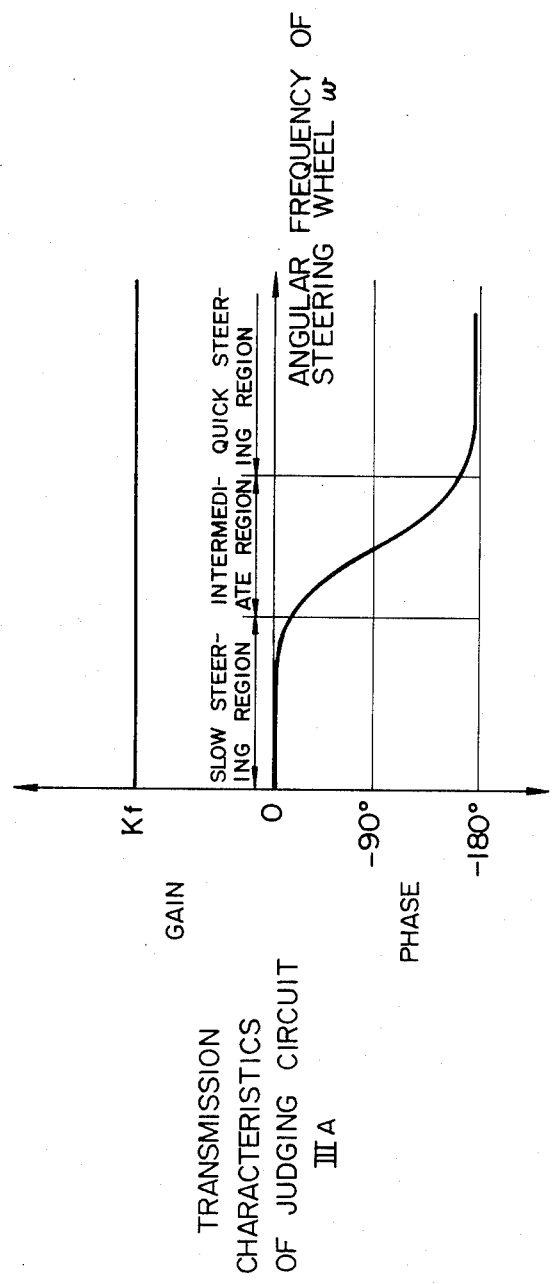

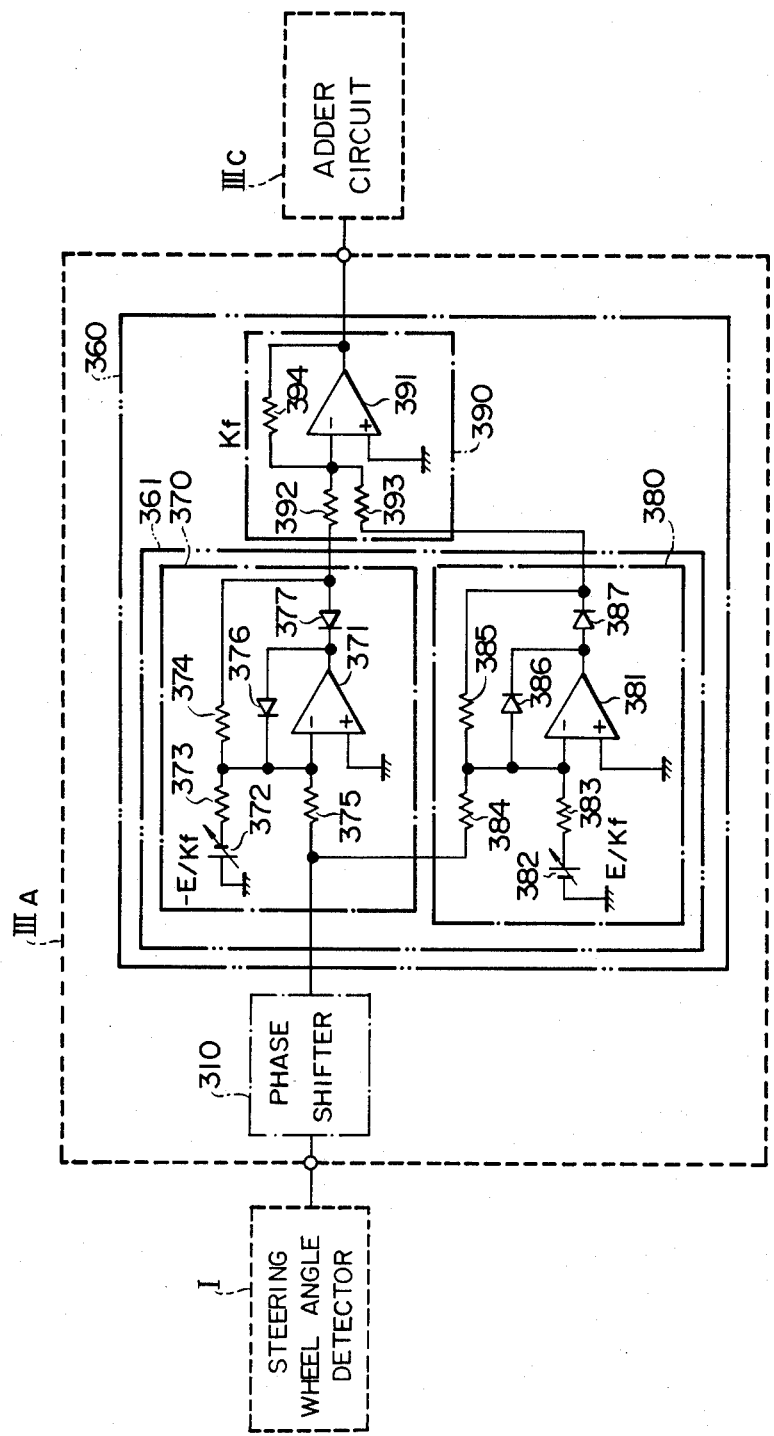

F I G. 22B
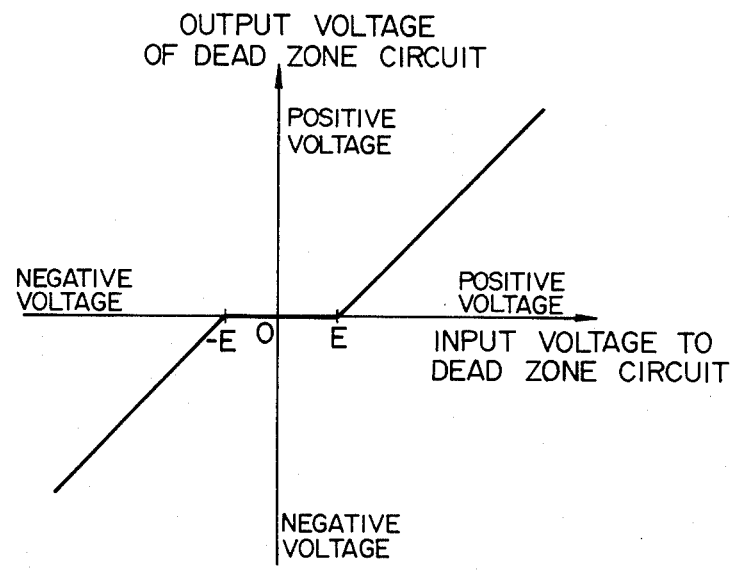

APPARATUS FOR CONTROLLING STEER ANGLE OF REAR WHEELS OF VEHICLE

BACKGROUND OF THE INVENTION

1. Field of the Invention

The present invention broadly relates to a vehicle having steerable front and rear wheels (this type of vehicle will be referred to as "4-wheel steering vehicle", hereinunder) and, more particularly, to an apparatus for automatically controlling the steer angle of the rear wheels in such a 4-wheel steering vehicle in response to the operation of a steering wheel for controlling the steer angle of front wheels.

2. Description of the Related Art

An apparatus for controlling the steer angle of rear wheels in a 4-wheel steering vehicle, on which the present invention is based, is disclosed in Japanese Patent laid-Open No. 44568/1982. This known apparatus will be explained hereinunder with specific reference to FIG. 1.

A rotation of a steering wheel 1 caused by the driver is transmitted through a shaft 2 to a gear box 3 and is converted into a linear motion of a linkage 4. The linear motion of the linkage 4 causes a rotation of knuckle arms 5 about their pivot points 5a, thus generating a steer angle $\delta f(t)$ of the front wheels 6, as a function of time (t). A sensor 16 associated with a shaft 2 senses the angle $\delta h(t)$ of steering rotation of the steering 1, while a sensor 7 senses lateral acceleration $\dot{V}$ generated and acting on the vehicle in response to the rotation of the steering wheel 1 by the angle $\delta h(t)$. Then, a computer 8 operates an actuator 9 in accordance with the signals from the sensors 7, 16, to cause a linear motion of a linkage 14 through a gear box 10. The linear motion of the linkage 14 causes the knuckle arms 13 to rotate about their pivot points 13a, thus generating steer angle $\delta r(t)$ of the rear wheels 12.

The computer 8 determines the rear wheel steer angle $\delta r(t)$ as being proportional to the lateral acceleration $\dot{V}$ in accordance with the following formula (1) or, alternatively, by adding the product $h \cdot \delta f(t)$ of the front wheel steer angle $\delta f(t)$ and a proportional constant h to the right side of the formula (1) as expressed by the formula (2) below.

$$\delta r(t) = K \cdot \dot{V} \quad (1)$$

$$\delta r(t) = h \cdot \delta f(t) + K \cdot \dot{V} \quad (2)$$

This known rear wheel steer angle control apparatus, however, is not designed to respond to the rotation speed or rate of operation of the steering wheel. In addition, the rear wheels are steered in the same direction as the front wheels regardless of the angle of steering rotation of the steering wheel, so that the turning performance, particularly when the vehicle has to turn sharply, is not so high, although the steering stability during straight running is improved appreciably.

In another known apparatus for controlling the rear wheel steer angle in a 4-wheel steering vehicle, a steering gear for controlling the front wheels and a steering gear for controlling the rear wheels are connected mechanically in such a manner that, when the angle of rotation of the steering wheel is rather small, the rear wheels are steered in the same direction as the front wheels, whereas, when the steering wheel rotation angle is rather large, the rear wheels are steered in counter direction to the front wheels.

In this apparatus, although the rear wheels are steered in the same direction as the front wheels or in the counter direction to the front wheels depending on the steering wheel displacement, no consideration is made as to the control of the rear wheel steer angle in response to the rotation speed or rate of operation of the steering wheel by the driver. The driver, when he finds it necessary to quickly steer the vehicle in order to avert an obstacle or to change lanes, operates the steering wheel correspondingly quickly but, when he wishes to steer the vehicle along a gentle curve, he operates the steering wheel correspondingly gently. Thus, the driver expects that the vehicle responds to the rotation speed or rate of operation of the steering wheel. In this known apparatus, however, the rear wheels are steered only in response to the amount of steering wheel displacement so that the vehicle does not delicately respond to the driver's will.

In general, the steer angle of the rear wheels in a 4-wheel steering vehicle employs the concept of the following transfer function G(S).

$$G(s) = \frac{Ke}{1 + TS} \quad (3)$$

where, Ke represents a positive constant, T represents a primary delay time constant and S represents a complex frequency.

The transfer function G(S) takes the value of $G(S) = Ke$ at one limit of $S = 0$ and a value of $G(S) = 0$ at one limit of $S = \infty$. Thus, the controlling apparatus has such a tendency that, when the steering wheel is rotated rather slowly, the rear wheels are steered in the same direction as the front wheels, whereas, when the steering wheel is operated quickly, the rear wheels are not steered at all or steered only by a small angle in the same direction as the front wheels. For this reason, in the known 4-wheel steering vehicle, if the steering wheel is operated slowly, the rear wheels are controlled in the same steering direction as the front wheels thus enhancing the stability during straight running as compared with the conventional vehicle having no facility for the rear wheel steering. However, when the steering wheel is operated quickly, no substantial improvement in the steering effect is produced over the conventional vehicles because the rear wheels are not steered substantially.

Thus, the known 4-wheel steering vehicles and the rear wheel steering angle controller designed on the concept of the transfer function explained in connection with formula (3) do not respond to the rotation speed or rate of operation of the steering wheel, thus failing to meet the driver's request who expects the vehicle to be steered in good response to the speed or rate at which he operates the steering wheel.

Under these circumstances, the present inventors have conducted an experiment to examine and compare the running properties of the following two types of 4-wheel steering vehicles, by operating the steering wheel to a given steering wheel displacement while varying the rotation speed or rate of operation of the steering wheel without changing the running speed and other conditions: namely, a first type vehicle having a rear wheel steer angle controller which is designed to steer the rear wheels always in the same direction as the front wheels, and a second type of vehicle having a rear wheel steer angle controller which is designed to steer the rear wheels always in the counter direction to the front wheels. As a result of the experiment, the present inventors have reached a conclusion that, in order to obtain a good running properties of 4-wheel steering vehicles, it is essential to develop an apparatus for controlling the steer angle of rear wheels, capable of operating in response to the rotation speed or rate of operation of the steering wheel, i.e., angular frequency of displacement of the steering wheel.

The present invention is to cope with this demand for a novel apparatus for controlling the rear wheel steer angle in 4-wheel steering vehicles.

SUMMARY OF THE INVENTION

In view of the described problems encountered by the prior art, the present invention aims as its first object at providing an apparatus for controlling the rear wheel steer angle in a 4-wheel steering vehicle, capable of operating in response to the speed of the steering wheel displacement in such a way as to satisfy both the demand for high steering response in the case where a quick turning of the vehicle is required and the demand for high straight running stability in the case where the vehicle is required to turn rather gently.

In general, it is commonly recognized that the sensitivity of vehicles to the steering wheel displacement gets higher as the vehicle running speed is increased. Namely, when the vehicle is running at a high speed, the running direction of the vehicle tends to be changed largely and quickly even by a small steering wheel displacement.

Accordingly, a second object of the invention is to provide an apparatus for controlling the steer angle of rear wheels which is capable of controlling the steer direction and angle of rear wheels in response to an information corresponding to the vehicle running speed, thus avoiding any excessive steering sensitivity during high speed running, thereby attaining a higher steering stability during straight running of the vehicle.

It is also experienced that a running vehicle tends to be displaced laterally due to disturbance such as road condition or wind laterally blowing onto the vehicle.

Accordingly, a third object of the invention is to provide an apparatus for controlling the steer angle of rear wheels, which is capable of controlling the rear wheels such that, in the event of an unintentional lateral displacement of a running vehicle due to disturbance, the rear wheels are automatically steered to negate the undesirable lateral displacement of the vehicle, without requiring steering wheel displacement by the driver.

To this end, according to the present invention, there is provided a rear wheel steer angle controlling apparatus for automatically controlling a steer angle of rear wheels of a vehicle by controlling an actuator mechanism for generating the steer angle of the rear wheels in response to an operation of a steering wheel for generating a steer angle of front wheels of said vehicle. The apparatus comprises a steering wheel displacement detecting means for detecting a steering wheel displacement and for generating a steering wheel displacement signal representing the steering wheel displacement; a judging means for judging a rotation speed or rate of operation of the steering wheel from the steering wheel displacemnt signal; and a controlling means for controlling the actuator mechanism in accordance with a result of judgement by the judging means such that: (a) the steer angle of the rear wheels is generated in the direction counter to a direction of steer angle of the front wheels when the steering wheel is operated at a high speed; and (b) the steer angle of the rear wheels is generated in the same direction as the steer angle of the front wheels when the steering wheel is operated at a low speed.

BRIEF DESCRIPTION OF THE DRAWINGS

FIG. 3 is an illustration showing the manner in which rear wheels are automatically steered to minimize lateral displacement of vehicle without requiring steering wheel operation in a third aspect of the invention;

FIG. 15A shows the detail of the vehicle velocity detector used in the second basic embodiment;

FIG. 17B is a diagram showing the transfer characteristics of a judging circuit incorporated in the processing circuit shown in FIG. 17A;

FIG. 22A is a circuit diagram of a dead zone circuit in the third basic embodiment; and FIG. 22B is a diagram showing the output voltage from the dead zone circuit.

DETAILED DESCRIPTION OF THE PREFERRED EMBODIMENTS

(A) First Aspect

Figure 1:
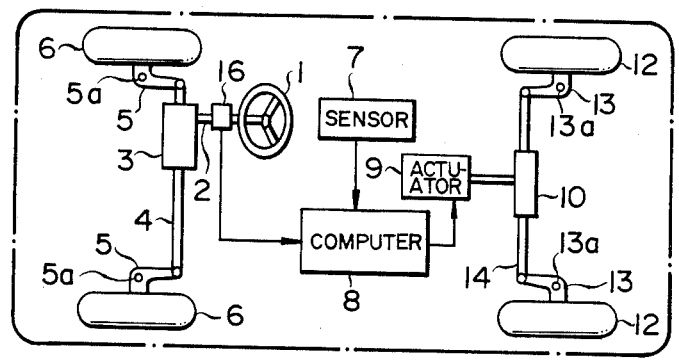
FIG. 1 is a block diagram of a conventional rear wheel steer angle controlling apparatus for 4-wheel steering vehicles.

According to a first aspect of the invention, there is provided a rear wheel steer angle controlling apparatus for automatically controlling the steer angle of rear wheels of a vehicle by controlling an actuator mechanism for generating the steer angle of rear wheels in response to an operation of a steering wheel for generating a steer angle of front wheels of the vehicle, the apparatus comprising: a steering wheel displacement detecting means adapted for detecting the steering wheel displacement and for generating a steering wheel displacement signal representing the steering wheel displacement; a judging means for judging the rotation speed or rate of operation of the steering wheel from the steering wheel displacement signal; and a controlling means for controlling the actuator mechanism in accordance with the result of judgement by the judging means such that the steer angle of rear wheels is generated in the direction counter to the direction of steer angle of front wheels when the steering handle is operated at a high speed and that the steer angle of rear wheels is generated in the same direction as the steer angle of front wheels when the steering wheel is operated at a low speed.

According to the first aspect of the invention, the angle $\delta h(t)$ of rotation of the steering wheel or the displacement D of the steering handle from a reference position corresponding to the straight running of the vehicle, i.e., an amount corresponding to the steer angle of the front wheels, is detected by the steering wheel displacement detecting means. When the steering wheel rotation angle $\delta h(t)$ is detected, the detected angle is differentiated by time t so that the angular frequency $\omega$ of the steering wheel is determined. On the other hand, when the handle displacement D is detected, the displacement D is expressed as $D=f(\omega t)$ which is a function of the angular frequency $\omega$ of the steering wheel. Therefore, the judging means can judge the rotation speed or rate of operation of the steering wheel on the basis of the steering displacement signal derived from the steering displacement detecting means. When the rotation speed or rate of operation of the steering wheel, i.e., the angular frequency, is large, the control means operates to control the actuator mechanism such that the steer angle of the rear wheels is set in the counter direction to the angle of steer of the front wheels. As a result, steer angle of the front wheels and the steer angle of the rear wheel are set almost simultaneously so that forces are produced simultaneously on the front and rear wheel tires. These forces in turn form yawing moments which act to turn the vehicle in one direction, thus equivalently increasing steering gain, i.e., the ratio of the steer angle of steered wheel to the rotation angle of the steering wheel. Namely, in this case, the sum of the steer angle of the front wheels and the steer angle of the rear wheels form an effect equivalent to the effect produced by the increased steering gain.

On the other hand, when the rotation speed or rate of operation of the steering wheel, i.e., the angular frequency, is small, the controller operates to control the actuator mechanism in such a way as to set the steer angle of the rear wheels in the same direction as the steer angle of the front wheels. In consequence, a steering effect equivalent to that produced by a steer angle equal to the difference between the front wheel steer angle and rear wheel steer angle is obtained, resulting in a small steering gain, thus improving the steering stability during straight running of the vehicle.

Thus, according to the invention, the steering gain is increased to provide a good response to the steering input for a quick steering when the rotation speed or rate of operation of the steering wheel is high, i.e., when the angular frequency is high. On the other hand, when the angular frequency is low, the steering gain is reduced to prevent any yaw and lateral displacement of the vehicle, thereby attaining a high steering stability during straight running.

According to a first practical form of the first aspect of the invention, the controlling means controls the actuator mechanism in accordance with the result of judgement by the judging means and the steering wheel displacement signal such that a steer angle of rear wheels corresponding to the level of the steering wheel displacement signal is formed in the direction counter to the direction of steer angle of front wheels when the steering wheel is operated at a high speed and that a steer angle of rear wheels corresponding to the level of the steering wheel dislacement signal is generated in the same direction as the steer angle of front wheels when the steering wheel is operated at a low speed.

In this first practical form of the invention, the direction in which the steer angle of the rear wheels is set is controlled in accordance with the rotation speed or rate of operation of the steering wheel, and the magnitude of the steer angle of the rear wheels is controlled in accordance with the steering wheel displacement.

It is, therefore, possible to optimumly determine the ratio between the steer angle of the front wheels and that of the rear wheels in accordance with the steering wheel displacement and, if necessary, to select this ratio in accordance with the particular of the individual driver.

According to a second practical form of the first aspect of the rotation invention, the judging means judges the speed or rate of operation of the steering wheel by using a transfer function G(S) expressed by the following formula and controls the actuator mechanism in accordance with the result of judgement:

$$G(S) = Kd - \frac{Ke}{1 + TS} \cdot TS \qquad (4)$$

where, Kd and Ke are constants which meet the condition of $0<Kd<Ke$, S is a complex frequency expressed by a $+j\omega$(a is any desired real number independent from time, $j=\sqrt{-1}$), and T is a primary delay time constant.

As is well known, the transfer function G(S) is obtained by dividing the laplace-transformed output, i.e., the image function $\delta(S)$ obtained through Laplace transformation of the rear wheel steer angle $\delta r(t)$, by the Laplace-transformed input, i.e., the image function $\delta h(S)$ obtained through Laplace transformation of the steering wheel rotation angle $\delta h(t)$.

Thus, according to the second practical form, the actuator mechanism is controlled with a transfer characteristic expressed by an element which is obtained by subtracting from the proportional element an element formed by a series connection of a primary delay element and a differetiation element.

The transfer function G(S) appearing in formula (4) is determined to meet the following conditions (a) and (b).

(a) When the steering wheel is operated quickly, i.e., when the angular frequency of the steering wheel is high, the delay of the steer of the rear wheels behind the steer of the front wheels is made as small as possible and the steer angle of the rear wheels is set in the counter direction to that of the front wheels. Conversely, when the steering wheel is operated slowly, the level of response of the rear wheels is reduced to weaken the influence of the rear wheels on the steering operation. In order to meet this condition, the transfer function G(S) is expressed as follows using a proportional element, primary delay element and differentiation element.

$$G(S) = \frac{Kd - Ke}{1 + TS} \cdot TS \tag{5}$$

$$(0 < Kd < Ke)$$

(b) When the steering wheel is operated slowly, i.e., when the angular velocity of the steering wheel is rather small, the steer angle of the rear wheels is set in the same direction as the front wheels, whereas, when the steering wheel is operated quickly, the level of response of the rear wheels is reduced to weaken the influence of the rear wheels on the steering operation. To meet these demands, the transfer function G(S) is expressed as follows by using a proportional element and a primary delay element.

$$G(S) = \frac{Kd}{1 + TS} \tag{6}$$

$$(0 < Kd)$$

A transfer function G(S) which simutaneously satisfies both the conditions (a) and (b) is derived from formulae (5) and (6) as follows:

$$G(S) = \frac{Kd - Ke}{1 + TS} \cdot TS + \frac{Kd}{1 + TS} \tag{7}$$

$$= Kd - \frac{Ke}{1 + TS} \cdot TS$$

The steering characteristics determined by the transfer function G(S) specified by formula (7) will be explained hereinunder on both cases of an extremely slow steering wheel operation and an extremely quick steering wheel operation.

When the steering wheel is operated extremely slowly, the complex frequency S takes an extremely small value and the formula (7) is written as follows at one of the limits S=0:

$$\lim_{s \to 0} G(S) = Kd \tag{8}$$

Because of the existence of the condition $Kd>0$, representing the input by the angle $\delta h(t)$ of rotation of the steering wheel, the rear wheel steer angle $\delta r(t)$ and the front wheel steer angle $\delta h(t)$ take the same sign, so that the steer angle of the rear wheels is set in the same direction as that of the front wheels.

Conversely, when the steering wheel is operated extremely quickly, the complex frequency S takes an extremely large value, and the formula (7) can be written as follows when the S takes the limit value $\infty$.

$$\lim_{s \to \infty} G(S) = Kd - Ke \tag{9}$$

Because of existence of the condition $Ke>Kd$, i.e., $Kd-Ke<0$, a rotation of the steering wheel by an angle $\delta h(t)$ causes the rear wheel steer angle $\delta r(t)$ and the steering wheel rotation angle $\delta h(t)$ to have opposite signs, so that the angle of steer of the rear wheels is set in the direction opposite to the angle of steer of the front wheels.

In these cases, the steer angle $\delta r(t)$ of the rear wheels is proportional to the angle $\delta h(t)$ of the rotation of steering wheel, with respect to the constants Kd and Kd−Ke, respectively.

Although the foregoing explanation refers to the angle of rotation of the steering wheel as the input, it will be clear to those skilled in the art that the same result will be obtained when the steering wheel displacement D is used as the input.

As has been described, according to the second practical form, the direction and the magnitude of the steer angle of the rear wheels are controlled in accordance with the rotation speed or rate of operation of the steering wheel and are optimized in relation to the speed of operation of the steering wheel by suitably selecting the values of the constants Kd and Ke, as well as the time constant T.

(B) Second Aspect

According to a second aspect of the invention, there is provided a rear wheel steer angle controlling apparatus for automatically controlling the steer angle of rear wheels of a vehicle by controlling an actuator mechanism for generating the steer angle of rear wheels in response to an operation of a steering wheel for generating a steer angle of front wheels of the vehicle, the apparatus comprising: a steering wheel displacement detecting means adapted for detecting the steering wheel displacement and for generating a steering wheel displacement signal representing the steering wheel displacement; a judging means for judging the rotation speed or rate of operation of the steering wheel from the steering-wheel displacement signal; a physical amount detecting means for detecting a physical amount related to the vehicle velocity and outputting a physical amount signal; and a controlling means for controlling the actuator mechanism in accordance with the result of judgement by the judging means and the physical amount signal such that, when the steering wheel is operated at a high rotation speed, a steer angle of rear wheels is formed in the direction counter to the direction of steer angle of front wheels such as to provide a small radius of turning circle of the vehicle when the physical amount is small and, when the physical amount is large, the steer angle of rear wheels is determined such as to provide a greater radius of turning circle than that obtained when the physical amount is small, and, when the steering wheel is operated at a low rotation speed, a steer angle of rear wheels is formed in the same direction as the steer angle of front wheels.

According to this second aspect of the invention, the rotation speed or rate of operation of the steering wheel is judged by the judging means on the basis of the steering displacement signal derived from the steering wheel displacement detecting means, as in the case of the first aspect of the invention. On the other hand, a physical amount related to the vehicle velocity such as the vehicle velocity itself, yaw rate or the like is detected by the physical value detecting means. When the physical amount corresponding to the vehicle speed is small while the speed of operation of the steering wheel, i.e., the angular frequency, is large, the control means controls the actuator mechanism such that steer angles in the opposite directions are generated for the front and rear wheels almost simultaneously. Consequently, forces are generated on the front and rear wheels such as to produce yawing moments acting in the same direction, which in turn produces an effect equivalent to that produced by an increase in the steering gain which is, as stated before, the ratio of the steer angle of steered wheels to the angle of rotation of the steering wheel. Namely, the steering effect obtained is equivalent to a steering angle which equals to the sum of the steer angle of the front wheels and the steer angle of the rear wheels. Consequently, the vehicle is steered with a good response to the steering input, particularly when the vehicle is required to turn sharply at a low speed.

When the angular frequency of the steering wheel is large, the actuator mechanism is controlled in such a manner that the steer angle of the rear wheels is set to increase the radius of turn of the vehicle as the physical amount related to the vehicle velocity is increased. Consequently, when the vehicle velocity is high, the sensitivity to the steering operation is decreased even when the rotation speed or rate of operation of the steering wheel is high.

Conversely, when the rotation speed or rate of operation, i.e., the angular frequency, of the steering wheel is low, the control means controls the actuator mechanism in such a way as to generate a steer angle of rear wheels in the same direction as the angle of steer of the front wheels, so that an effect equivalent to that produced by a steer angle equal to the difference between the angle of steer of the front wheels and the angle of steer of the rear wheels is obtained, thus materially reducing the steering gain and improving the steering stability during straight running.

Thus, according to the second aspect of the invention, the steering gain is increased such as to improve the response to the quick turning steering input when the steering wheel is operated at high speed, whereas, when the speed of operation of the steering wheel is low, the steering gain is decreased to suppress the tendency of yaw and lateral displacement of the vehicle thereby enhancing the running stability of the vehicle during straight running. For the same reason, the abrupt increase in the sensitivity to the turning steering input during high speed running is avoided to ensure a higher steering stability. The described control of the rear wheels permits a quick recovery of the correct running direction against the disturbance such as wind blowing laterally, as compared with conventional vehicles having no rear wheel steering function.

The described second aspect of the invention can be embodied in several forms.

Accordng to a first form, the controlling means controls the actuator mechanism in accordance with the result of judgement by the judging means and the physical amount signal such that, when the steering wheel is operated at a high speed and the physical amount is below a predetermined value, a steer angle of rear wheels is generated in the direction counter to the direction of steer angle of front wheels, while, when the steering wheel is operated at a low speed and the physical value is below the predetermined value, a steer angle of rear wheels is formed in the same direction as the steer angle of front wheels, and, when the physical amount exceeds the predetermined value, a steer angle of rear wheels is generated in the same direction as the steer angle of front wheels regardless of the rotation speed or rate of operation of the steering wheel.

This first form will be explained hereinunder on an assumption that the magnitude of the steer angle of the rear wheels is controlled in accordance with the angle $\delta h$ of rotation of the steering wheel and that the vehicle velocity V is used as the physical amount related to the vehicle speed. In the first aspect explained above, when the vehicle velocity V is below a predetermined value Vc corresponding to an extremely high vehicle speed, a steering angle (expressed as $f(\delta h)$, hereinunder) proportional to the angle of rotation of the steering wheel is set for the rear wheels in the same and counter directions to the front wheels, respectively, when the speed $\omega = \delta h$ is low and high, respectvely. However, when the velocity V exceeds a predetermined level Vc, a rear wheel steer angle proportional to the angle of rotation of the steering wheel is generated. These conditions are expressed by the following formulae:

$$\text{On condition of } V \leq Vc, \ \delta r = f(\delta h) \quad (10)$$

$$\text{On condition of } V > Vc, \ \delta r = k_1 \delta h \quad (11)$$

where, $\delta r$ represents the steer angle of rear wheels, while $K_1$ represents a comparatively small positive constant.

According to the formula (10) above, when the vehicle velocity V is lower than a predetermined value Vc, the rear wheel steer angle is controlled in the direction which is determined by the speed of rotation of the steering wheel. On the other hand, when the vehicle running velocity V exceeds the predetermined level Vc, steer angles for the front and rear wheels are generated in the same direction regardless of the speed of rotation of the steering wheel.

The foregoing explanation refers to the vehicle running velocity as the physical amount related to the vehicle speed. This, however, is not exclusive and the control may be made by using a physical amount $f(d)$ related to the lateral displacement of the vehicle, such as the yaw rate, lateral acceleration, product of yaw rate and the vehicle velocity, product of the lateral acceleration and vehicle velocity and so forth, in place of the vehicle velocity used in the explanation, because such a physical amount $f(d)$ related to the lateral displacement of the vehicle is increased as the vehicle speed is increased.

In such a case, the following conditions (12) and (13) can be substituted for the conditions (10) and (11) mentioned above.

On condition of $|f(d)| \leq f(d)c$, $\delta r = f(\delta h)$      (12)

On condition of $|f(d)| > f(d)c$, $\delta r = k_1 \delta h$      (13)

where, f(d)c represents a predetermined value of the physical amount related to the lateral displacement corresponding to the above-mentioned predetermined value Vc of the vehicle velocity.

As, will be understood from the foregoing description, according to the first form of the second aspect of the invention, a high running stability of the vehicle can be obtained even when the steering wheel is operated quickly during high speed running of the vehicle, because the angle of steer of rear wheels is always generated in the same direction as the angle of steer of front wheels without fail when the physical amount related to the vehicle speed is large.

In a second form of the second aspect of the invention, the controlling means controls the actuator mechanism in accordance with the result of judgement by the judging means and the physical amount signal such that, when the steering wheel is operated at a high speed and the physical amount is below a predetermined value, a steer angle of rear wheels is generated in the direction counter to the direction of steer angle of front wheels, while, when the steering wheel is operated at a low speed and the physical value is below the predetermined value, a steer angle of rear wheels is formed in the same direction as the steer angle of front wheels, and, when the physical amount exceeds the predetermined value, no steer angle of rear wheels is generated regardless of the rotation speed or rate of operation of the steering wheel.

Therefore, when the physical value related to the vehicle speed is large, no steer angle of rear wheels is formed in the direction counter to the direction of the front wheel steer angle.

According to this second form, the control of the steer angle of rear wheels is not conducted whenever the phyical amount corresponding to the vehicle speed is large, so that a running stability at least equal to that of the conventional vehicles steerable only by the front wheels can be obtained when the physical amount related to the vehicle speed is large.

In a third form of the second aspect of the invention, the controlling means controls the actuator mechanism in accordance with the result of judgement by the judging means and the physical amount signal such that, when the steering wheel is operated at a high speed, a steer angle of rear wheels which becomes smaller as the physical value is increased is generated in the direction counter to the direction of steer angle of front wheels, and, when the steering wheel is operated at a low speed, a steer angle of rear wheels which becomes smaller as the physical amount is increased is formed in the same direction as the steer angle of front wheels.

Using the vehicle running velocity as the physical amount related to the vehicle speed, the third form of the invention can be expressed by the following first and second formulae (14) and (15).

$\delta r = f(\delta h)/(k_2 V + k_3)$      (14)

where, $k_2$ represents a positive proportional constant for obtaining the coincidence of dimension between $f(\delta h)$ and V, while k is a constant which is used for preventing the denominator of the right side of the formula from becoming zero.

In the formula (14), when the vehicle running velocity V meets the condition of $V \leq (1 + K_3)/K_2$, the steer angle of the rear wheels is controlled in the direction counter to the direction of the front wheels in proportion to the angle of rotation of the steering wheel, on condition that the rotation speed or rate of operation of the steering wheel is high, whereas, the angle of steer of the rear wheels is controlled in the same direction as the front wheels also in proportion to the angle of rotation of the steering wheel.

However, when the vehicle velocity V is increased to meet the condition of $V > (1 - K_3)/K_2$, the angle $\delta r$ of steer of rear wheels becomes smaller than that obtained in the former case, because of the presence of the condition of $1/(K_2V + K_3) < 1$, and, when the vehicle velocity V is further increased $(V \to \infty)$, the steer angle of rear wheels aproaches zero $(\delta r \to 0)$. Thus, when the rotation speed or rate of operation of the steering wheel is high, the steer angle of rear wheel is controlled to provide a large radius of turning circle for the vehicle, and, when the rotation speed or rate of operation of the steering wheel is low, the steer angle of rear wheels is controlled such as to provide a greater radius of turning circle than that obtained when the steering wheel is operated at a high speed. Therefore, the sensitivity to the steering input for turning the vehicle is not increased even when the steering wheel is operated at a high speed.

The second formula (15) is expressed as follows.

$\delta r = f(\delta h) k_4 \cdot (Vmax - V)$      (15)

Where, $k_4$ represents a comparatively small positive proportional constant, while Vmax represents the maximum vehicle velocity.

When the control is made in accordance with the formula (15), the direction of the steer angle of rear wheels is determined in accordance with the rotation speed or rate of operation of the steering wheel and the value of the steer angle of rear wheels is controlled in accordance with the angle of rotation of the steering wheel in such a manner that the value of the angle is progressively decreased as the veicle speed is increased, as in the case of the control conducted in accordance with the formula (14).

Since the physical amount related to the lateral shifting of the vehicle in response to the steering operation is increased as the vehicle speed becomes higher, it is possible to use the physical amount related to the lateral displacement of the vehicle as the physical amount related to the vehicle speed. In such a case, the formulae (14) and (15) are rewritten as follows:

$\delta r = f(\delta h)/(k_2|f(d)| + k_3)$      (16)

$\delta r = f(\delta h) \cdot k_4(|f(d)max| - |f(d)|)$      (17)

where, f(d) max represents a physical value related to the lateral displacement of the vehicle corresponding to the maximum vehicle velocity Vmax.

According to this third form of the second aspect of the invention, the control is made in such a manner that the value of the steer angle of rear wheels is progressively decreased as the physical amount related to the vehicle speed becomes greater, so that the driver can steer the vehicle without having any extraordinary feel to the change in the steering effect caused by an abrupt change in the physical amount related to the vehicle speed. In addition, when the physical amount related to the vehicle speed is very large, the steer angle of the rear wheel is zero or nearly zero, so that a running stability equivalent to that shown by conventional vehicles having no rear wheel steering function can be ensured.

According to a fourth form of the second aspect of the invention, the controlling means controls the actuating mechanism in accordance with the result of judgement by the judging means and the physical amount signal such that, when the steering wheel is operated at a high speed and the physical amount is below a predetermined value, a steer angle of rear wheels which becomes smaller as the physical amount is increased is generated in the direction counter to the direction of steer angle of front wheels, while, when the steering wheel is operated at a high speed and the physical value exceeds the predetermined value, a steer angle of rear wheels which becomes greater as the physical amount is increased is formed in the same direction as the steer angle of front wheels, and, when the steering wheel is operated at a low speed, a steer angle of rear wheel which becomes greater as the physical amount is increased is formed in the same direction as the steer angle of front wheels.

This control can be achieved by controlling the actuator mechanism in such a manner that the actuator mechanism provides, as the steer angle of rear wheels, the sum of the steer angle $f(\delta r)$ and the steer angle proportional to the product of the physical amount (V or f(d)) and the angle $\delta h$ of rotation of the steering wheel, wherein the steer angle $f(\delta r)$ is determined in proportion to the angle of rotation of the steering wheel and set in the counter direction and in the same direction as the steer of the front wheels, when the rotation speed or rate of operation of the steering wheel is high and low, respectively.

This manner of control can be expressed by the following formulae (18) and (19).

When vehicle running velocity V is used as the physical amount related to vehicle speed:

$$\delta r = f(\delta h) + k_5 \cdot V \cdot \delta h \qquad (18)$$

When a physical value f(d) related to the lateral displacement of the vehicle is used as the physical amount related to the vehicle speed:

$$\delta r = f(\delta h) + k_5 \cdot |f(d)| \cdot \delta h \qquad (19)$$

where, $k_5$ is an extremely small positive constant.

Referring to the formula (18), the second term $k_5 \cdot V \cdot \delta_h$ is the term for controlling steer angle of rear wheels in proportion to the product of the vehicle running velocity V and the angle $\delta h$ of rotation of the steering wheel in the same direction as the steer of the front wheels. By selecting the proportional constant $k_5$ of this term to be sufficiently small, the value of the second term $k_5 \cdot V \cdot \delta h$ can be maintained sufficiently small when the vehicle running velocity V is small, i.e., during running at low or intermediate speed, so that the steer angle $\delta r$ of the rear wheel is ruled mainly by the first term $f(\delta h)$. However, when the vehicle running velocity V is increased to an extremely high level, the value of the second term $k_2 \cdot V \cdot \delta h$ is increased significantly to exceed the influence of the first term $f(\delta h)$, so that the steer angle $\delta r$ of rear wheels is ruled mainly by the second term $k_5 \cdot V \cdot \delta h$. Therefore, using the formula (18), it is possible to steer the rear wheels in the direction determined by the rotation speed or rate of operation of the steering wheel when the vehicle running velocity is below a predetermined level and always in the same direction as the steer of the front wheels whenever the vehicle runing velocity is above the predetermined value, as in the first form of the second aspect explained before.

While the influence of the second term $K_5 \cdot V \cdot \delta h$ is still smaller than that of the first term $f(\delta h)$, when the steering wheel is operated quickly, the first term $f(\delta h)$ tends to control the steer angle of rear wheels in proportion to the angle of rotation of the steering wheel in the direction counter to the direction of steer of the front wheels, while the second term $K_5 \cdot V \cdot \delta h$ produces an effect for controlling the steer angle of rear wheels in the same direction as the front wheels. In consequence, the steer angle of the rear wheels becomes smaller in proportion to the value of the second term $K_5 \cdot V \cdot \delta h$. On the other hand, when the steering wheel is operated rather slowly, the steer angle of rear wheels is increased as the value of the second term $K_5 \cdot V \cdot \delta h$ is increased. Thus, according to the formula (18), it is possible to control the steer angle of rear wheels in such a manner as to provide a greater radius of the turning circle of the vehicle when the vehicle speed is high than that obtained when the vehicle speed is low.

When the steering handle is operated quickly so that the front and the rear wheels are steered in the opposite directions, the steer angle $\delta r$ of the rear wheels becomes zero provided that the influences of the first and the second terms $f(\delta h)$ and $K_5 \cdot V \cdot \delta h$ negate each other, i.e., when the absolute values of these terms are equal to each other. In such a case, no steer angle is generated in the rear wheels as in the case of the second form explained before.

Figure 2:
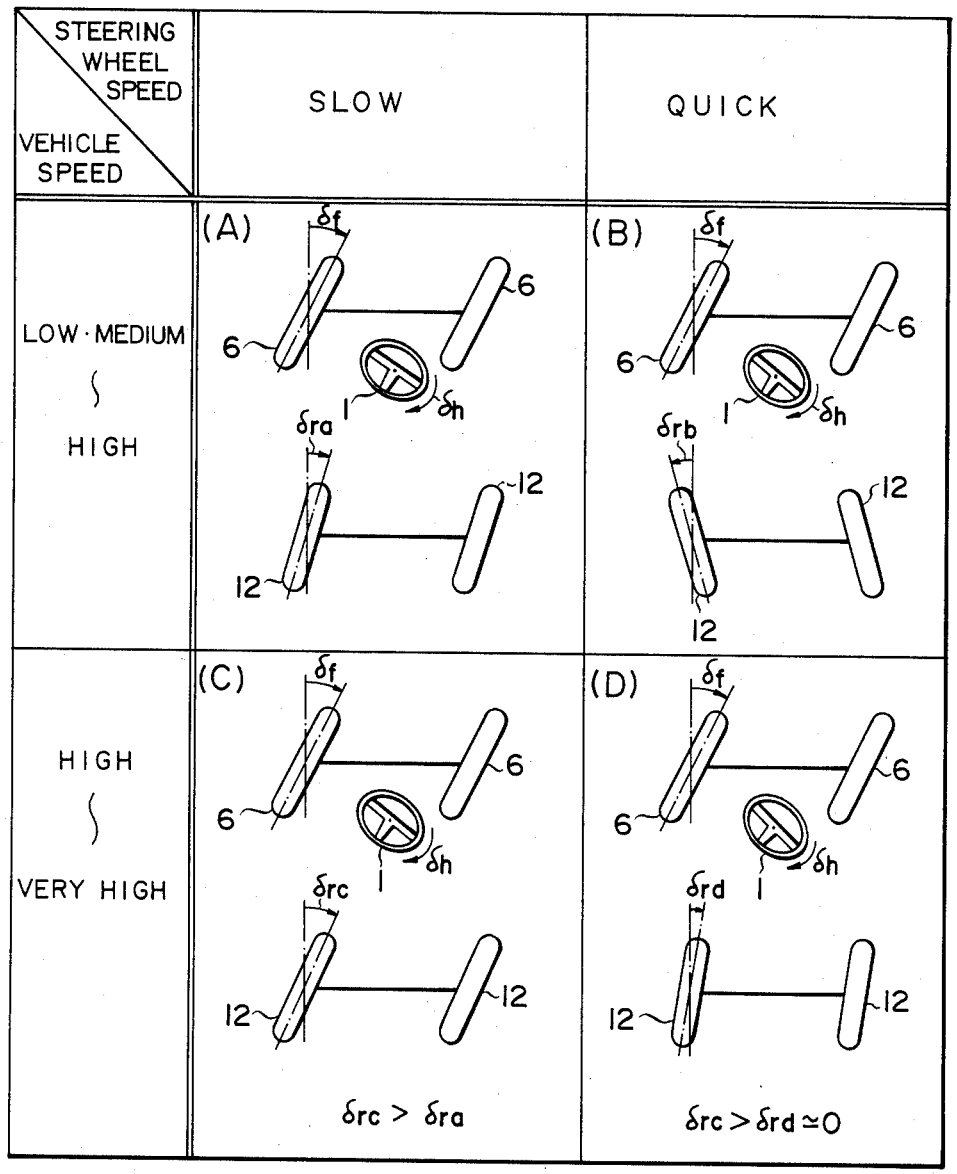
FIG. 2 is an illustration showing the manner in which the steer angle of rear wheels is controlled in accordance with the speed of operation of the steering wheel and the vehicle running velocity in the second aspect of the invention.

The fourth form of the second aspect of the invention will be explained in more detail with reference to FIG. 2, for each of the first case in which the influence of the second term $K_5 \cdot V \cdot \delta h$ is greater than that of the first term $f$ $(\delta h)$, i.e., when the condtion of $(|K_5 \cdot V \cdot \delta h| > |f(\delta h)|)$ is met, and the second case in which the influence of the second term is smaller than that of the first term.

When the influence of the second term $K_5 \cdot V \cdot \delta h$ is smaller than that of the first term $f(\delta h)$, i.e., when the vehicle is running at a low or medium speed, the steer angle of rear wheels 12 is generated in the same direction as the front wheels 6 (see FIG. 2A) when the steering wheel 1 is operated slowly, whereas, when the steering wheel 1 is operated quickly at a high speed, the steer angle of rear wheels 12 is generated in the opposite direction to the steer of the front wheels 6 (see FIG. 2B), as in the case of the rear wheel steer angle controlling apparatus for 4-wheel steering vehicle in accordance with the first aspect of the invention explained before. However, the control of the value of the steer angle of the rear wheels is made in a manner different from that in the first aspect. Namely, when the influence of the second term $K_5 \cdot V \cdot \delta h$ has become greater than the influence of the first term $f(\delta h)$, i.e., when the speed of the vehicle running at a high speed is further increased, when the steering wheel is operated slowly, the steer angle $\delta rc$ of the rear wheels 12 is controlled in the same direction as the steer of the front wheels 6 such as to be greater than the steer angle $\delta ra$ obtained in the normal speed running of the vehicle, i.e., to meet the condition of $|\delta rc| > |\delta ra|$, as shown in FIG. 2C. Conversely, when the steering wheel is operated quickly, the steer angle $\delta rc$ of the rear wheels 12 is controlled in the same direction as the steer of the front wheels 6 such as to be small enough, i.e., to meet the condition of $|\delta rc| > |\delta rd| \approx 0$, as shown in FIG. 2D.

Thus, according to the formula (18), it is possible to control the actuator mechanism in the following manner:

(a) When the steering wheel is operated slowly, the steer angle of rear wheels is controlled in the same direction as the front wheels such that the steer angle becomes greater as the vehicle running velocity is increased.

(b) When the steering wheel is operated quickly while the vehicle running velocity V meets the condition of $V < |f(\delta h)|/K_5\cdot|\delta h|$, the steer angle of rear wheels is controlled in the counter direction to the steer of the front wheel such that the steer angle becomes smaller as the vehicle running velocity V is increased.

(c) When the steering wheel is operated quickly while the vehicle running velocity meets the condition of $V > |f(\delta h)|/K_5\cdot|\delta h|$, the steer angle of rear wheels is controlled in the same direction as the steer of the front wheel such that the steer angle becomes greater as the vehicle running velocity becomes higher.

No detailed explanation will be needed for those skilled in the art in understanding that same control can be effected by using the formula (19) in place of the formula (18).

Thus, according to the fourth form of the second aspect of the invention, the steer angle of the rear wheels is controlled in the same direction as the steer of the front wheels when the physical value related to the vehicle speed is large, and the value of the steer angle of rear wheels is selected in accordance with the physical amount related to the vehicle speed and the angle of rotation of the stering wheel, thus further enhancing the running stability of the vehicle.

(C) Third Aspect

According to a third aspect of the invention, there is provided a rear wheel steer angle controlling apparatus for automatically controlling the steer angle of rear wheels of a vehicle by controlling an actuator mechanism for generating the steer angle of rear wheels in response to an operation of a steering wheel for generating a steer angle of front wheels of the vehicle, the apparatus comprising: a steering wheel displacement detecting means adapted for detecting the steering wheel displacement and for generating a steering wheel displacement signal representing the steering wheel displacement; a judging means for judging the rotation speed or rate of operation of the steering wheel from the steering wheel displacement signal; a physical amount detecting means for detecting a physical amount related to the lateral displacement of the vehicle and outputting a physical amount signal; and a controlling means for controlling the actuator mechanism in accordance with the result of judgement by the judging means and the physical amount signal, such that a steer angle of rear wheels is generated as the sum of (a) a first angle proportional to the steering wheel displacement and set in the direction counter to the direction of steer angle of front wheels when the steering wheel is operated at a high speed and in the same direction as the steer angle of front wheels when the steering wheel is operated at a low speed and (b) a second angle proportional to the physical amount and set in the same direction as generation of the physical amount.

In this case, the control means controls the actuator mechanism in accordance with the following formula:

$$\delta r = f(\delta h) + f(d) \qquad (20)$$

where $\delta r$ represents the steer angle of rear wheels, $f(\delta h)$ represents the angle proportional to the steering wheel displacement and is set in the counter direction to the steer of the front wheels when the steering wheel is operated quickly and in the same direction as the steer of the front wheel when the steering handle is operated slowly, and $f(d)$ repesents the angle proportional to a physical amount related to the lateral displacement of the vehicle selected in the same direction as the direction in which the physical amount is generated.

According to the third aspect of the invention, since the physical amount related to the lateral displacement of the vehicle is generated in the direction of the steering by the steering wheel, a steer angle which becomes smaller as the angle $f(d)$ gets smaller is generated for the rear wheels in the direction counter to the direction of steer of the front wheels, when the steering wheel is operated quickly. However, the steer angle of rear wheels is reduced to zero when the physical amount related to the lateral displacement of the vehicle becomes large, as in the cae of high-speed running of the vehicle and, as this phyical amount is further increased, the steer angle of the rear wheels is controlled in the same direction as the steer of the front wheels.

On the other hand, when the operation speed of the steering wheel is low, a steer angle proportional to the sum of the steering wheel displacement and the physical amount related to the lateral displacement of the vehicle is generated for the rear wheels in the same direction as the steer of the rear wheels. Since the physical amount related to the lateral displacement of the vehicle is increased as the vehicle speed gets higher, the actuator mechanism is controlled such that, when the physical amount related to the vehicle speed is increased, the radius of turning circle of the vehicle becomes greater, i.e., to the understeer side, as in the case of the second aspect of the invention.

When the driver does not operate the steering wheel, the term $f(\delta h)$ is zero, so that the steer angle of rear wheels of the vehicle is controlled in the same direction as the generation of a physical amount related to the lateral shifing by an amount proportional to this physical amount.

It is assumed here that a vehicle running straight with its steering wheel fixedly held by the driver is unexpectedly blown by a strong lateral wind acting as a distrubance. In such a case, the driver cannot instantaneously operate the steering wheel but tends to hold the steering wheel still, so that the vehicle is forcibly made to swing its nose and starts to turn against the driver's will who wishes to keep the course. According to the third aspect of the invention, the change in the running direction of the vehicle caused by the disturbance is instantaneously detected as a change in the physical amount, and a steer angle of rear wheels is generated instantaneously in such a direction as to minimize the deviation from the course, i.e., the amount of the lateral displacement, thus stabilizing the vehicle against the disturbance such as the lateral wind.

Therefore, in this third aspect of the invention, when the vehicle is forcibly deviated from the course due to a disturbance such as lateral wind, the change in the posture of the vehicle is detected to automatically steer the rear wheels in such a manner as to minimize the amount of the lateral displacement, without requiring the instantaneous counter steering by the driver.

The concept of the third aspect of the invention, i.e., how the rear wheel steer angle is controlled automatically without requiring operation of the steering wheel will be explained more fully with specific reference to FIG. 3, on an assumption that the yaw rate r is detected and used as the physical amount related to the lateral displacement of the vehicle.

It is assumed here that the vehicle 15 is running straight while the driver is holding the steerig wheel fixedly without rotating the same, along a course repesented by a chain line (1), as shown in (A).

It is assumed also that a disturbance acts on the centroid 15a of the vehicle in the state shown in (A) in the direction perpendicular to the running direction (1). If the driver still keeps the steering wheel fixedly without making any steering operation, the vehicle will run along a broken line (2) to the position shown in (B).

According to the third aspect of the invention, when the vehicle is in the state shown in (B), the rate r of the yaw which has been generated in the counter-clockwise direction is detected and the rear wheels 12 are steered without delay in the same direction as the yaw rate r, i.e., counter-clockwise by a steer angle which corresponds to the level of the yaw rate r.

As a result of the steer angle control for the rear wheels 12 in accordance with the yaw rate r in the same direction as the generation of the yaw rate r, the vehicle runs along a two-dots-and-dash line 3 to a position (C) in FIG. 3. The control of the steer angle of rear wheels 12 is continued even after the vehicle has come to take the position (C) such as to steer the rear wheels 12 in accordance with the level of the yaw rate r and the direction of the yaw rate (r) which is in this case clockwise, until the detected yaw rate r finally becomes zero.

This series of control operation is conducted instantaneously without delay after the generation of the yaw rate, and is continued momentarily to minimize the deviation of the vehicle from its course.

It is to be understood also that the vehicle is automatically steered to resume the original course (1) even when the vehicle has been displaced laterally without yawing, if the control is made upon detection of the lateral acceleration in place of the yaw.

Thus, according to the third aspect of the invention, when the driver operates the steering wheel quickly for turning the vehicle, the vehicle turns quickly in good response to the steering input. Conversely, when the steering wheel is operated slowly, the steering gain is reduced to prevent any yawing and lateral displacement of the vehicle thus ensuring a high running stability during the straight running of the vehicle. At the same time, when the vehicle is running at a high speed, the undesirable excessive rise of the sensitivity to the turning steering input is avoided to assure a high running stability of the vehicle. In addition, when the vehicle has been shifted laterally due to disturbance such as lateral wind, the rear wheels are automatically steered in such a manner as to negate this lateral displacement, thus allowing the vehicle to keep its course.

The third aspect of the invention can be embodied in the following forms.

In a first form, the yaw rate r is used as the physical amount related to the lateral displacement of the vehicle.

Thus, the first form is expressed by the following formula:

$$\delta r = f(\delta h) + k_6 \cdot r \tag{21}$$

where, $k_6$ is a small positive proportional constant.

When the vehicle is steered by the operation of the steering wheel, the yaw rate is usually generated in the same direction as the direction of the steer angle of front wheels, although there may be a slight time lag behind the generation of the steer angle of front wheels. Therefore, the second term $k_6 \cdot r$ has an effect to steer the rear wheels in the same direction as the steer of the front wheels by an amount proportional to the yaw rate r.

Consequently, when the steering wheel is operated slowly, the steer angle of rear wheels is controlled in the same direction as the steer of the front wheels such that the steer angle becomes greater as the level of the yaw rate r is increased. Conversely, when the steering wheel is operated quickly, the steer angle of rear wheels is controlled in the counter direction to the steer of the front wheels such that the steer angle gets smaller as the yaw rate r is increased. If the yaw rate r is further increased, the rear wheels are steered in the same direction as the steer of the front wheels, as in the case of the fourth form of the second aspect of the invention.

When the driver does not operate the steering wheel, the first term $f(\delta h)$ becomes zero so that the yaw rate r is also zero in usual cases. However, in the event that the driver does not operate the steering wheel despite the generation of yaw due to an unexpected turning of the vehicle caused by, for example, a disturbance, the rear wheels are steered in the same direction such as, for example, clockwise direction in response to a clockwise yaw rate r, by an amount proportional to the yaw rate r.

Thus, according to the first form described hereinbefore, the steer angle of rear wheels is controlled such as to provide a greater radius of turning circle of vehicle, i.e., an understeer steering property, when the driver operates the steering wheel. However, when the driver does not operate the steering wheel, the steer angle of rear wheels is automatically controlled to minimize the change of the position or course of the vehicle attributable to the presence of a disturbance such as lateral wind or ruts on the road surface.

A second form of the third aspect makes use of the product V r of the vehicle running velocity V and the yaw rate r as the physical amount related to the lateral displacement of the vehicle. This form is expressed by the following formula:

$$\delta r = f(\delta h) + k_7 \cdot V \cdot r \tag{22}$$

where, $k_7$ is a small positive proportional constant.

Provided that the constant $k_7$ has a suitable small value, the influence of the second term $k_7 \cdot V \cdot r$ in the formula (22) provides only a small influence so that the steer angle $\delta r$ of the rear wheels is ruled mainly by the first term $f(\delta h)$, while the vehicle running velocity V is low or medium. On the other hand, if the yaw rate is generated when the vehicle running velocity V is very high or if the value of the yaw rate is increased to increase the value of the second term significantly, the second term serves to control the steer angle of rear wheels in the same direction as the front wheels by an amount corresponding to the product V r. Therefore, according to the second form, when the driver operates the steering wheel, the steer angle of rear wheels is controlled in response to the steering operation in the same manner as the fourth form of the second aspect of the invention, whereas, when any yaw rate is generated due to a disturbance while the steering wheel is not operated, the steer angle of rear wheel is controlled in the same manner as the first form of the third aspect of the invention.

Thus, according to the second form, it is possible to attain a good response to the steering operation for turning the vehicle, as well as a high running stability, when the vehicle runs at a normal speed including low and high speeds. However, when the vehicle runs at a very high speed or when the yaw rate has become very large during running at a normal speed, the steer angle of rear wheels is so controlled as to provide understeer characteristics of the vehicle and, at the same time, any unintentional change in the position or course of the vehicle due to disturbance can be corrected automatically.

A third form is to control the steer angle of the rear wheels in accordance with the following formulae:

On condition of $V \leq Vc$: $\delta r = f(\delta h) + k_6 \cdot r$ (23)

On condition of $V > Vc$: $\delta r = k_1 \delta h$ (24)

According to a fourth form, the steer angle $\delta r$ of rear wheels is controlled in accordance with the following formula:

$$\delta r = \frac{f(\delta h)}{k_1 V + k_3} + k_8 \cdot r \quad (25)$$

(where, $k_8$ is a proportional constant)

The third form is distinguished from the second form in that, while in the second form the vehicle running velocity is used directly as the factor for controlling the steer angle of rear wheel, the third form makes use of the vehicle running velocity as a condition or criterion for the judgement of the steer angle of rear wheels.

On the other hand, the fourth form is distinguished from the second form in that, while in the second form the influence of the yaw rate on the rear wheel steer angle control is enhanced by multiplying the yaw rate with the vehicle velocity, the influence of the yaw rate on the rear wheel steer angle control is enhanced by dividing $f(\delta r)$ by the vehicle velocity V in the fourth form.

A fifth form is to use the product V r of the vehicle running velocity V and the yaw rate r as the physical amount related to the lateral dislacement of the vehicle, in place of the yaw rate r used in the fourth form. Thus, the fifth form can be expressed as follows:

$$\delta r = \frac{f(\delta h)}{k_1 V + k_3} + k_9 \cdot V \cdot r \quad (26)$$

where, $K_9$ represents a proportional constant.

The fifth form, therefore, produces an effect substantially equivalent to those produced by the second to fourth forms. According to the fifth form, both the first and second terms employ the concept of the vehicle running velocity, so that the influence of the running velocity on the rear wheel steer angle control is more significant than in other forms, so that the steer angle of rear wheels is controlled at a higher sensitivity to the vehicle running speed than in other forms.

A sixth form employs the product of the yaw rate r and the proportional constant $K_{10}$ as an additional term to the formula (15) explained before. Thus, the sixth form is to control the steer angle of rear wheels in accordance with the following formula (27).

$$\delta r = f(\delta h) \cdot k_4 \cdot (Vmax - V) + k_{10} \cdot r \quad (27)$$

A seventh form is to use a term which is obtained by multiplying the product of the vehicle running velocity and the yaw rate with a proportional constant $K_{11}$, in place of the second term of the sixth form. Thus, the seventh form is expressed by the following formula.

$$\delta r = f(\delta h) \cdot k_4 \cdot (Vmax - V) + k_{11} \cdot V \cdot r \quad (28)$$

The sixth and seventh forms produce substantially the same effects as the second form, although these forms provide a merit in that the steer angle of rear wheels, as well as the direction of the same, is controlled in accordance with the maximum running velocity Vmax of the vehicle. In particular, the seventh form offers an advantage over the sixth form in that, since the second term also includes the concept of the vehicle speed, the control of the steer angle of rear wheels can be made at a higher sensitivity to the vehicle running speed, as in the case of the fifth form.

An eighth form is a modification of the second form. Namely, in the eighth form, the rear wheel steer angle $\delta r$ is limited so as not to exceed a predetermined steer angle $\delta rc$. Thus, the eighth form is expressed as follows:

On condition of $|\delta r| \leq |\delta rc|$:, $\delta r = f(\delta h) + k_7 \cdot V \cdot r$ (29)

On condition of $|\delta r| > |\delta rc|$:, $\delta r = \delta rc$ (30)

Therefore, according to the eighth form, the undesirable increase in the rear wheel steer angle due to, for example, a failure or trouble in the steering system is avoided to prevent any accident, thus ensuring the safety of the running vehicle.

In the first to eighth forms of the third aspect of the invention described hereinbefore, the yaw rate r or the product V r of the vehicle running velocity and the yaw rate r is used as the physical amount related to the lateral displacement. This, however, is not exclusive and other factors such as the lateral acceleration or the product $V \cdot \dot{V}$ of the vehicle running velocity $\dot{V}$ and the lateral acceleration may be used as the physical amount related to the lateral displacement of the vehicle.

(D) Fourth Aspect

According to a fourth aspect of the invention, there is provided a rear wheel steer angle controlling apparatus for automatically controlling the steer angle of rear wheels of a vehicle by controlling an actuator mechanism for generating the steer angle of rear wheels in response to an operation of a steering wheel for generating a steer angle of front wheels of the vehicle, the apparatus comprising: a steering wheel displacement detecting means adapted for detecting the steering wheel displacement and for generating a steering wheel displacement signal representing the steering wheel displacement; a judging means for judging the rotation speed or rate of operation of the steering wheel from the steering wheel displacement signal; a physical amount detecting means for detecting a physical amount related to the lateral displacement of the vehicle and outputting a physical amount signal; a steer angle detecting means for detecting the steer angle of rear wheels and adapted for outputting a steer angle signal; and a controlling means for controlling the actuator mechanism in accordance with the result of judgement by the judging means, the physical amount signal and the steer angle signal, such that a steer angle of rear wheels is generated as the sum of (a) a first angle proportional to the steering wheel dislacement and set in the direction counter to the direction of steer angle of front wheels when the steering wheel is operated at a high speed and in the same direction as the steer angle of front wheels when the steering wheel is operated at a low speed, and (b) a second angle proortional to the physical amount and set in the same direction as generation of the physical amount.

A fourth aspect of the invention will be described hereinunder.

When the steering wheel is operated at a high speed, the steer angle of rear wheels is set in the counter direction to the steer of the front wheels, whereas, when the steering wheel is operated slowly, the steer angle of rear wheels is set in the same direction as the steer of the front wheels. As explained in connection with the second form of the first aspect, the steer angle proportional to the angle $\delta h(t)$ of rotation is determined from the following transfer function G(S):

$$G(S) = Kd - \frac{Ke}{1 + TS} \cdot TS \quad (4)$$

On the otehr hand, the steer angle proportional to the physical amount related to the lateral displacement of the vehicle is expressed as $Kr \cdot V \cdot r$, i.e., the product $V r$ of the vehicle running velocity V and the yaw rate r multiplied with the proportional constant Kr.

The following variables appear in the formulae shown later: rotation angle $\delta h$ of steering wheel, steer angle $\delta f$ of front wheels, steer angle $\delta r$ of rear wheels, vehicle velocity V, yaw rate r, steering wheel displacement signal $X\delta h$, vehicle velocity signal Xv, yaw rate signal Xr, command value $X\delta r$ of steer angle of rear wheels, steer angle signal $X\delta r$ representing the actually measured steer angle of rear wheel, and the offset signal $\Delta X\delta r$ representing the offset of actual rear wheel steer angle from the command angle. These variables appearing in the formulae are functions of time, and should be understood to mean the variable obtained throguh Laplace transformation of these functions of time, i.e., the complex frequencies $\delta h(S)$ $\delta f(S)$, $\delta r(S)$, $V(S)$, $r(S)$, $X\delta h(S)$, $Xv(S)$, $Xr(S)$, $X\delta r(S)$, $X\delta^R r(S)$ and $\Delta X\delta r(S)$, respectively.

Representing the steering gear ratio by N (N>0) the relationship between the rotation angle $\delta h$ of the wheel and the steer angle $\delta f$ of the front wheels is expressed by $\delta h = N \cdot \delta f$.

Using this relationship, the angle of steer of the rear wheels in accordance with the fourth aspect of the invention is expressed as follows $$\delta r = \left( Kd - \frac{Ke}{1 + TS} \cdot T \cdot S \right) \cdot N \cdot \delta f + Kr \cdot v \cdot r \quad (31)$$

The first and the second terms in the right side of the formula (31) are expressed by the following formulae (32) and (33) for the convenience's sake.

$$\delta r1 = \left( Kd - Ke \frac{TS}{TS + 1} \right) \cdot N \cdot \delta f \quad (32)$$

$$\delta r2 = Kr \cdot v \cdot r \quad (33)$$

Referring to $\delta r_1$ appearing in the formula (32) expressing the first term of the right side of the formula (31), when the steering handle is operated at an extremely low speed, the complex frequency S corresponding to the angular frequency of the steering handle operation takes an extremely small value. When the complex frequency S approaches a limit 0 (S→0), the formula (32) is rewritten as follows:

$$\delta r1 \underset{s \to 0}{=} Kd \cdot N \cdot \delta f \quad (34)$$

A condition of Kd N>0 is derived from the conditions of Kd>0 and N>0, so that the formula (32) has such an effect that, when the steering wheel is operated at extremely low speed, the steer angle $\delta r$ of the rear wheels is controlled in the same side or direction as the steer angle $\delta f$ of front wheels.

On the other hand, when the steering handle is operated at an extremely high speed, the complex frequency S takes an extremely large value, so that the formula (32) is transformed as follows:

$$\delta r1 = (Kd - Ke) \cdot N \cdot \delta f \quad (35)$$

A condition of (Kd−Ke) N<0 is derived from the conditions of (Kd−Ke)<0 and N>0. Therefore, when the steering wheel is operated very quickly, the formula (32) produces such an effect as to control the steer angle $\delta r$ of rear wheels in the opposite side or direction to the angle $\delta f$ of steer of the front wheels.

Thus, the first term of the formula (31) provides such an effect as to control the magnitude and direction of the steer angle of rear wheels in accordance with the speed and angle of rotation of the steering wheel.

Referring now to the $\delta r_2$ expressed by the formula (33) representing the second term of the formula (31), the constant $K_r$ is a positive constant and the vehicle running velocity V takes a positive value during the forward running of the vehicle. On the other hand, the yaw rate r has the same sign (positive or negative) as the rotation angle $\delta h$ of the steering wheel or the steer angle $\delta f$ of front wheels, although the yaw rate r may have a certain time delay to the steering handle rotation angle $\delta h$. Therefore, the formula (33) has an effect to control the steer angle $\delta r$ of rear wheels in the same direction as the steer angle $\delta f$ of front wheels Therefore, the second term of the formula (31) produces such an effect as to control the steer angle $\delta r$ of rear wheels in proportion to the product of the vehicle running velocity and the yaw rate, in the same direction as the steer angle $\delta f$ of front wheels.

The formula (31) as a whole, therefore, produces the following effect.

If the constant Kr takes a suitable small value, the steer angle δr of rear wheels is determined mainly by the first term of the formula (31) while the vehicle running velocity V is still low. Consequently, during low-speed running of the vehicle, the steer angle δr of rear wheels is controlled in accordance with the speed and angle of rotation of the steering wheel. Then, as the vehicle velocity V is increased, the value of the second term of the formula (31) is progressively increased so that the steer angle δr of rear wheels comes to be determined mainly by the second term rather than by the first term. Consequently, when the vehicle running velocity is high, the steer angle of rear wheel is controlled in proportion to the product of the vehicle running velocity and the yaw rate in the same direction as the steer of the front wheels.

These effects will be explained more fully with reference to FIG. 4A and 4B.

Figure 4A:
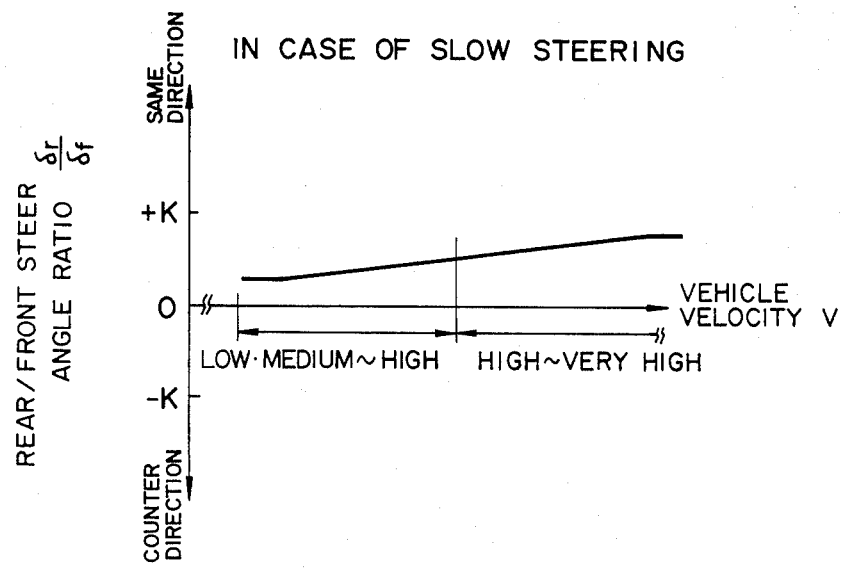
FIGS. 4A and 4b are diagrams showing the relationship between the rotation speed or rate of operation of the steering wheel and the ratio between the steer angles of front and rear wheels.

FIG. 4A shows the steering characteristics as obtained when the steering wheel is operated slowly. In this case, the first term of the formula (31) produces an effect to steer the rear wheels in the same direction as the steer of the front wheels, whereas the second term of the formula (31) produces such effects as to always steer the rear wheels in the same direction as the steer of the front wheels and to increase the steer angle of rear wheels in accordance with the increment of the vehicle running velocity. Therefore, when the steering wheel is operated slowly, the formula (31) as a whole functions to steer the rear wheels in the same direction as the front wheels, while increasing the steer angle of rear wheels in accordance with the increment of the vehicle running velocity, as will be seen from FIG. 4A.

Figure 4B:
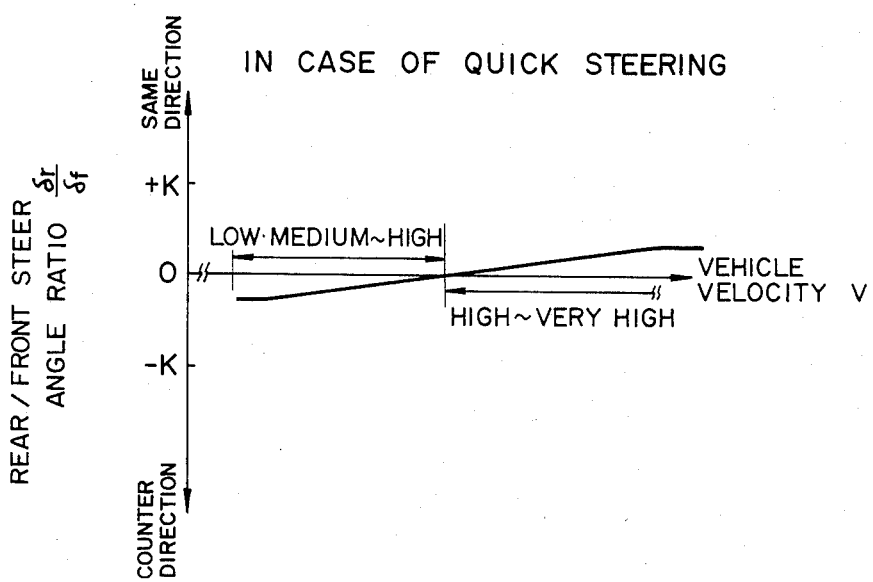

FIG. 4B shows the steering characteristic as obtained when the steering wheel is operated quickly. In this case, the first term of the ofrmul (31) has a function to generate the steer angle of rear wheels in the counter direction to the front wheels, whereas the second term of the formula (31) produces such effects as to steer the rear wheel always in the same direction as the front wheels and to increase the steer angle of rear wheels in accordance with the increment of the vehicle running velocity.

Thus, when the steering wheel is operated quickly, the formula (31) as a whole produces the following effects as the sum of the effects produced by the first and the second terms.

Namely, when the vehicle running velocity is still low, the rear wheels are steered in the counter directoin to the front wheels and the steer angle of rear wheels is decreased as the vehicle running velocity is increased, whereas, when the vehicle is running at a high speed, the rear wheels are steered in the same direction as the front wheels and the steer angle of rear wheels is increased in accordance with the increase in the vehicle running velocity, as shown in FIG. 4B.

The control in accordance with the formula (31) produces also an effect to stabilize the running vehicle against disturbance such as lateral wind.

It is assumed here that the driver holds the steering wheel fixedly without rotating the same during straight running of the vehicle. Since the rotation angle δh of the steering wheel is zero, the steer angle δf of front wheels included by the first term of formula (31) is also zero, so that the first term of the formula (31) is zero. In addition, the second term of this formula also is zero because no yaw rate r is generated during the straight running of the vehicle.

When the vehicle is turned unexpectedly and turned out of the course due to a disturbance such as lateral wind againnt the driver's will who fixes the steering wheel wishing to keep the course, the first term of the formula (31) is still zero because the steering wheel rotation angle δh is zero, but the second term has a certain value because of generation of the yaw r as a result of the turning of the vehicle and because the vehicle running velocity V is, needless to say, not zero. Consequently, the formula (31) as a whole has a certain value to generate a steer angle δr for the rear wheels. Due to the presence of the condition of Kd>0, the steer angle δr of rear wheels is generated in the same sign or direction as the raw rate r. Therefore, the control apparatus automatically steers the rear wheels in the same direction as the generation of yaw rate r, without requiring any counter steering operation by the counter, so that the lateral displacement of the vehicle from the straight line is avoided for the same reason as that explained before in connection with FIG. 3.

Furthermore, since the second term of the formula (31) produces an effect to generate the steer angle of rear wheels in proportion to the product of the vehicle running velocity V and the yaw rate r, the steer angle δr of rear wheels automatically produced upon detection of the yaw rate is increased as the veicle running velocity, so that the stability of the vehicle against disturbance such as lateral wind can be ensured even during high speed running of the vehicle.

The control means forms a command signal in accordance with the formula (31) and conducts the control of the actuating mechanism in such a manner that the actual steer angle as detected by the steer angle detecting means comes to coincide with the command signal.

In the foregoing description, the product of the vehicle running velocity and the yaw rate is used as the physical amount related to the lateral displacement of the vehicle. However, in view of the fact that a large yaw rate or a large lateral acceleration is generated when the vehicle running velocity is high, the invention does not exclude the use of the yaw rate, lateral acceleration and the product of the lateral acceleration and the vehicle running velocity, as the physical value related to the lateral displacement.

Thus, according to the fourth aspect of the invention, when the vehicle is running at a speed of normal use including low and high speeds, the rear wheels are steered in the same direction as the steer of the front wheels in response to slow operation of the steering wheel, thus ensuring a higher stability of the vehicle during straight running, through elimination of any fluctuation or lateral displacement of the vehicle, whereas, a quick operation of the steering handle causes the rear wheels to be steered in the opposite direction to the front wheels, thus enhancing the response to the steering operation for intentional turning of the vehicle. When the vehicle is running at an extremely high speed above the usual high speed, a slow operation of the steering wheel causes the rear wheels to be steered in the same direction as the front wheels such that the steer angle of the rear wheels is greater than that obtained during normal running of the vehicle, while a quick operation of the steering wheel causes the rear heels to be steered also in the same direction as the front wheel such that the steer angle of rear wheels is smaller than that effected by the slow operation of the steering wheel, whereby the undesirable abrupt increase in the sensitivity to the turning steerng input experienced when the vehicle speed is increased is avoided, while a vehicle behaviour corresponding to the rotation speed or rate of operation of the steering wheel is obtained to ensure a high steering stability during the high speed running of the vehicle.

In the event that the vehicle has been turned unintentionally due to a disturbance such as ruts on the road surface or the lateral wind against the will of the driver who wishes to keep the course, the steer angle of rear wheels is automatically controlled upon detection of a physical amount related to the lateral displacement of the vehicle caused by the disturbance, so that the lateral displacement of the vehicle due to the disturbance is minimized. It is to be noted also that any abnormality such as an excessive increase of the steer angle of rear wheels is prevented because the control ismade in such a manner as to attain a coincidence between the command steer angle and the actually measured steer angle.

This fourth aspect of the invention can be embodied in the following form. Namely, the control means has such a dead control function as to control the actuator mechanism in such a manner as not to allow the generation of rear wheel steer angle when the steering wheel displacement signal is below a predetermined level.

This arrangement offers the following advantages. Namely, when the front wheels are forcibly turned by, for example, road surface roughness regardless of the steering operation of the driver, the steering wheel displacement signal is slightly changed irrespecitive of the drivers will. This small change in the steering wheel dislacement signal undesirably triggers the control of steer angle of rear wheels, thus provided undesirable steering effect. In the described form of the fourth aspect, this problem is avoided by virture of the dead zone of the control means which prevents the actuator mechanism from operating when the steering wheel displacement signal is below a predetermined level.

In addition, the control of the steer angle of rear wheels is freed from the unfavourable effects of hysteresis factors such as mechanical play or friction involved by the front wheel steering system, which factors tend to cause an unstable state in the rear wheel steering system particularly in the region of small steering wheel displacement. The band of the dead zone may be selected to be wide if desired by the driver, so that the steer angle of rear wheels is maintained at zero thereby to realize the same steering characteristics as the conventional vehicles in which only the front wheels are steerable, whenever the vehicle running velocity is below a predetermined level.

Preferred embodiments of the inventio will be described hereinunder with reference to the accompanying drawings.

Figure 5:
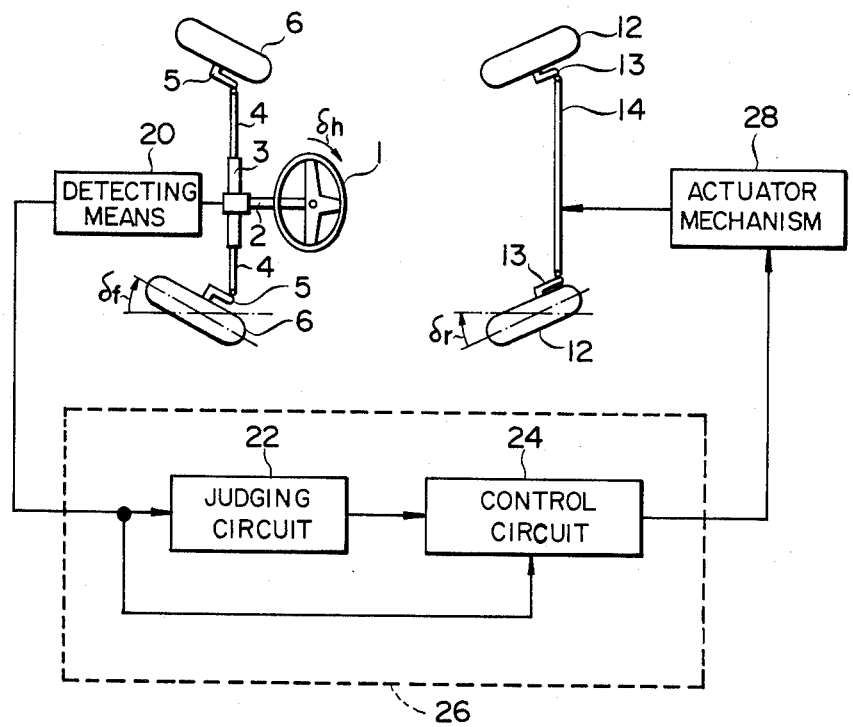
FIG. 5 is a block diagram of a first basic embodiment of the invention.

FIG. 5 is a schematic illustration of a basic circuit embodying the invention connected to the steering system of a 4-wheel steering vehicle.

A steering wheel 1 is connected through a shaft 2 to a gear box 3 to both ends of which are connected linkages 4 each of which in turn is connected to a corresponding front wheel 6 through a knuckle arm 5. Similarly, rear wheels 12 are connected to both sides of a rear wheel steering system which includes knuckle arms 13 and linkages 14.

A steering wheel displacement detecting means 20 connected to the shaft 2 is adapted to continuously detect the amount of operation or displacement of the steering wheel 1. The detecting means 20 is connected to an actuator mechanism 28 through a control means 26 which is constituted by a judging circuit 22 and a control circuit 24.

The judging circuit 22 is adapted to judge the angular frequency $\omega$, i.e., the rotation speed or rate of operation of the steering wheel, on the basis of the steering wheel displacement signal delivered by the detecting means 20. Upon receipt of the result of the judgement from the judging circuit 22 and the steering wheel displacement signal, the control circuit 24 produces a control signal which acts as follows depending on whether the steering wheel is being operated quickly or slowly. Namely, when the rotation speed or rate of operation of the steering wheel is high, the control signal serves such as to form a steer angle of rear wheels corresponding to the level of the steering wheel displacement signal, in the direction counter to the direction of steer angle of front wheels such that the steer angle of rear wheels is increased in accordance with the increase of the steering wheel displacement signal. Conversely, when the steering wheel is being operated slowly, the control signal serves also to form a rear wheel steer angle corresponding to the level of the steering wheel displacement signal, in the same direction as the direction of the front wheel steer angle. The actuator mechanism 28 controls the direction and steer angle of rear wheels in accordance with this control signal.

A practical embodiment of the invention will be described hereinunder. In the following description, the same reference numerals are used to denote the same parts or elements as those appearing in FIG. 5.

Figure 6:
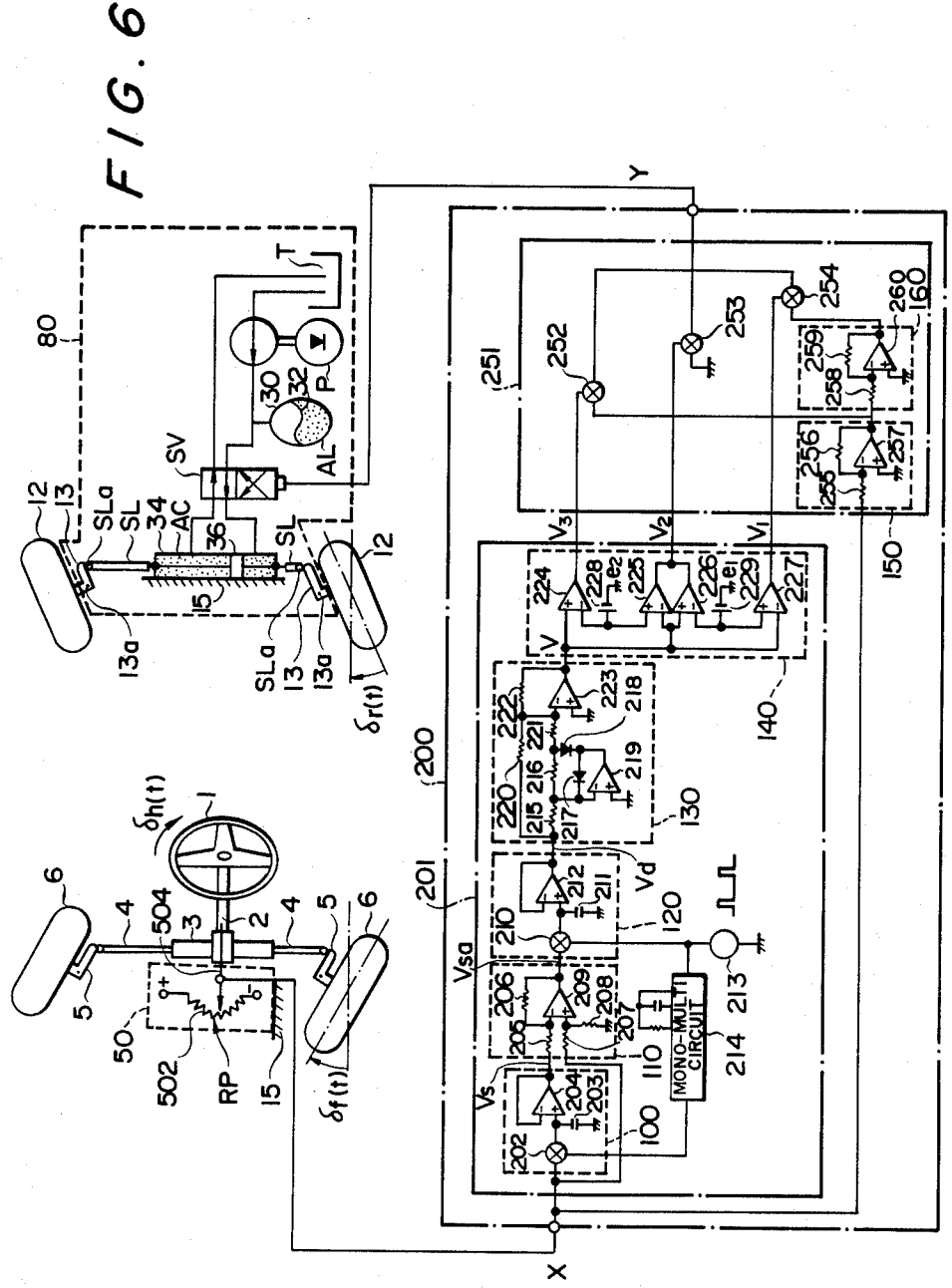
FIG. 6 is a circuit diagram of a first practical embodiment.

FIG. 6 is a circuit diagram of a first practical embodiment of the rear wheel steer angle controlling apparatus in accordance with the invention. This apparatus has a detecting means 50 for detecting the rotation angle of the steering wheel 1, a judging circuit 201 connected to the detecting means 50 and adapted to judge the rotation speed or rate of operation of the steering wheel, i.e., the angular frequency of rotation of the steering wheel, as the rate of change in the steering wheel displacement signal derived from the detecting means 50, a control circuit 251 adapted to produce a control signal corresponding to the speed of operation of the steering wheel in accordance with the output signal of the judging circuit 201, and an actuator mechanism 80 carried by the chassis of the vehicle and connected to the control circuit 251 such as to produce a force in accordance with the control signal from the control circuit and to transmit this force to the rear wheels so as to produce a steer angle for the rear wheels, such that, when the steering wheel is operated slowly, i.e., when the anglar frequency is low, the rear wheels are steered in the same direction as the steer of the front wheels, whereas, when the steering wheel is operated quickly, i.e., when the angular frequency is high, the rear wheels are steered in the direction opposite to the direction of steer of the front wheels.

The judging circuit 201 and the control circuit 251 in combination constitute a signal processing circuit 200.

The detecting means 50 is constituted by a rotary potentiometer RP composed of an arcuate resistor 502 and a slider 504 and fixed to the chassis 15 of the vehicle. The slider 504 has one end which is attached to the end of the shaft 2. A predetermined voltage is applied to the rotary potentionmeter RP. As the shaft 2 rotates in accordance with the angle $\delta h(t)$ of rotation of the steering wheel 1, the other end of the slider 504 slides along the resistor 502, so that a voltage signal corresponding to the angle δh(t) of the steering wheel 1 is derived as the steering wheel angle signal from the detecting means.

This steering wheel displacement signal is a voltage signal proportional to the angle δh(t) of rotation of the steering wheel 1, and has positive (plus) and negative (minus) signs corresponding to clockwise and counterclockwise rotation of the steering signal 1 from a reference position expressed by δh(t)=0 which in turn corresponds to the front wheel steer angle δf(t)=0 with respect to the direction of straight running of the vehicle.

The judging circuit 201 is constituted by a first sample hold circuit 100, a differential amplifier circuit 110, a second sample hold circuit 120, an absolute value circuit 130, an oscillator 213, a monostable multivibrator (referred to as "mono-multi circuit", hereinunder) 214 and a comparator circuit 140.

In order to judge the rotation speed or rate of operation of the steering wheel 1 on the basis of the steering wheel angle signal derived from the detecting means 50, the judging circuit 201 produces a changing rate signal by determining the variance of the steering wheel angle signal in a predetermined period, and compared the absolute value of a voltage signal corresponding to this changing rate signal with a predetermined voltage level.

Figure 7A:
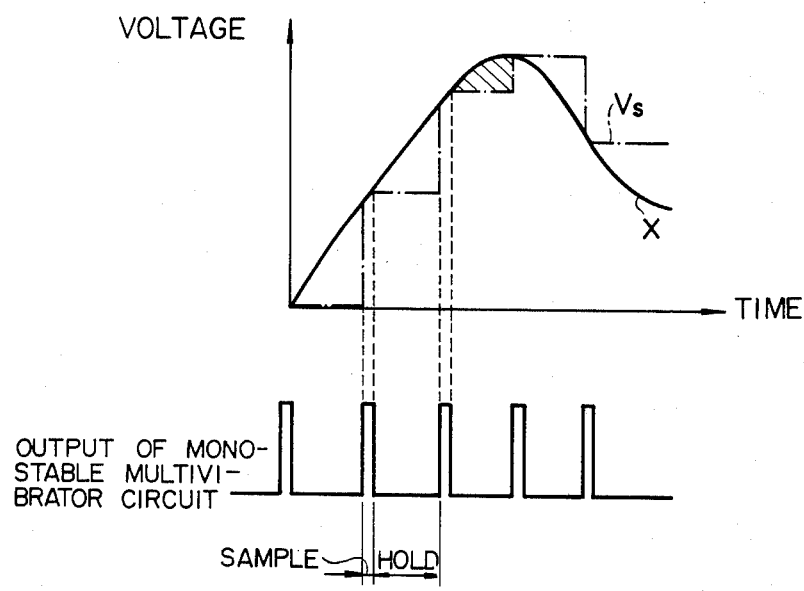
FIGS. 7A and 7B are diagrams showing waveforms of output signals from respective constituents of the first practical embodiment: in particular the output from a first sample hold circuit, a steer angle signal, output from a mono-multi circuit, output from a differential amplifier circuit, output from a second sample hold circuit and output from an oscillator.

The steering wheel angle signal derived from the detecting means 50 is delivered to an input terminal of an analog switch 202 of a first sample hold circuit 100 and also to a resistor 207 of the differential amplifier circuit 110. The first sample hold circuit 100 is constituted by the analog switch 202 having a control terminal connected to the mono-multi circuit 214, a capacitor 203 and an operation amplifier 204. In operation, the first sample hold circuit samples the steering wheel angle signal by the analog switch 202 which is opened and closed by a pulse signal from the mono-multi circuit 214, and holds the sampled signals in the capacitor 203. Therefore, in the first sample hold circuit 100, the steering wheel angle signal X which is a continuous signal is sectioned into stepped voltage signal Vs by the pulse signal of a predetermined period derived from the mono-multi circuit 214, as shown in FIG. 7A.

The differential amplifier circuit 110 is composed of the operation amplifier 209 and resistors 205, 206, 207 and 208. The stepped voltage signal Vs outputted from the first sample hold circuit 100 is delivered to one end of the resistor 205, while the steering wheel angle signal X from the detecting means 50 is delivered to one end of the resistor 207. The differential amplifier circuit 110 conducts a computation using these two signals Vs and X.

Figure 7B:
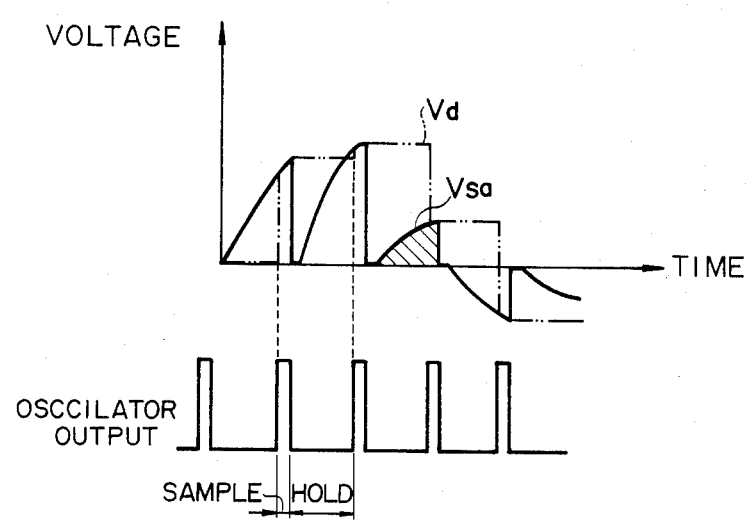

Therefore, the differential amplifier circuit 110 produces, as shown in FIG. 7B, a saw-tooth voltage signal Vsa which is formed as a result of subtraction of the output voltage signal Vs of the sample hold circuit 100 from the steering wheel angle signal X. The voltage signal Vsa thus obtained corresponds to the value of change in the steering wheel angle signal X per unit time, i.e., the changing rate signal.

As in the case of the first sample hold circuit 100, the second sample hold circuit 120 is constituted by an analog switch 210, a capacitor 211 and an operation amplifier 212. An input terminal of the analog switch 210 receives a saw tooth voltage signal Vsa from the differential amplifier 110, while the control terminal of the analog switch 210 receives a pulse signal from the oscillator 213. The second sample hold circuit 120 operates to sample the voltage signal Vsa from the differential amplifier when the pulse signal, which is delivered by the oscillator 213 and rises only for a short time, takes the ON-state, and holds the sampled voltage signal in the capacitor 211. The output pulse signal from the oscillator 213 is supplied to the analog switch 202 through the mono-multi circuit 214 which operates in response to the negative edge trigger (rise of signal level), and also to an analog switch 210. Therefore, the analog switch 202 is turned on immediately after the analog switch 210 is turned off from the onstate.

In consequence, the second sample hold circuit 120 produces a voltage signal Vd for each of successive periods, in accordance with the changing rate signal delivered by the differential amplifier circuit, as shown in FIG. 7B. In other words, the second sample hold circuit 120 produces a voltage signal Vd for each of successive periods in accordance with the rotation speed or rate of operation of the steering wheel in each period, on the basis of the steering wheel angle signal X derived from the detecting means 50.

In FIGS. 7A and 7B, the time interval between successive pulses produced by the mono-multi circuit 214 and that of the pulses produced by the oscillator are illustrated to be large, for the simplification of the explanation. Actually, however, the frequency of these pulse signals are selected to be about $10^3$ times higher than the frequency of the steering wheel angle signal.

Figure 8:
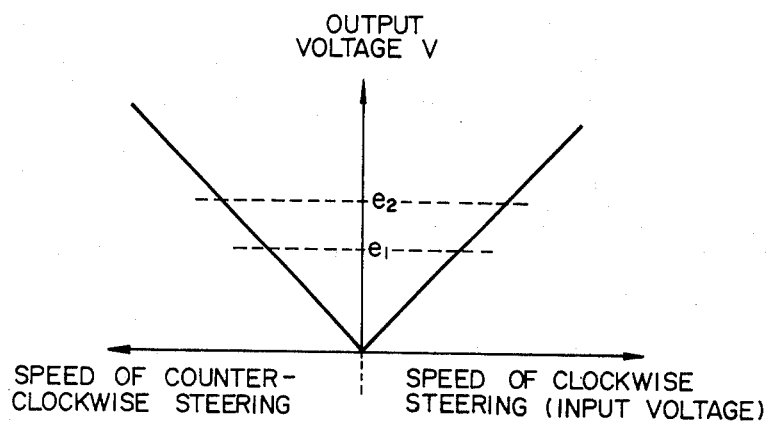
FIG. 8 is a diagram showing the waveform of the output from an absolute value circuit in the first practical embodiment.

The absolute vlaue circuit 130 includes resistors 215, 216, 220, 221 and 222, diodes 217 and 218, and operation amplifiers 219 and 223, and is adapted to output the absolute value of the voltage signal Vd derived from the second sample hold circuit 120 and corresponding to the speed of operation of the steering wheel in each period. As will be seen from FIG. 8, the absolute value circuit 130 produces a positive voltage in the positive gradient in response to clockwise steering wheel operation and a positive voltage in negative gradient in response to counter-clockwise steering wheel operation, thus delivering only positive voltage V.

The comparator 140 is constituted by operation amplifiers 224, 225, 226 and 227, and voltage sources 228, 229 which are adapted to produce positive voltages. The comparator 140 compares the output voltage v of the absolute value circuit 130 with the voltage levels e1 and e2 (e1<e2) which are given beforehand by the voltage sources 228 and 229. The operation amplifier 224 is constituted by a comparator which has a non-inversion input terminal (positive terminal) for receiving a positive output voltage V from the absolute value circuit 130 and an inversion input terminal (negative terminal) which receives the positie voltage e2 from the voltage source 228. As will be seen from FIG. 9C, the operation amplifier 224 produces a voltage signal $V_3$ of a high level, only when the positive voltage e2 from the voltage source 228 is exceeded by the output voltage V from the absolute value circuit 130 corresponding to the speed of operation of the steering wheel in each period.

Figure 9:
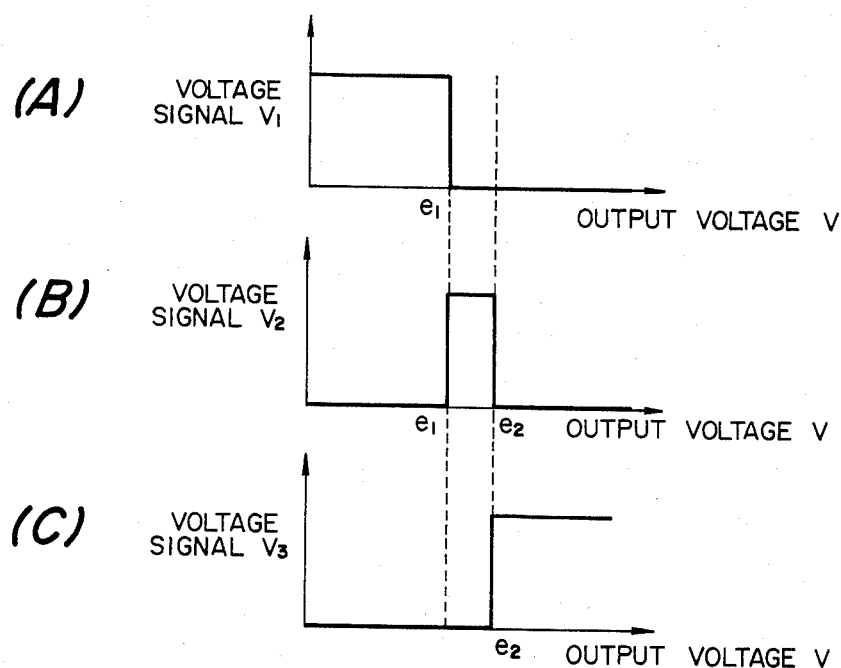
FIGS. 9A, 9B and 9C are diagrams showing the waveforms of outputs from a comparator circuit in the first practical embodiment.

The operation amplifiers 225 and 226 in combination constitute a wind comparator. The negative terminal of the operation amplifier 225 and the positive terminal of the operation amplifier 226 are connected commonly such as to receive the output voltage V from the absolute value circuit 130. The positive termnal of the operation amplifier 225 receives the positive voltage e2 from the voltage source 228, while the negative terminal of the operation amplifier 226 receives the positive voltage e1 from the voltage source 229. As stated before, the positive voltages e1 and e2 are selected to meet the condition of e1<e2. The output terminals of the operation amplifiers 225 and 226 are connected to each other. As shown in FIG. 9B, a voltage signal $V_2$ of a high level is produced only when the output voltage V from the absolute value circuit 130 representing the speed of operation of the steering wheel in each period meets the condition of e1≦V≦e2. The operation amplifier 227 is composed of a comparator having a negative terminal for receiving the output voltage V from the voltage source 229 and a positive terminal for receiving the positive voltage e1 from the voltage source 229. As shown in FIG. 9A, the operation amplifier 227 produces a voltage signal $V_1$ of a high level only when the output voltage V from the absolute value circuit 130 representing the rotation speed or rate of operation of the steering wheel in each period is exceeded by the positive voltage e1 from the voltage source 229.

The operation of the judging circuit 201 having the described construction is as follows. Upon receipt of the steering wheel angle signal from the detecting means 50, the judging circuit 201 determines the value of change of the steering wheel angle signal for each period, thus forming a steering signal angle changing rate signal, and compares the absolute value of the voltage signal corresponding to the changing rate signal with a predetermined voltage level. Through this comparison, the judging circuit 201 judges whether the rotation speed or rate of operation of the steering wheel is high or low, and produces a high level voltage signal from the operation amplifeir 227 when the speed of operation of the steering wheel is high and a high level voltage signal from the operation amplifier 224 when the operation speed of the steering wheel is high. When the operation speed of the steering wheel is intermediate between the high and low speeds mentioned above, a high voltage signal is outputted from the operation amplifiers 225 and 226 which are connected to each other.

The control circuit 251 is composed of inversion amplifier circuits 150, 160 and analog switches 252, 253 and 254, and produces a control signal in accordance with the steering wheel angle signal from the detecting means 50 and the voltage signals $V_1$, $V_2$ and $V_3$ from the judging circuit 201.

The control terminal of the analog switch 252 receives a voltage signal $V_3$ from the operation amplifier 224 of the judging circuit 201, while the input terminal of this analog switch receives the output from the inversion amplifier circuit 150. On the other hand, the control terminal of the analog switch 253 receives the voltage signal $V_2$ from the operation amplifiers 225, 226 of the judging circuit 201, while the input terminal of this analog switch is grounded. The analog switch 254 has a control signal which receives a voltage signal $V_1$ from the operation amplifier 227 of the judging circuit 201, and an input terminal which receives the output signal from the inversion amplifier circuit 160. The inversion amplifier circuit 150 is composed of an operation amplifier 257, an input resistor 255 and a feedback resistor 256. Upon receipt of the steering wheel angle signal from the detector 50 at one end of the input resistor 255, the inversion amplifier circuit 150 inverts and amplifies this signal by an amplification factor $K_A$ which is determined by the resistance ratio between the input resistor 255 and the feedback resistor 256, i.e., multiplies the steering wheel angle signal with a factor expressed by $-K_A$.

Similarly to the inversion amplifier circuit 150, the inversion amplifier circuit 160 is composed of an operation amplifier 260, an input resistor 258 and a feedback resistor 259. Upon receipt of the steering wheel angle signal from the detecting means 50, the inversion amplifier circuit 160 inverts and amplifies the stering wheel angle signal by an amplification factor 1 which is determined by the resistance ratio between the input resistor 258 and feedback resistor 259, i.e., multiplies the steering wheel angle signal with $-1$.

The operation of the control circuit 251 having the described construction will be explained hereinunder.

When the steering wheel 1 is being operated at a high rotation speed or rate, only the operation amplifier 224 of the judging circuit 201 produces its output voltage signal $V_3$ of high level such as to turn the analog switch 252 on. On the other hand, the steering wheel angle signal from the detecting means 50 is multiplied with the factor $-K_A$ by the inversion amplifier circuit 150, and the multiplied signal is delivered to the analog switch 252. Therefore, the control circuit 252 produces, as the control signal, a signal which is produced by multiplying the steering wheel angle signal with the factor $-K_A$, when the steering wheel is being operated at a high speed.

Conversely, when the steering wheel 1 is being operated at a low speed, only the operation amplifier 227 of the judging circuit 201 produces its output voltage signal $V_1$ of high level, thus turning the analog switch 254 on. On the other hand, the steering wheel speed signal from the detecting means 50 is multiplied with the factor $K_A$ by two inversion amplifier circuits 150, 160, and the multiplied signal is delivered to the analog switch 254. Therefore, when the rotation speed or rate of operation of the steering wheel is low, the control circuit 251 delivers, as the control signal, a signal which is formed by multiplying the steering wheel angle signal with the factor $K_A$.

When the rotation speed or rate of operation of the steering wheel falls intermediate between the high and low speeds mentioned above, only the operation amplifier 225 of the judging circuit 201 produces its output voltage $V_2$ of high level, thus turning the analog switch 253 on. Since the input terminal of this analog switch 253 is grounded, the control circuit 251 produces a voltage signal of zero volt as the control signal, when the rotation speed or rate of the steering wheel is intermediate between the high and low speeds.

The actuator mechanism 80 has the following parts: a device P for generating hydraulic pressure, an accumulator AL, a flow rate control valve SV, an oil reservoir T connected to the suction side of the hydraulic pressure generating device P and adapted for returning unnecessary oil, an actuator AC connected to the flow rate control valve SV through pipes, knuckle arms 13,13 having pivot points 13a, 13a, and a steering linkages SL,SL to which are connected the knuckle arms 13,13 through respective pin joints SLa, SLa.

The hydraulic pressure generating means P is constituted by a vane pump driven by the engine through pulleys, and is adapted to accumulate a predetermined pressure in the accumulator AL. This vane pump is operated at speeds corresponding to the speed of the engine.

The accumulator AL is composed of a metallic vessel having a predetermined internal volume. The space in the metallic vessel 30 is divided into two chambers by a rubber diaphragm 32: namely, a first chamber filled with nitrogen gas of a predetermined pressure and a second chamber which is connected through a pipe to the discharge port of the vane pump constituting the hydraulic pressure generating device P. The accumulator AL is intended for use as a back-up which compensates for any shortage of the output rate from the vane pump in view of the demand by the rear wheel steer angle controlling apparatus of the vehicle. Thus, the provision of the accumulator AL permits a reduction in the size and capacity of the vane pump. The accumulator AL is connected to the flow rate control valve SV through a pipe and supplies the hydraulic pressure accumulated in the accumulator AL to the actuator AC at a rate determined by the degree of opening of the flow rate control valve SV.

The flow rate control valve SV is constituted by a spool valve having a cylinder provided with an inlet port and an outlet port and a spool for making an axial displacement in the cylinder. The effective area of a restriction formed between the spool and the outlet port is changed in accordance with the control signal from the control circuit 251, thereby controlling the flow rate of the hydraulic oil flowing through the flow rate control valve SV.

The actuator AC is constituted by a cylinder 34 connected to the outlet port of the flow rate control valve SV through a pipe, and a piston 36 movable axially in the cylinder 34. The cylinder 34 is fixed to the chassis B of the vehicle, while both ends of the piston 36 are connected to left and right steering linkages SL, SL.

The described embodiment of the rear wheel steer angle controlling apparatus of the invention operates in a manner which will be explained hereinunder.

The following description is based upon an assumption that the steering wheel 1 is rotated clockwise by an angle $\delta h(t)$, for the purpose of simplification of the explanation.

A clockwise rotation of the steering wheel 1 causes a rotation of the shaft 2 in the same direction. As a result, the slider of the rotary potentiometer constituting the detecting means 50 connected to the end of the shaft 2 is made to slide along the resistor, so that the detecting means 50 produces a steering wheel angle signal X corresponding to the angle $\delta h(t)$ of rotation of the steering wheel 1. As in the case of the known steering system, the front wheels 6 are turned clockwise such as to form a steer angle $\delta f(t)$. The steering wheel angle signal X is delivered both to the judging circuit 201 and the control circuit 251 of the signal processing circuit 200.

The judging circuit 201 determines the variance of the steering wheel angle signal X for predetermined period, thus producing a changing rate signal corresponding to the rate of change of the steering wheel angle signal X, and compares the absolute value of the voltage signal corresponding to the changing rate with a predetermined voltage level, thus judging the rotation speed or rate of operation of the steering wheel in each period. In response to the speed of operation of the steering wheel judged by the judging circuit 201, the control signal produces a control signal $Y=K_4X$ obtained by multiplying the steering wheel angle signal X by the factor $K_4$ when the rotation speed or rate of operation of the steering wheel is low, whereas, when the speed of operation of steering wheel is high, produces a control signal $Y=-K_4X$ which is obtained by multiplying the steering wheel angle signal X with the factor $-K_4$. When the rotation speed or rate of operation of the steering wheel is intermediate between the high and low speeds mentioned above, the control circuit 251 produces a control signal which is expressed by $Y=0$.

The flow rate control valve SV of the actuator mechanism 80 is adapted to be operated by the control signal Y such as to selectively supply the hydraulic pressure from the accumulator AL into the actuator AC, thereby causing a pressure change in the cylinder of the actuator AC and, hence, a displacement of the piston. The displacement of the piston in turn causes a movement of the steering linkages SL so as to rotate the knuckle arms 13 about their pivot points 13a, so that the rear wheels 12 are turned to form a rear wheel steer angle $\delta r(t)$. The actuator mechanism 80 is so arranged that, when the control signal Y takes a positive value, the rear wheels are turned in the same direction as the rotation of the steering wheel 1, i.e., clockwise, by the angle $\delta r(t)$ which corresponds to the voltage formed by multiplying the steering wheel angle signal by a factor $K_4$. To the contrary, when the control signal Y takes a negative value, the rear wheels 12 are turned in the direction counter to the direction of rotation of the steering wheel 1, i.e., counter-clockwise, by the rear wheel steer angle $\delta r(t)$ corresponding to the voltage formed by multiplying the steering wheel angle signal by the factor $K_4$. When the control signal Y is zero, the rear wheels are not steered, so that the rear wheel steer angle $\delta r(t)$ is zero.

Therefore, in the described embodiment of the invention, the rear wheels are steered in the same direction as the front wheels and in the counter direction to the front wheels, respectively, when the rotation speed or rate of operation of the steering wheel is low and high, and, in each case, the angle of steer of rear wheels is controlled in proportion to the angle of steer of front wheels. In addition, when the steering wheel is operated at a speed intermediate between the high and low speeds mentioned above, the rear wheels are not steered so that the steer angle of rear wheels is maintained at 0 (zero).

Consequently, the described embodiment offers an advantage in that both the running stability of the vehicle during straight running and sensitivity to the steering input for turning of the vehicle are enhanced, because the direction and the magnitude of the steer of the rear wheels are controlled in accordance with the rotation speed or rate of operation of the steering wheel.

In addition, since both the direction and magnitude of the steer angle of rear wheels can be determined through judgement of the rotation speed or rate of operation of the steering handle from a single factor, i.e., the steering wheel angle signal detected by the detector. It is, therefore, not necessary to employ both of the means for detecting the speed of the steering wheel operation and the means for detecting the angle of rotation of the steering wheel. This is quite convenient from the view point of easiness of mounting of the apparatus on a vehicle.

Although the described embodiment employs a rotary potentiometer as the detecting means, this is not exclusive and the detecting means may be constituted by a suitable alternative device such as a rotary encoder adapted to generate pulses in accordance with the rotation of the steering wheel, or the speed of rotation of the steering handle may be sensed directly by a speed sensor.

The rotation speed or rate of operation of the steering wheel may be determined by differentiating the steering wheel angle signal by time, by means of a differentiator used as the judging circuit. Alternatively, the number of comparators in the comparator 140 may be increased to allow a further classification of the steering wheel speed into greater number of classes of speed in accordance with which the rear wheels are steered.

If necessary, the actuator mechanism may be controlled by a suitable feedback of the steer angle of rear wheels. To this end, a detecting means for detecting the actual steer angle of rear wheels is provided to produce the rear wheel steer angle which is then compared with a command signal, and the rear wheels are steered such as to nullify the offset of the actual rear wheel steer angle from the command angle. If a large electric power is necessary for such a feedback control, a suitable measure may be taken such as amplification of the offset signal by an amplifier.

Figure 10:
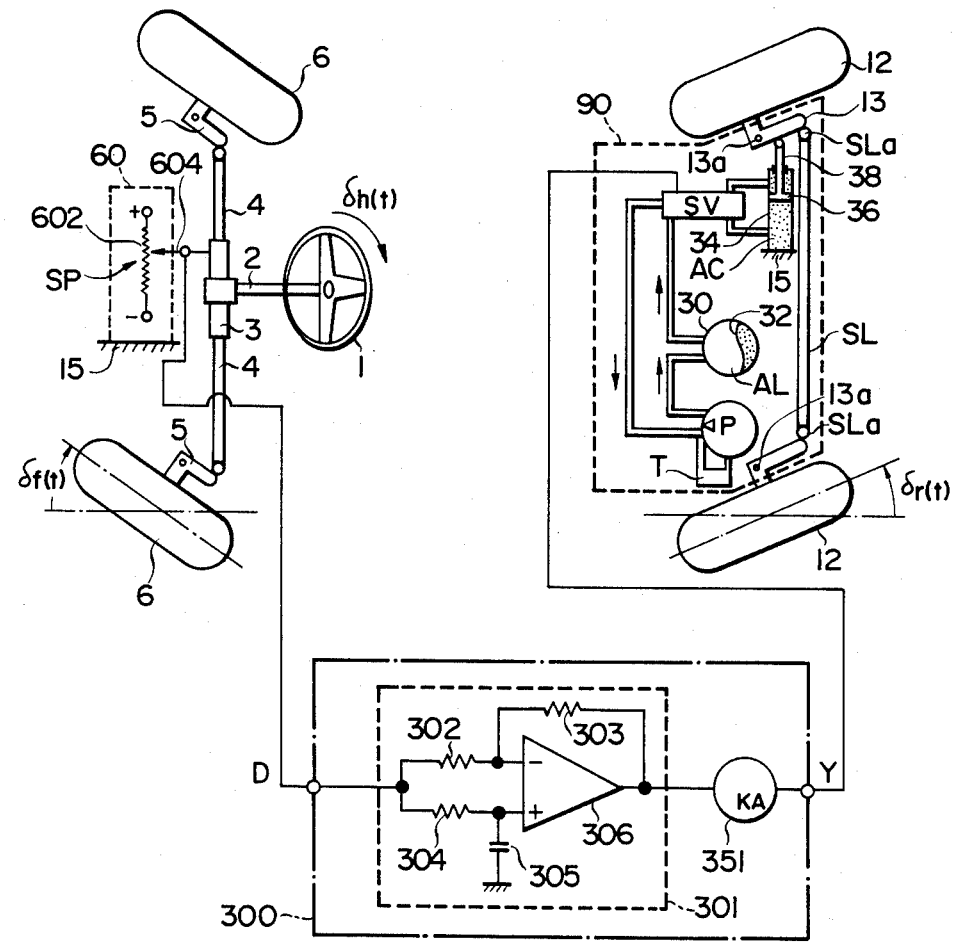
FIG. 10 is a block diagram of a second practical embodiment of the invention.

A second practical embodiment of the invention will be described hereinunder. As will be seen from the circuit diagram shown in FIG. 10, the second practical embodiment of the rear wheel steer angle controlling apparatus of the invention has the following cnstituents: a detecting means 60 which is designed for detecting the displacement of the steerng wheel 1; a signal processing circuit 300 connected to the detecting means 60 and adapted for judging the rotation speed or rate of operation of the steering handle from the angular frequency of rotation of the steering wheel on the basis of the displacement signal from the detecting means, and adapted to produce a control signal which has a phase delay corresponding to the angular velocity with respect to the displacement signal as the input, the phase delay being limited not to exceed 180°, the control signal being formed by amplifying the displacement signal as the input with an amplification factor which is constant regardless of the angular frequency; and an actuator mechanism 90 connected to the signal processing circuit 300 and fixed to the chassis of the vehicle, the actuator mechanism being adapted to produce a force corresponding to the control signal and to transmit this force to the rear wheels thereby forming a rear wheel steer angle such that, in the low region of the angular frequency corresponding to the low speed of operation of the steering wheel, the rear wheels are steered in the same direction as the steer angle of front wheels, whereas, in the high region of the angular frequency corresponding to high speed of operation of the steering wheel, the rear wheels are steered in the opposite direction to the steer angle of front wheels.

This second practical embodiment of the rear wheel steer angle controlling apparatus of the invention is discriminated from the first practical embodiment mainly by the following features:

(1) The signal processing circuit of this second practical embodiment is different from that 200 in the first practical embodiment in that it is designed to judge the rotation speed or rate of operation of the steering wheel from the angular frequency, without requiring the determination of the changing rate of the output of the detecting means.

(2) A phase shift of the displacement signal is effected to allow the production of the control signal corresponding to the rotation speed or rate of operation of the steering wheel.

The following description of the second practical embodiment, therefore, will be focussed mainly on these points of difference, and the parts or elements common to those of the first practical embodiment are not described in detail, because the same reference numerals as those in the first practical embodiment are used to denote such parts or elements.

The detecting means 60 is constituted by a linear potentiometer SP composed of a linear resistor 602 and a slider 604 and fixed to the chassis 15 of the vehicle. The slider 604 is fixed at its one end to a gear incorporated in the gear box 3. As the shaft 2 is rotated by an amount corresponding to the angle $\delta h(t)$ of rotation of the steering wheel 1, the rotary motion is converted into a linear motion of the gear fixed to the slider 604, through a motion converting mechanism such as a rack and pinion incorporated in a gear box 3. The linear potentiometer SP detects this linear motion as a displacement corresponding to the rotation angle $\delta h(t)$ of the steering wheel 1, and produces a corresponding voltage signal as a displacement signal D. In order to simplify the explanation, it is assumed here that the steering wheel 1 is continuously operated in the form of a sine wave at an angular frequency of $\omega$. Since the rotation angle $\delta h(t)$ of the steering wheel 1 is expressed as $\omega t$, the displacement of the steering handle corresponding to the rotation angle $\omega t$ from the reference position corresponding to the straight direction is expressed by $\delta h_0 \sin \omega t$, where $\delta h_0$ represents the amplitude of the steering wheel. Consequently, the displacement signal D outputted from the linear potentiometer SP is obtained as a continuous sine wave voltage signal having an amplitude $D_0$ corresponding to the amplitude of the steering wheel and angular frequency $\omega$, expressed by $D = D_0 \sin \omega t$.

The signal processing circuit is constituted by a phase shifting circuit 301 connected to the slider of the detecting means 60 and a coefficient device 351.

The phase shifting circuit is composed of an operation amplifier 306, resistors 302, 303 and 304, and a capacitor 305. The resistor 302 constituting an input resistor and the resistor 303 constituting a feedback resistor have an equal resistance value. The resistor 304 and the capacitor 305 constitute a circuit which corresponds to the judging circuit of the first practical embodiment. Resistors 302 and 303, operation amplifier 306 and the coefficient device 351 constitute a circuit corresponding to the control circuit.

When the angular frequency $\omega$ of the displacement signal D as the input is as small as nearly zero, the capacitor 305 of the phase shifting circuit 301 exhibits a reactance which approaches the infinity, so that the positive terminal of the operation amplifier 306 receives the displacement signal D through the resistor 304. The displacement signal D is supplied also to the input resistor 302. Since the resistance ratio between the input resistor 302 and the feedback resistor 303 is 1, a signal having a gain of $-1$ is obtained from the signal inputted to the negative terminal of the operation amplifier 306. On the other hand, a signal having a gain of 2 is produced from the signal delivered to the positive terminal of the operation amplifier 306. As a consequence, the phase shifting circuit 301 as a whole produces an output of a gain of 1 which is obtained by subtracting 1 from 2 $(2-1=1)$. Therefore, when the angular frequency of the displacement signal D is as small as nearly zero, an output signal D equal to the input displacement signal D is outputted from the phase shifting circuit 301.

On the other hand, when the angular frequency $\omega$ of the displacement signal D is as large as nearly infinity, the capacitor 305 is materially short-circuited and the condition is materially equivalent to the case where positive terminal of the operation amplifier 306 is grounded. In this case, only the negative terminal of the operation amplifier 306 receives the input signal, so that the phase shifting circuit 301 functions only as an inversion amplifier which provides a gain of −1 because the resistance ratio between the input resistor 302 and the feedback resistor 303 is 1. Therefore, when the angular frequency ω of the displacement signal D is as large as nearly infinity, an inverted signal −D is obtained in response to the inputted displacement signal D. Thus, the output signal has a phase delay of 180° with respect to the input signal.

By the principle as explained hereinbefore, the phase shifting circuit 301 produces an output with a phase delay with respect to the inputted displacement signal D, the phase delay varying within the range of between 0° and 180° in accordance with the angular frequency of the displacement signal D.

The coefficient device 351 amplifies the output signal from the phase shifting circuit 301 with a constant coefficient $K_A$, thus producing a control signal Y.

The actuator mechanism 90 includes a hydraulic pressure generator P, an accumulator AL, a flow rate control valve SV, an oil reservoir T connected to the suction side of the hydraulic pressure generator P and intended for returning unnecessary oil, an actuator AC connected to the flow rate control valve SV through pipes, knuckle arms 13,13 having respective pivot points 13a, 13a, and a steering linkage SL to which both knuckle arms 13, 13 are connected through pin joints SLa, SLa.

The hydraulic pressure generator P is constituted by a vane pump which is driven by the engine through pulleys, and is adapted to accummulate a predetermined pressure in the accumulator AL. The vane pump is operated at a speed corresponding to the speed of the engine operation.

The accumulator AL is composed of a metallic vessel 30 having a predetermined internal volume. The space in the metallic vessel 30 is divided by a rubber diaphragm into two chambers: namely, a first chamber filled with a gas such as nitrogen gas of a predetermined pressure, and a second chamber which is connected through a pipe to the discharge port of the vane pump constituting the hydralic pressure generating device P.

The accumulator AL is connected through a pipe to the flow rate control valve SV, and is adapted to supply the hydralic pressure accumulated in the accumulator to the actuator AC.

On the other hand, the flow rate control valve SV forms a restriction the area of which is varied in accordance with the control signal Y from the signal processing circuit 300 to control the flow rate of the hydraulic oil flowing therethrough.

Unlike the actuator of the first practical embodiment, the actuator AC of this second practical embodiment has a cylinder 34 fixed to the chassis 15 of the vehicle, a piston 36 movable in the cylinder 34 and a rod 38 connected at its one end to the piston 36 and at its other end to one of the knuckle arms 13. The cylinder 34 of the actuator AC is connected to the discharge port of the flow rate control valve SV. The actuator AC is disposed substantially in parallel with the steering linkage SL which is connected to both knuckle arms 13, 13 through the pin joints SLa, SLa. The end of the rod 38 extended from the piston 36 is connected to a portion of the knuckle arm 13 intermediate between the pivot point 13a and the pin joint SLa.

The operation of the second practical embodiment of the rear wheel steer angle control apparatus will be explained hereinunder.

The explanation will be made on an assumption that the steering wheel 1 is operated in the form of a continuous sine wave with an amplitude $\delta h_0$ and an angular frequency ω, i.e., when the steering wheel is operated by a steering wheel rotation angle $\delta h(t)$ expressed by $\delta h(t) = \delta h_0 \sin \omega t$. In response to this steering input, the detecting means 60 produces a displacement signal in the form of a continuous sine wave with an amplitude $D_0$ and angular velocity ω, expressed by $D = D_0 \sin \omega t$. On the other hand, the signal processing circuit 300 processes the displacement signal D in accordance with the angular frequency ω and produces a control signal Y.

The flow rate control valve SV of the actuator mechanism 90 allows the hydraulic pressure in the accumulator AL to be introduced into the actuator AC, while varying the opening area of the restriction in accordance with the control signal Y. As a result, the pressure in the cylinder of the actuator AC is changed to cause a movement of the piston, which in turn causes the knuckle arm 13 to rotate about the pivot point 13a. Since both knuckle arms 13, 13 are connected to each other through the steering linkage SL, both knuckle arms 13, 13 are rotated simultaneously to steer the rear wheels at a steer angle $\delta r(t)$. Needless to say, the front wheels 6 are steered in response to the operation of the steering wheel 1, so that a front wheel steer angle $\delta f(t)$ is generated in the same direction as the direction of rotation of the steering wheel 1.

A detailed explanation will be made hereinunder as to the relationship between the characteristics of the signal processing circuit and the rear wheel steer angle $\delta r(t)$, with specific reference to FIGS. 11A, 11B, 11C and 11D.

Figure 11A:
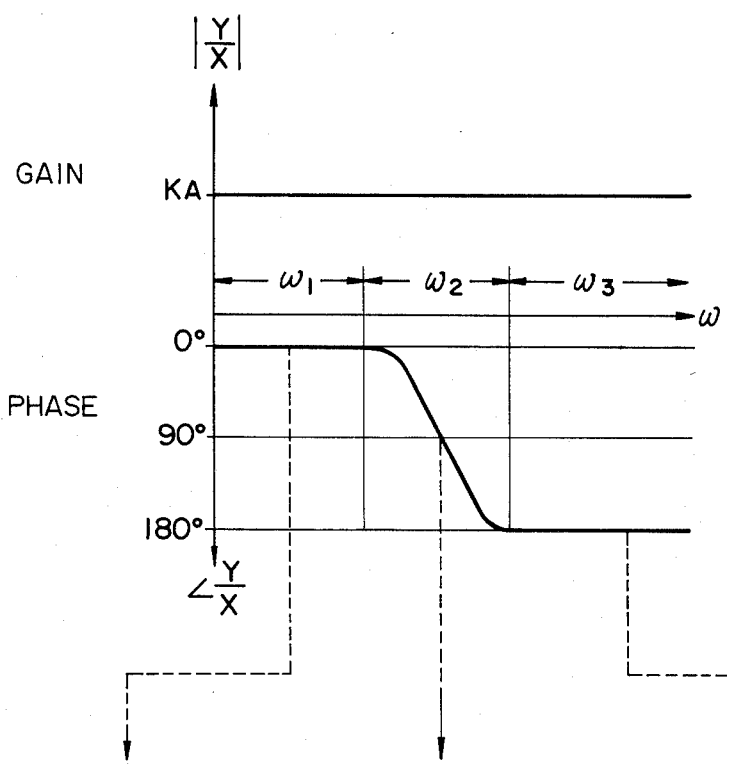
FIG. 11A is a diagram showing the gain and the phase of a sign processing circuit in the second practical embodiment.
Figures 11B, 11C, 11D:
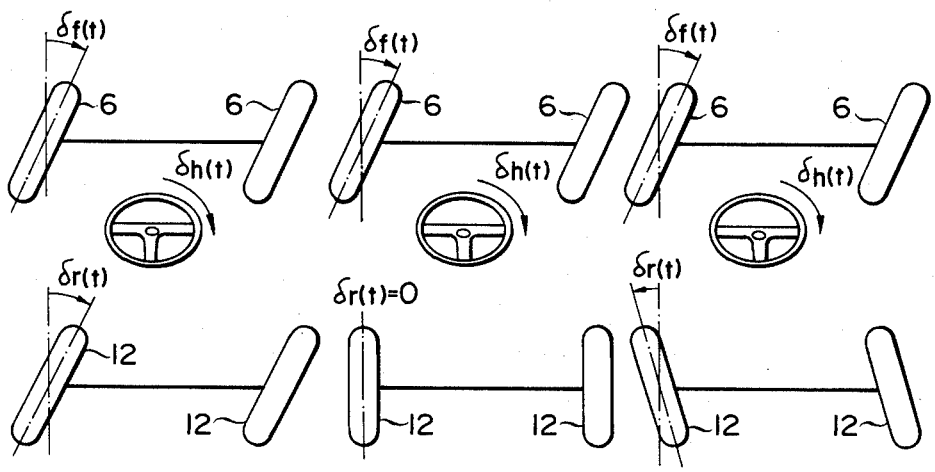
FIGS. 11b to 11D are illustrations of steer angles of front and rear wheels corresponding to the gain and phase shown in FIG. 11A.

FIG. 11A shows the characteristics of the signal processing circuit 300 used in the described embodiment. Upon receipt of the displacement signal $D = D_0 \sin \omega t$ as the input, the signal processing circuit 300 produces the control signal Y at a constant gain $K_A$ and with a phase delay which is increased from 0° to 180° as the angular frequency ω becomes greater. When the angular frequency ω of the displacement signal D falls within a low region $\omega_1$, the signal processing circuit produces, due to its characteristics, a signal obtained by multiplying the input signal D by $K_A$ as the output control signal Y. Thus, the output signal is expressed as $Y = K_A D$. As a result, the actuator mechanism operates to steer the rear wheels in accordance with the control signal Y such as to produce a steer angle $\delta r(t)$ of rear wheels 12 in the same direction as the steer angle $\delta f(t)$ of front wheels 6, as shown in FIG. 11B. The steer angle of rear wheels in this case is proportional to the steering wheel displacement.

Conversely, when the angular frequency ω of the displacement signal D falls within a high region $\omega_3$, the signal processing circuit produces, due to its characteristics, an output signal Y at a gain of $K_A$ with a 180° phase delay, i.e., a signal which is obtained by multiplying the input signal by $-K_A$. Thus, the output control signal in this case is expressed as $Y = -K_A D$. Consequently, the actator mechanism operates to steer the rear wheels 12 in accordance with the control signal Y such as to form a steer angle $\delta r(t)$ of the rear wheels 12 in the direction counter to the steer angle δf(t) of front wheels 6 and in proportion to the steering wheel displacement, as will be seen from FIG. 11D.

When the angular frequency ω of the displacement signal D falls in the medium region ω₂ between the regions ω₁ and ω₃, the signal processing circuit produces an output control signal Y with a phase delay with respect to the input signal within the range between 0° and 180°. Assuming here that the control signal Y outputted from the signal processing circuit has a phase delay of 90° with respect to the control signal Y, the rear wheels are steered at a time lag behind the steering of the front wheels, such that the steer angle δr(t) of rear wheels 12 becomes zero when the steer angle δf(t) of the front wheels takes the maximum value, as will be seen from FIG. 11C.

The foregoing explanation of operation of the second practical embodiment is based on an assumption that the steering wheel is operated continuously in the form of a sine wave.

A further explanation of the operation of the second practical embodiment will be made as to the case where the steering wheel is operated for the purpose of a lane change during running of the vehicle, with reference to FIGS. 12A, 12B and 12C. The operation explained in connection with these Figures applies also to the first practical embodiment and, hence, proves the practicalness of the invention.

Figure 12A:
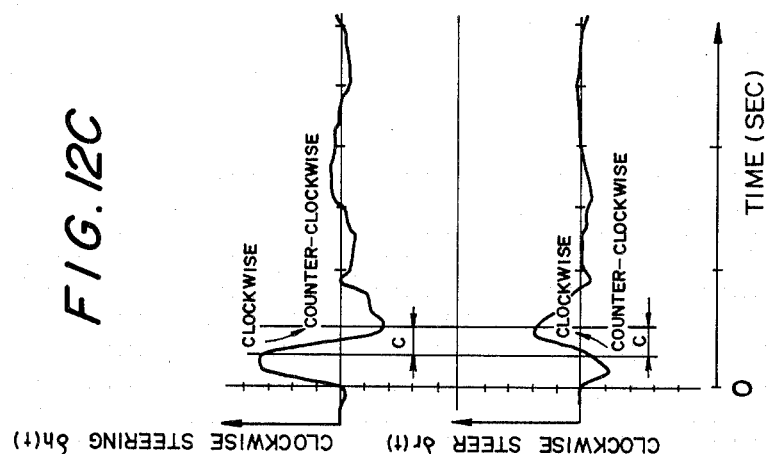
FIGS. 12A, 12B and 12C are diagrams showing how the steer angles of front and rear wheels are changed in relation to the steering wheel displacement for the purpose of an intentional lane change.
Figure 12B:
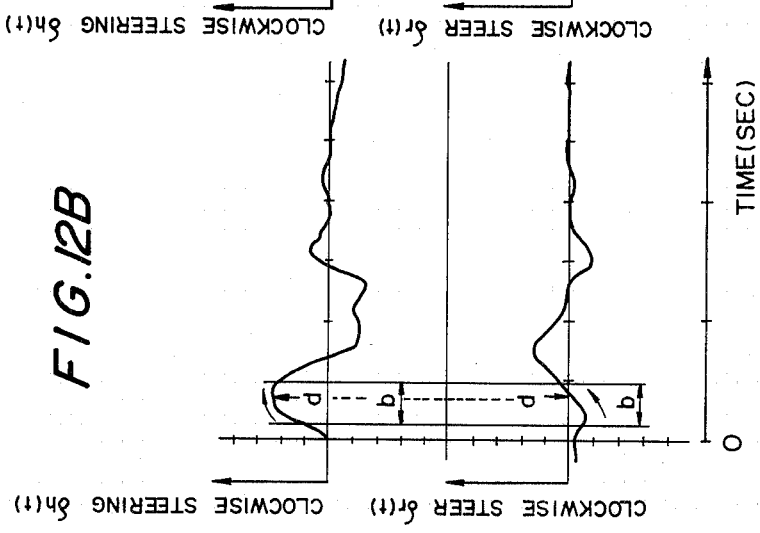
Figure 12C:
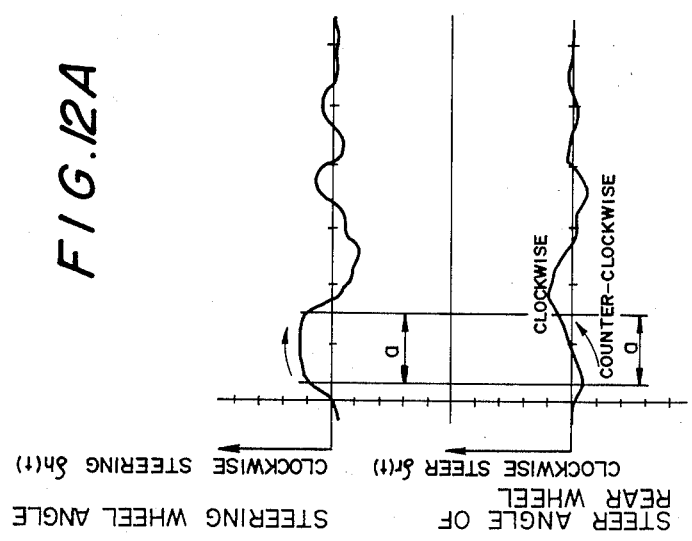

FIGS. 12A, 12b and 12C show waveforms of the signals representing the steering wheel rotation angle δh(t) and the rear wheel steer angle δr(t) in relation to time, as observed when the driver operate the steering wheel for an intentional lane change.

When the steering wheel is operated at a low speed clockwise, the rear wheels are steered in the same direction as the direction of rotation of the steering wheel, more particularly from the left to the right in this case, as in the region (a) in FIG. 12A. In contrast, when the steering wheel is operated at a high speed counterclockwisely from the right to the left, the rear wheels are steered in the direction counter to the direction of rotation of the steering wheel, more particularly clockwisely from the left to the right, as in the region (c) in FIG. 12C. When the steering wheel is operated at a medium speed between the low and high speeds mentioned above, the rear wheels are steered with a time lag behind the operation of the steering wheel, as in the region (b) of FIG. 12B. In this case, as stated before, the steer angle of rear wheel becomes zero when the angle of rotation of the steering wheel is maximized, provided that the phase delay is 90°, as shown by a point (d) in FIG. 12B. The front wheels are steered in the same direction as the rotation of the front wheels. Thus, this embodiment allows the control of the direction and magnitude of the rear wheel steer angle with respect to the front wheel steer angle, in accordance with the rotation speed or rate of operation of the steering wheel, i.e., the angular frequency of rotation of the steering wheel.

As will be seen from the foregoing description, according to the invention, both the running stability during straight running and the response to the steering input for turning the vehicle are improved, because the rear wheels are steered in the same direction as the steer of the front wheels when the steering wheel is operated slowly and in the opposite direction when the steering wheel is operated quickly.

It is to be noted also that the control apparatus in accordance with the second embodiment simplifies the construction of the signal processing circuit to facilitate the mounting of the apparatus on the vehicle, because the signal processing circuit is composed of a simple phase shiftig circuit having both a function of a judging circuit for judging the rotation speed or rate of operation of the steering wheel on the basis of the angular frequency of rotation of the steering wheel and the function of a control circuit for outputting a control signal corresponding to the rotation speed or rate of operation of the steering wheel, the phase shifting circuit being used in combination with a coefficient device.

Furthermore, the second practical embodiment of the invention is characterized in that the rotation speed or rate of operation of the steering wheel is judged on the basis of the angular frequency of rotation of the steerig wheel, and that the outputted control signal has a time lag with respect to the input displacement signal up to 180° in accordance with the increase of the angular frequency such as to have an absolute value which is obtained by multiplying the inputted displacement signal with a coefficient which is constant regardless of the angular frequency. Therefore, the construction of the phase shifting circuit used in this embodiment is only illustrative, and any circuit capable of judging the rotation speed of steering wheel on the basis of the angular frequency of rotation of the steering wheel can be used in place of the described phase shifting circuit.

In addition, the actuator mechanism in this second practical embodiment may be provided with a means for detecting the actual angle of steer of rear wheels similar to that explained before in connection with the first practical embodiment. By using such a means, it is possible to effect a feedback control in such a manner that the flow rate control valve for determining the rear wheel steer angle is controlled in accordance with an offset signal representing the offset of the output of this detecting means from the control signal delivered by the signal processing circuit. In the second practical embodiment, the linear motion obtained through a motion converting mechanism such as a rack and pinion incorporated in the gear box is detected in place of the rotation angle of the steering wheel as the steering wheel displacement. This, however, is not exclusive and the steering wheel displacement can be detected through the detection of angle of rotation of the knuckle arm or the steer angle of front wheels.

Although a linear or rotary potentiometer is used as the detecting means in the described embodiments, it is possible to use various sensors such as a magnetic sensor responsive to a change in the magnetic flux corresponding to the angle of rotation of the steering wheel, an optical sensor or a telemeter, as the detecting means for detecting the steering wheel displacement.

Furthermore, the described construction of the control means is not exclusive and various other circuits are usable provided that such circuits are capable of judging the rotation speed or rate of operation of the steering wheel and outputting a control signal corresponding to the result of the judgement.

It is to be understood also that the analog circuits used in the described practical embodiments may be substituted by digital circuits employing, for example, a microcomputer.

The constructions of the actuator mechanisms used in the described practical embodiments are also illustrative, and various mechanisms capable of controlling the rear wheel steer angle by a force corresponding to the control output signal from the control means can be used as the actuator mechanism. For instance, the actuator mechanism may be constituted by a hydraulic circuit, pneumatic circuit, pneumatic actuator, hydraulic actuator or an electromagnetic actuator.

In the first practical embodiment, the rear wheel steer angle is controlled upon detection of the angle of rotation of the steering wheel, whereas, in the second practical embodiment, the control is made upon detection of the steering wheel displacement. However, the first embodiment may be modified such that the control is effected upon detection of the steering wheel displacement. Similarly, the second embodient can be modified such as to effect the control upon detection of the angle of rotation of the steering wheel. Thus, both types of detecting means are interchangeable between both practical embodiments.

In each of the practical embodiments, the amplification factor is selected to be $-K_A$ and $K_A$, respectively, when the angular frequency $\omega$ is large and small. Therefore, the transfer function $G(S)$ corresponding to the formula (4) in these embodiments can be expressed as follows:

$$G(S) = K_A - \frac{2K_A}{1 + TS} \cdot TS \qquad (36)$$

Figure 13:
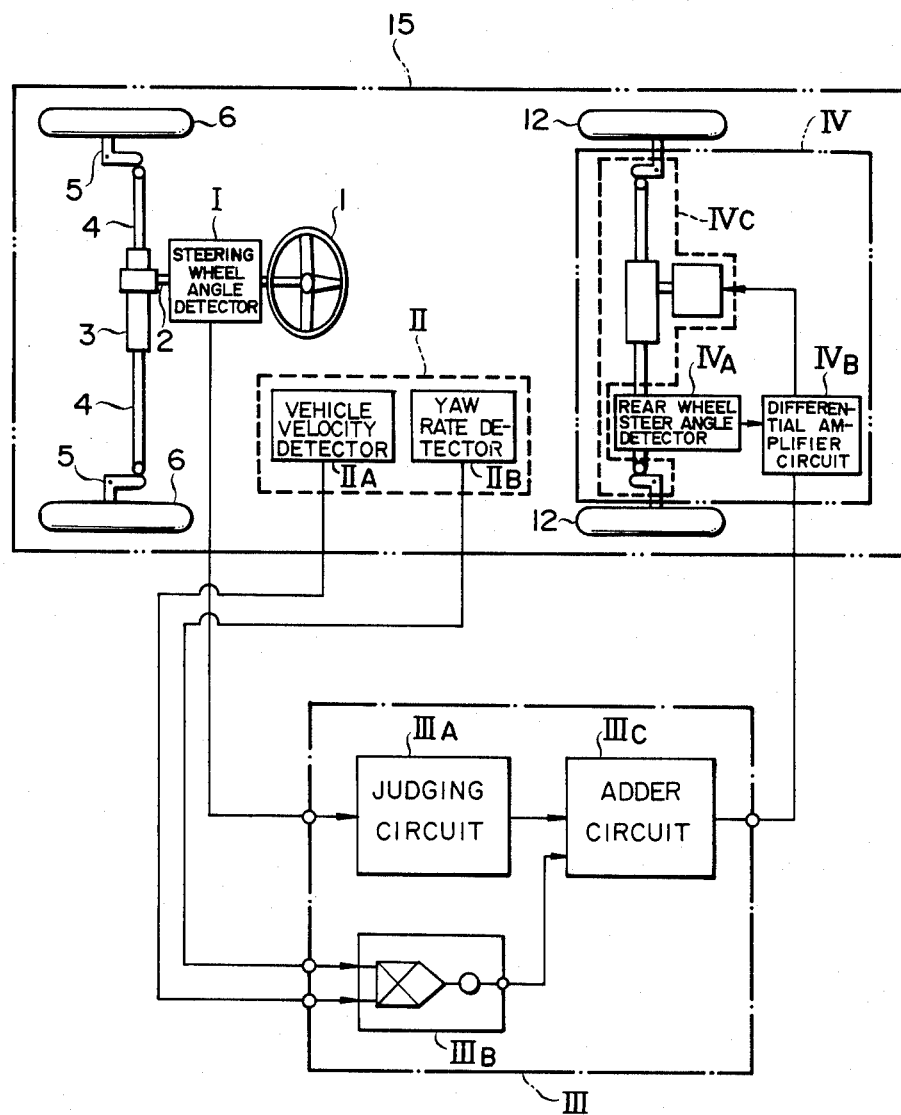
FIG. 13 is a block diagram of a second basic embodiment.

A second basic embodiment of the invention will be described hereinunder with reference to FIG. 13.

The second basic embodiment of the rear wheel steer angle controlling apparatus for 4-wheel steering vehicles has the following constituents: a steering wheel angle detector I for detecting the rotation angle of the steering wheel as the steering wheel displacement; a physical amount detector II composed of a vehicle velocity detector $II_A$ for detecting the velocity of the running vehicle and a yaw rate detector $II_B$ for detecting the yaw rate of the vehicle; a signal processing circuit III composed of a judging circuit $III_A$ for judging the rotation speed or rate of operation of the steering wheel on the basis of the steering wheel angle signal from the steering wheel angle detector I and adapted to output a signal corresponding to the rotation speed or rate of operation of the steering wheel, a multiplier amplifier circuit $III_B$ adapted for multiplying the vehicle velocity signal from the vehicle velocity detector $II_A$ and the yaw rate signal from the yaw rate detector $II_B$ of the physical amount detector II with each other and for outputting the result of the multiplication after an amplification, and an adder circuit $III_C$ adapted for forming a command signal by adding the output signal from the judging circuit $III_A$ and the output signal from the multiplier amplifier circuit $III_B$; and a rear wheel steering device IV composed of a rear wheel steer angle detector $IV_A$ for detecting the steer angle of rear wheels 12, a differential amplifier circuit $IV_B$ adapted for making a subtraction between the output signal from the rear wheel steer angle detector $IV_A$ representing the actually measured steer angle of rear wheel and the command signal outputted from the adder circuit $III_C$ and for amplifying the result of the substraction thus forming and delivering an offset signal, and an actuator mechanism adapted for producing a force corresponding to the offset signal from the differential amplifier circuit $IV_B$ and transmitting this force to the rear wheels thus forming a steer angle for the rear wheels 12.

The signal outputted from the multiplier of the multiplier amplifier circuit $III_B$ corresponds to the product V r of the vehicle running velocity V and the yaw rate r. The product V r is a physical amount related both to the running velocity and lateral displacement of the vehicle. Therefore, the vehicle velocity detector $II_A$, yaw rate detector $II_B$ and the multiplier of the multiplier amplifier circuit $III_B$ in combination constitute a physical value detecting means. In the described embodiment, the physical value detecting means is used as the means for detecting the physical value related to the lateral displacement of the vehicle. The steering wheel angle detector I functions as the steering wheel displacement detecting means, while the judging circuit $III_A$ serves as the judging means. The portion of the signal processing circut III except the multiplier and the judging circuit $III_A$ and the differential amplifier circuit $IV_B$ in combination constitute the control means. The rear wheel steer angle detector $IV_A$ functions as the steer angle detector.

Figure 14A:
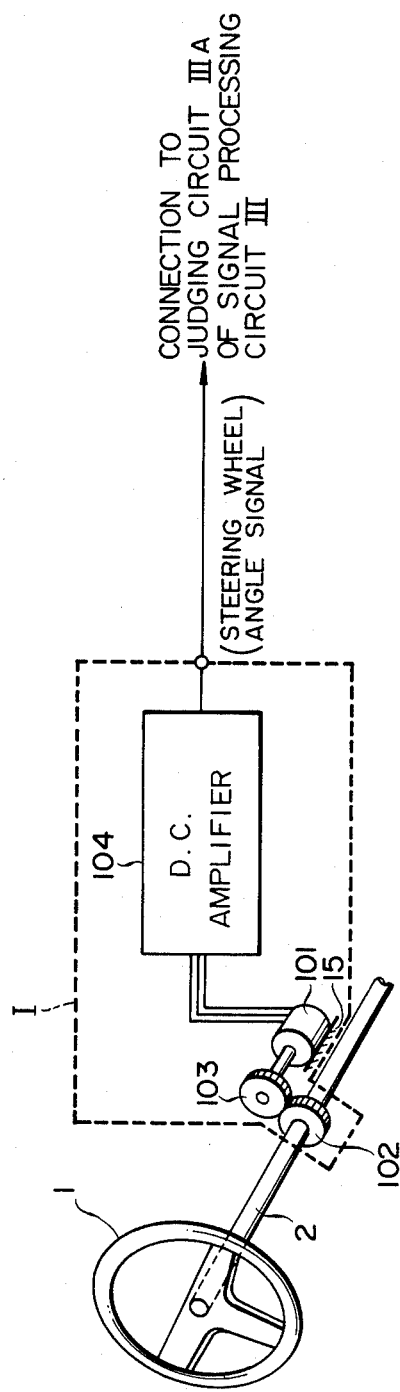
FIG. 14A shows the detail of a steer angle detector used in the second basic embodiment.

As will be seen from FIG. 14A, the steer angle detector I is composed of a pair of meshing spur gears 102, 103, a rotary potentiometer 101 connected to the spur gear 103, and a D.C. amplifier 104 connected to this potentiometer 101. The spur gear 102 is a driving gear made of, for example, nylon and fixed to the shaft 2 for rotation as a unit with the shaft 2 as the steering wheel is rotated, while the spur gear 103 is a driven gear made of, for example, nylon and adapted to be driven by the spur gear 102 such as to transmit the rotation to the rotary potentiometer 101.

The rotary potentiometer 101 is fixed to the chassis 15 of the vehicle, with its sliding end retained by a central portion of the spur gear 103, so that it produces an electric signal representing the rotational displacement of the steering wheel in response to the steering wheel rotation angle $\delta h$ inputted through the shaft 2 and the spur gears 102, 103. The D.C. amplifier 104 applies a predetermined voltage to the rotary potentiometer 101 and amplifies the electric signal from the rotary potentiometer 101 thus forming and outputting a steering wheel angle signal to the judging circuit $III_A$ of the signal processing circuit III.

Figure 14B:
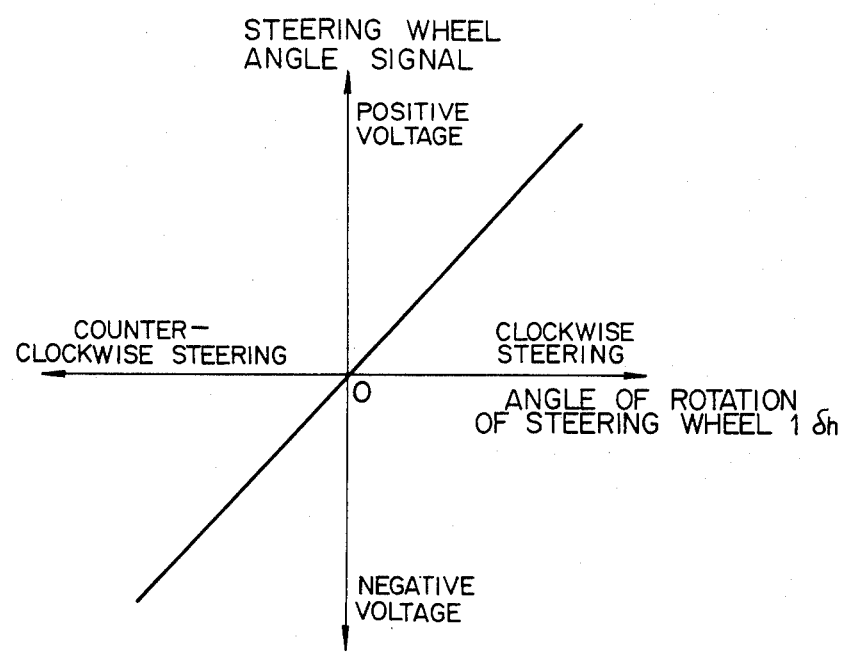
FIG. 14B is a diagram showing how the steer angle is changed in response to a change in the steering wheel displacement.

As will be seen from FIG. 14B, the sign or polarity of the steering wheel angle signal is determined by the D.C. amplifier. More specifically, this signal takes the form of a positive voltage signal when the steering wheel is rotated clockwise and a negative voltage signal when the steering wheel is rotated counter-clockwise.

Figure 15B:
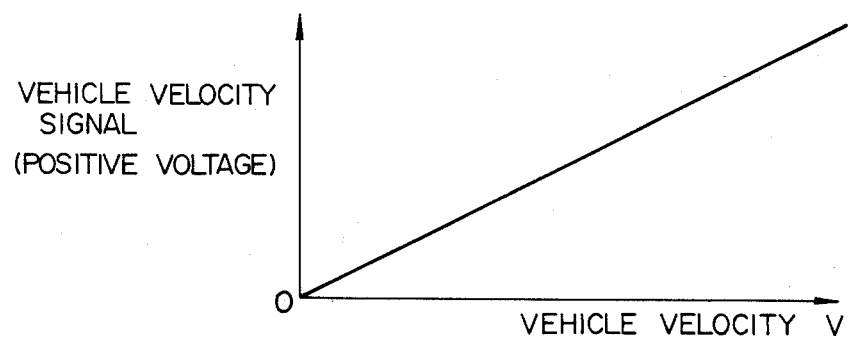
FIG. 15B is a diagram showing a vehicle velocity signal.

The physical amount detector II includes the vehicle velocity detector $II_A$ and a yaw rate detector $II_B$. As will be seen from FIG. 15A, the vehicle velocity detector $II_A$ is composed of a generator 2010 and a vehicle velocity meter 2020. The generator 2010 is attached to the portion of a transmission extension housing 19 through which a speed meter cable 21 is extended, and is connected between a speed meter driven gear 20 in the housing 19 and rotatable at a speed corresponding to the vehicle velocity and a speed meter cable 21 for transmitting the rotation speed corresponding to the vehicle speed to the speed meter, such as to generate an A.C. voltage corresponding to the rotation speed. The vehicle velocity meter 2020 serves to lower the A.C. voltage when the voltage is too high, and conducts a full-wave rectification of the A.C. voltage thus forming a ripple voltage. The ripple voltage is then changed into a positive voltage signal shown in FIG. 15B through a smoothing by a filter. The speed meter delivers this D.C. voltage as the vehicle velocity signal to the multiplier amplifier circuit $III_B$ of the signal processing circuit III.

Figure 16A:
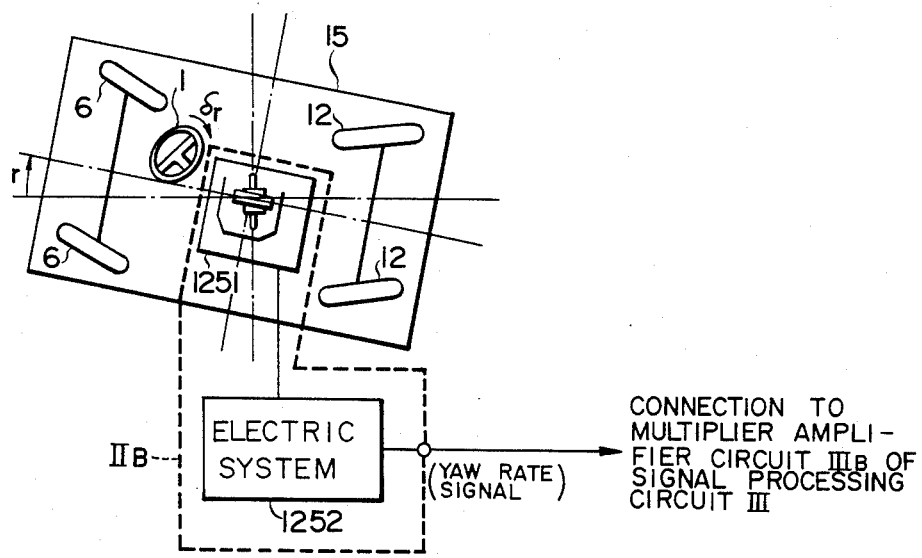
FIG. 16A shows the detail of a yaw rate detector used in the second basic embodiment.
Figure 16B:
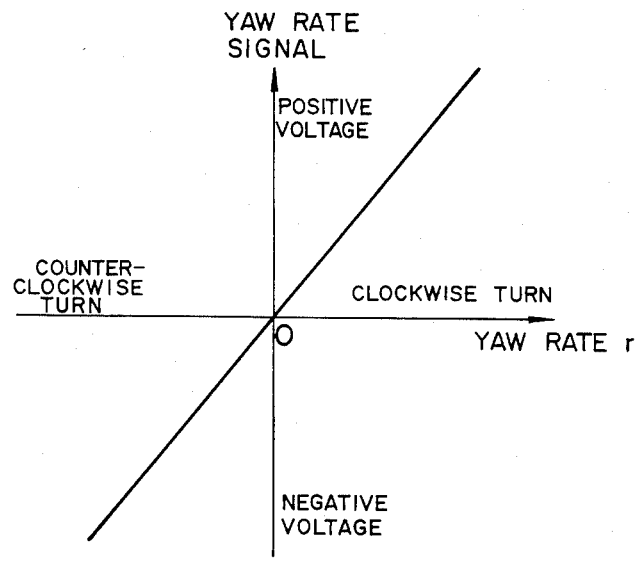
FIG. 16B is a diagram showing a yaw rate signal.

As will be seen from FIG. 16A, the yaw rate detector $II_B$ has a rate gyro 1251 and an electric system 1252. The rate gyro 1251 is fixed to the centroid position of the vehicle chassis 15 and is adapted to detect the angular velocity (yaw angular velocity or rate) of rotation of the chassis about a vertical axis. The electric system supplies the rate gyro with electric voltage and amplifies the output signal from the rate gyro 1251 thus forming and delivering a yaw rate signal to the multiplier amplifier circuit $III_B$ of the signal processing circuit III. The yaw rate signal takes the form of a positive voltage signal when the vehicle turns clockwise about the vertical axis in response to clockwise rotation of the steering wheel 1, and the form of a negative voltage when the vehicle turns counter-clockwise about the vertical axis in response to the counter-clockwise rotation of the steering wheel 1. Thus, the polarity of the yaw rate signal is determined by the rate gyro 1251 and the electric system 1252. The yaw rate signal is formed not only when the vehicle is turned intentionally in response to the steering operation but also when the vehicle is turned by an external disturbance. The relationship between the turning direction and the polarity of the yaw rate is the same as that in the case of the intentional turning in response to the steering operation.

Figure 17A:
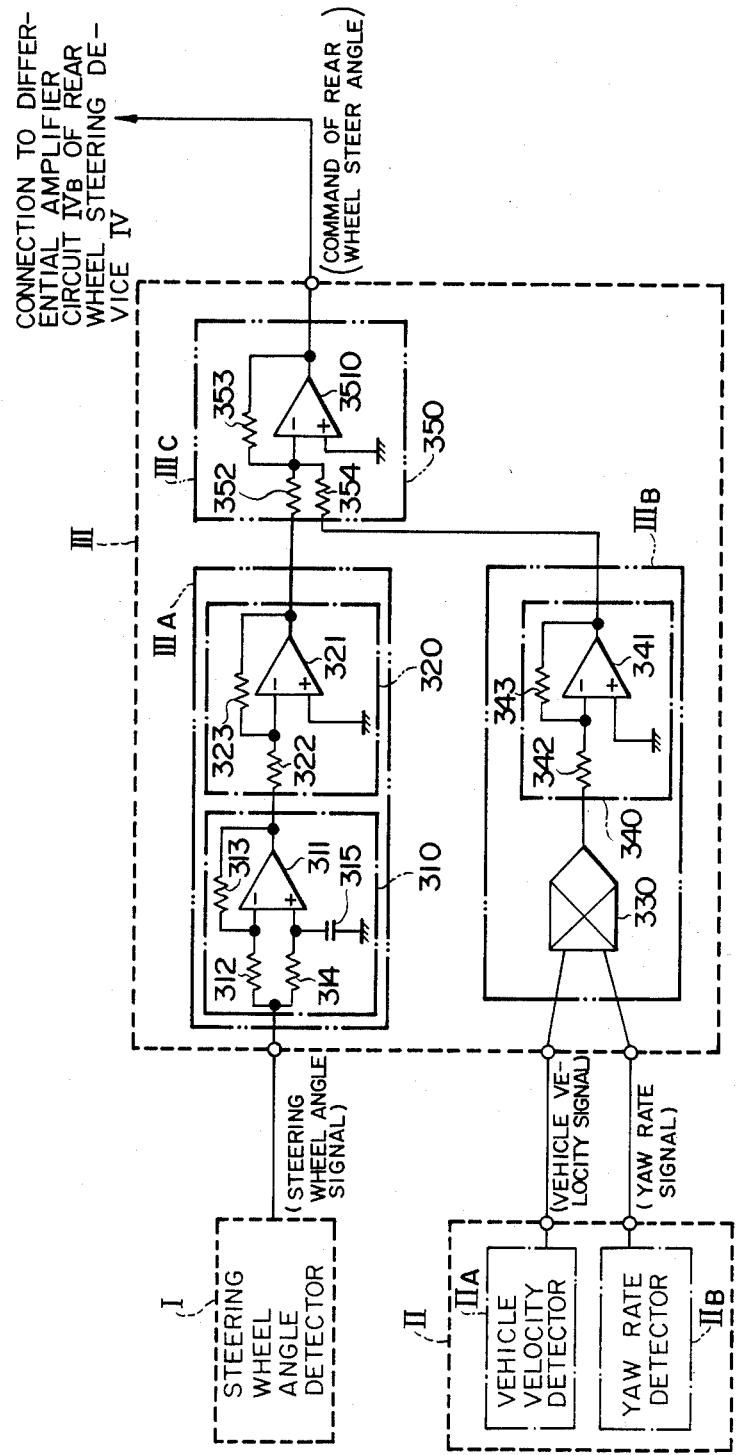
FIG. 17A is a circuit diagram of a signal processing circuit used in the second basic embodiment.

As shown in FIG. 17A, the signal processing circuit III is composed of a judging circuit $III_A$, multiplier amplifier circuit $III_B$ and an adder circuit $III_C$.

The judging circuit $III_A$ has a phase shifter 310 and an amplifier 320, and is adapted for judging the rotation speed or rate of operation of the steering wheel on the basis of the steering wheel angle signal from the steering wheel angle detector I and for outputting a signal corresponding to the rotation speed or rate of operation of the steering wheel. The phase shifter 310 has the following elements: an operation amplifier 311; a feedback resistor 313 connected between the output terminal of the operation amplifier 311 and the inversion input terminal (negative terminal) of the same, a resistor 312 connected at its one end to the steering wheel angle detector I and grounded at its other end, a resistor 314 connected at its one end to the steering wheel angle detector I and at its other end to the non-inversion input terminal (positive terminal) of the operation amplifier 311, and a capacitor 315 connected at its one end to the positive terminal of the operation amplifier 311 and grounded at its other end.

The input resistor 312 and the feedback resistor 313 have an equal resistance value.

When the angular frequency of the steering wheel angle signal as the input is as small as nearly zero, the reactance of the capacitor 315 of the phase shifter 310 has a value which aproaches infinity, so that the signal is delivered to the positive terminal of the operation amplifier 311 through the resistor 314. Meanwhile, the steering wheel angle signal is delivered also to the input resister 312. Since the resistance ratio between the resistance values of the input resistor 312 and the feedback resistor 313 is 1, a signal is obtained with a gain of −1 from the signal inputted to the negative terminal of the operation amplifier 311. On the other hand, a signal with a gain of 2 is derived from the signal inputted to the positive terminal of the operation amplifier 311. Therefore, the phase shifter 310 as a whole provides a signal of a gain of 1. Thus, the phase shifter 310 provides an output signal which is equal to the steering wheel angle signal inputted thereto, when the angular frequency of the steering wheel angle signal is as small as nearly zero.

Conversely, when the angular frequency of the steering wheel angle signal as the input is so large as to approach infinity, the capacitor 315 is materially short-circuited, so that the state of the phase shifter 310 becomes materially equivalent to the case where the positive terminal of the operation amplifier 311 is grounded. In this state, only the negative terminal of the operation amplifier 311 receives the steering wheel angle signal, so that the phase shifter 310 functions only as an inversion amplifier. In this case, since the ratio of resistance between the input resistor 312 and the feedback resistor 313 is 1, the phase shifter 310 provides a gain of −1. Thus, when the angular frequency $\omega$ of the steering wheel angle signal is as large as to approach infinity, a signal obtained by inverting the inputted steering wheel angle signal is outputted from the phase shifter 310. This output signal has an absolute value equal to that of the inputted steering wheel angle signal and a phase which is delayed 180° from the steering wheel angle signal.

As a result of the operation described above, the phase shifter 310 delivers such an output signal to the amplifier 320 as having phase delay with respect to the steering wheel angle signal, the phase delay being changeable from 0° to 180° as the angular velocity of the steering wheel angle signal is increased.

The operation amplifier 320 has an operation amplifier 321, input resistor 322 and a feedback resistor 323, and is adapted to amplify the signal delivered from the phase shifter 310 to the input resistor 322 with an amplification factor Kf which is determined by the ratio of resistance between the input resistor 322 and the feedback resistor 323. The amplifier 320 delivers this amplified output to the adder circuit $III_C$.

Therefore, the judging circuit $III_A$ exhibits such characteristics as to provide a constant gain Kf and a phase delay changeable from 0° to 180° in accordance with the increase of the angular frequency of the steering wheel angle. Therefore, the judging circuit $III_A$ outputs a signal obtained by multiplying the inputted steering wheel angle signal by the factor Kf in a low region of the angular frequency, i.e., when the steering wheel is being operated at a low speed, whereas, in the high region of angular frequency, i.e., when the steering wheel is being rotated at a high speed, a signal obtained through multiplication of the inputted steering wheel angle signal by the factor −Kf is outputted from the judging circuit $III_A$. When the angular frequency falls within a region intermediate between the low and high regions mentioned above, i.e., when the steering wheel is being rotated at a medium speed, the judging circuit $III_A$ outputs a signal which is obtained by multiplying the inputted steering wheel angle signal by the constant factor Kf, with a phase delay which is variable between 0° and 180°.

The multiplier amplifier circuit $III_B$ is composed of the multiplier 330 and the amplifier 340, and is adapted for multiplying the vehicle velocity signal from the vehicle velocity detector $II_A$ and the yaw rate signal from the yaw rate detector $II_B$ of the physical amount detector II with each other, and delivering the result of amplification after amplification. More specifically, the multiplier 330 delivers the product of the vehicle velocity signal and the yaw rate signal to the amplifier 340. As in the case of the amplifier 320 explained before, the amplifier 340 is composed of an operation amplifier 341, an input resistor 342 and a feedback resistor 343. The amplifier 340 amplifies the product of the vehicle velocity signal and the yaw rate signal supplied to one end of the input resistor 342 with an amplification factor Kr which is determined by the ratio of resistance value between the input resistor 342 and the feedback resistor 343, and delivers the amplified signal to the adder circuit $III_C$.

The adder circuit $III_C$ is an adder having an operation amplifier 3510 and resistors 352, 353, 354, and is adapted for outputting a signal which is formed by adding the output from the judging circuit received by one end of the resistor 352 and the output signal from the multiplier amplifier circuit $III_B$ received by one end of the resistor 354. This output signal is delivered as the command signal to the differential amplifier circuit $IV_B$ of the rear wheel steering device IV.

The operation characteristics of the signal processing circuit III described hereinbefore will be explained while referring to the formula (31) which was used in the explanation of principle of control and computation of the rear wheel steer angle.

$$\delta r = \left( Kd - \frac{Ke}{TS + 1} \cdot TS \right) \cdot \delta h + Kr \cdot V \cdot r \quad (31)$$

where, there exists a condition of $\delta h = N\delta f$.

The steering wheel angle signal as an electric signal representing the steering wheel angle $\delta h$ is expressed by $X\delta h$, while the vehicle velocity signal and the yaw rate signal, which are the electric signals representing the vehicle velocity V and the yaw rate r, are expressed by Xv and Xr, respectively. The command signal representing the command value of the rear wheel steer angle is expressed by $X\delta r$.

Using these symbols, the operation characteristics of the signal processing circuit III is given as follows:

$$X\delta r = -Kf \frac{S - \frac{1}{RC}}{S + \frac{1}{RC}} \cdot X\delta h + Kr \cdot Xv \cdot Xr \quad (37)$$

where, Kf represents the amplification factor of the amplifier 320, Kr represents the amplification factor of the amplifier 340, R represents the resistance value of the resistor 314, and C represents the capacitance of the capacitor 315. The formula (31) mentioned before can be transformed as follows, in conformity with the formula (37):

$$\delta r = -(Ke - Kd) \frac{S - T\frac{Kd}{(Ke - Kd)}}{S + \frac{1}{T}} \cdot \delta h + Kr \cdot V \cdot r \quad (38)$$

Clearly, the formulae (38) and (37) are identical, on conditions of $(Ke-Kd)=Kf$, $T=RC$ and $Kd/(Ke-Kd)=1$, i.e., on conditions of $Kd=Kf$, $Ke=2Kf$ and $T=RC$.

Thus, the signal processing circuit III is an electric circuit which embodies the theory of the controlling computation for rear wheel steer angle shown by the formula (31) with the limitations of Kd=Kf, T=RC and Ke=2Kf, so that this circuit III electrically provides the same charactristics as those shown in FIGS. 4A and 4B.

Figure 19A:
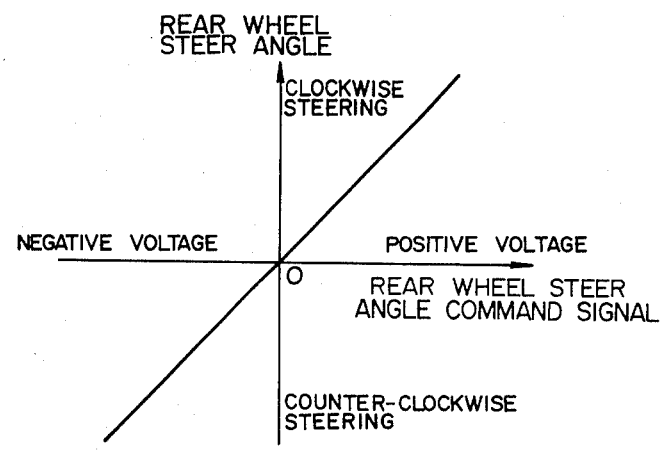
FIGS. 19A, 19B and 19C are diagrams showing, respectively, a command signal, actually measured signal and an offset signal.

As will be seen from FIG. 19A, the command signal for the command rear wheel steer angle delivered by the signal processing circuit III has the positive polarity when the rear wheels are to be steered clockwise, whereas, when the rear wheels are to be steered counter-clockwise, the command signal has the negative polarity. In both cases, the level of the voltage of the command signal is proportional to the steer angle to be attained.

Figure 18:
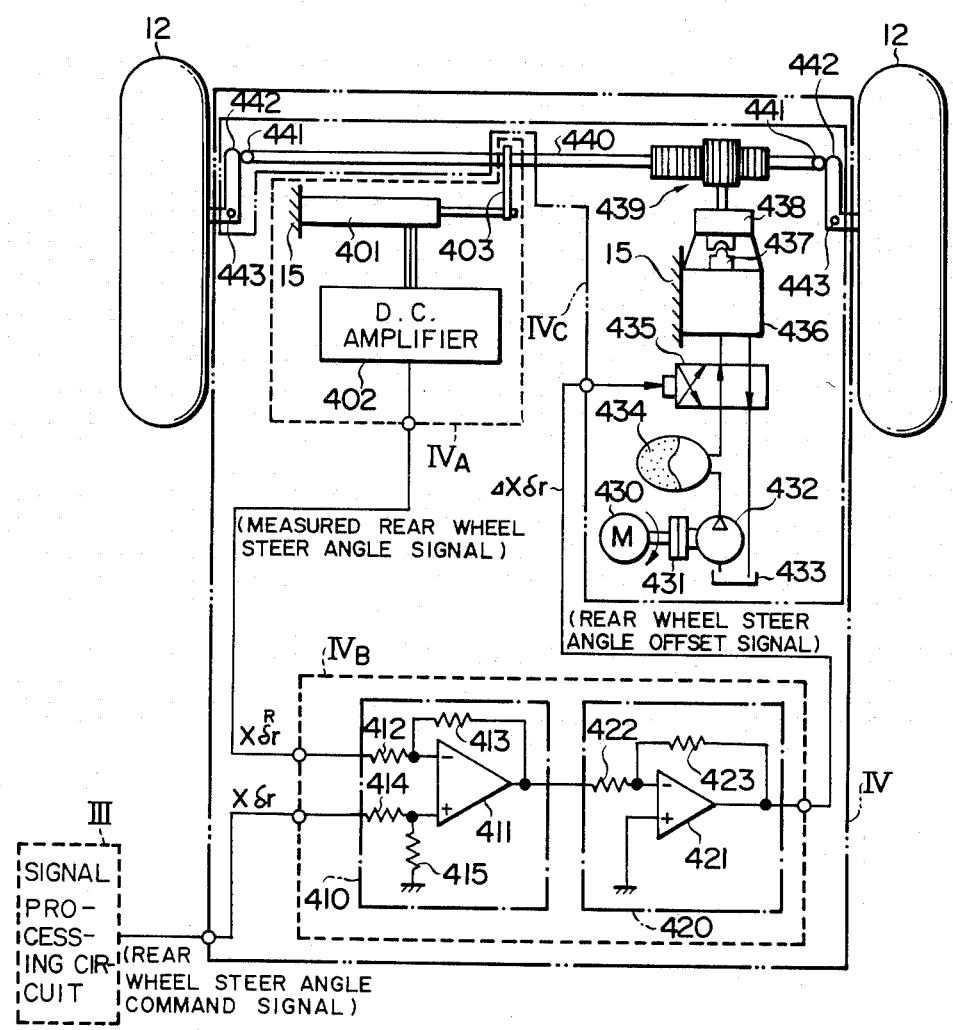
FIG. 18 is a view showing the detail of a rear wheel steering system used in the second basic embodiment.

Referring now to FIG. 18, the rear wheel steering device IV has the rear wheel steer angle detector $IV_A$, differential amplifier circuit $IV_B$ and the actuator mechanism $IV_C$.

The rear wheel steer angle detector $IV_A$ includes a linear potentiometer 401, a D.C. amplifier 402 and a connecting member 403. The linear potentiometer 401 is fixed to the chassis 15 of the vehicle and has a sliding end retained by the connecting member 403 which makes a linear motion together with the linkage 440 of the actuator mechanism $IV_C$. In operation, the end of the slider makes a linear motion in response to the steering of the rear wheels, thus detecting the steer angle of rear wheels 12 as a linear displacement and outputting an electric signal corresponding to this linear displacement.

Figure 19B:
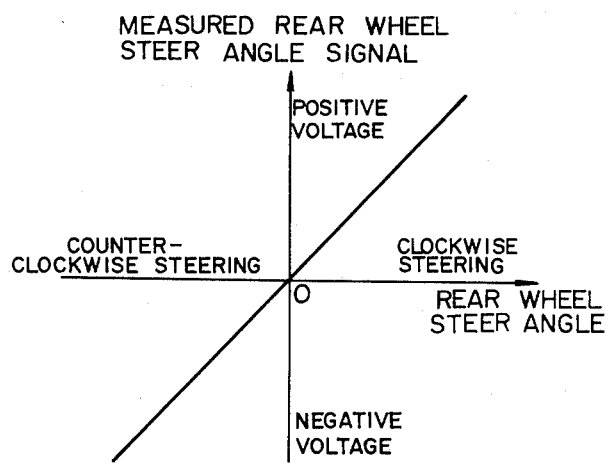

The D.C. amplifier 402 is adapted to apply a predetermined voltage to the linear potentiometer 401, and amplifies the electric signal from the linear potentiometer 402 thus forming and delivering an actually measured rear wheel steer angle signal to the differential amplifier circuit $IV_B$. This signal representing the actually measured rear wheel steer angle has a polarity determined by the D.C. amplifier 402 as shown in FIG. 19B: namely, when the steer angle is formed such as to steer the rear wheels 12 clockwise, the signal takes the form of a positive voltage signal, whereas, when the steer angle is formed such as to steer the rear wheels 12 counter-clockwise, the signal takes the form of a negative voltage signal.

The differential amplifier circuit $IV_B$ is composed of a differential amplifier 410 and an amplifier 420. The diffrential amplifier 410 has resistors 412, 413, 414 and 415, and delivers to the amplifier 420 a signal which is formed by a substraction between the command signal received by one end of the resistor 414 and the measured rear wheel steer angle signal received by one end of the resistor 412. As in the cases of the amplifiers 320 and 340, the amplifier 420 has an operation amplifier 423, an input resistor 422 and a feedback resistor 423. The amplifier 420 amplifies the output of the differential amplifier 410 received by one end of the input resistor 422 by an amplification factor which is determined by the ratio of resistance between the input resistor 422 and the feedback resistor 423, thus forming and delivering a steer angle offset signal to the flow rate control valve 435 of the actuator mechanism $IV_C$.

In consequence, the differential amplifier circuit $IV_B$ produces the offset signal which is obtained through amplification of the difference between the rear wheel steer angle command signal delivered by the signal processing circuit III and the measured rear wheel steer angle signal delivered by the rear wheel steer angle detector $IV_A$. The differential amplifier circuit $IV_B$, therefore, is a circuit essential for a feedback control which is carried out in such a manner as to nullify the offset. As a result of this feedback control conducted by virtue of the differential amplifier circuit IV$_B$, the rear wheel steer angle is controlled in such a manner as to nullify the offset, i.e., such as to coincide with the command steer angle.

The amplifier 420 is intended for affording a large power which may become necessary for allowing the control of the flow rate control valve of the actuator mechanism IV$_C$ to be controlled in a short time with a good response.

Figure 19C:
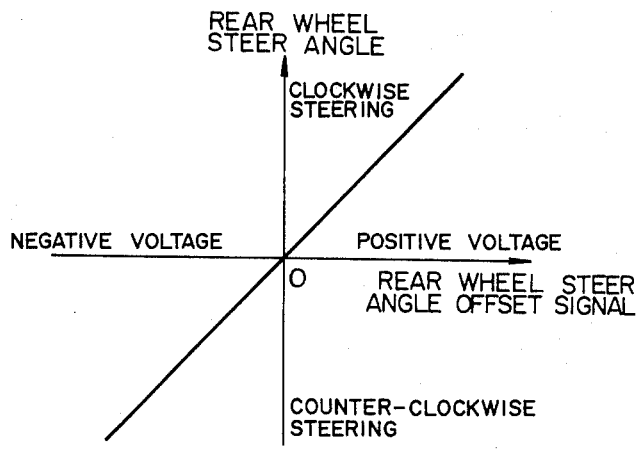

As shown in FIG. 19C, the offset signal representing the offset of the rear wheel steer angle from the command value acts, when it has the form of a positive voltage, to generate a rear steer angle in the direction for steering the rear wheels 12 clockwise. Conversely, when the command signal has the form of a negative voltage, it acts to generate a rear wheel steer angle such as to steer the rear wheels counter-clockwise.

The actuator mechanism IV$_C$ includes a driving unit 430, a driving coupling 431, a pump 432, an oil tank 433, an accumulator 434, a flow rate control valve 435, a hydraulic motor 436, a universal joint 437, a reduction gear 438, a rack-and-pinion 439, a linkage 440, pin joints 441, knuckle arms 442 and pivot points 443.

The pump 432 is constituted by a vane pump which is driven by a driving unit 430 through a driving coupling, and is adapted to accumulate a predetermined pressure in the accumulator 434.

The oil tank 433 is connected to the suction side of the pump 432 and intended for recycling unnecessary oil.

The accumulator 434 is constituted by a metallic vessel having a predetermined internal volume. The space in the vessel is divided by a rubber diaphragm into two chambers: namely, a first chamber filled with a gas such as nitrogen gas of a predetermined pressure, and a second chamber which is connected to the discharge port of the pump 432 through a pipe. The accumulator 434 is intended for prevention of any operation failure of the pump 434 through compensation for any shortage of the discharge rate from the pump 432 in view of the demand by the differential amplifier circuit IV$_B$. The provision of the accumulator contributes also to reduction in the capacity and size of the pump 432.

The flow rate control valve 435 is constituted by a spool valve having a cylinder provided with inlet and outlet ports, and a spool axially movably received in the cylinder, the spool having portions of different diameters. The effective passage area through the spool valve is determined by relative position between the outlet port and the large-diameter portion of the spool and, hence, is varied in accordance with the axial displacement of the spool, thus controlling the discharge rate. The flow rate control valve 435 delivers the hydraulic oil from the accumulator to the hydraulic motor 436, while controlling the flow rate in accordance with the offset signal representing the offset of the rear wheel steer angle.

The hydraulic motor 436 is fixed to the chassis 15 of the vehicle such that its shaft is coaxial with the universal joint 437. The shaft 437 is rotated as the pressurized oil is supplied through the flow rate control valve 435. The rotation of the shaft is transmitted through the universal joint 437 to a reduction gear 438 so that the rotation speed is reduced. The rotation of reduced speed is then transmitted to the rack-and-pinion 439. The reduction gear 438 is used for optimizing the torque and the rotation speed necessary for the steering of the rear wheels 12, thus assisting the hydraulic motor 436.

The rack-and-pinion 439 is a motion converting mechansim for converting the rotary motion of the reduction gear 438 into a linear motion. The linear motion obtained through the conversion causes the rotation of the knuckle arm 442 about the pivot point 443, through the linkage 440 and the pin joint 441.

The knuckle arm 442 is rotatable as a unit with the rear wheel 12, thus forming a rear wheel steer angle in the given direction.

The effect of the rear wheel steer angle controlling apparatus in accordance with the second basic embodiment of the invention will be described hereinunder.

There are two cases: namely, a first case in which the vehicle is turned intentionally by the steering operation made by the driver, and a second case in which the vehicle is turned unintentionally by a disturbance such as lateral wind, despite the driver holds the steering wheel still for keeping the course.

Referring first to the case where the vehicle is turned intentionally by the driver, a rotation of the steering wheel 1 generates a steering wheel angle $\delta h$ which in turn causes the front wheels to be steered thus turning the vehicle. The steering wheel angle detector I momentarily detects the steering wheel angle $\delta h$ and delivers this information as the steering wheel angle signal $X\delta h$ to the judging circuit III$_A$ of the signal processing circuit III. At the same time, the vehicle velocity detector II$_A$ of the physical amount detector II momentarily detects the vehicle velocity V and delivers the same as the vehicle velocity signal Xv to the multiplier amplifier circuit III$_B$ of the signal processing circuit III, while the yaw rate detecting means II$_B$ momentarily detects the yaw rate r caused by the turning of the vehicle and delivers the same as the yaw rate signal Xr to the multiplier amplifier circuit III$_B$ of the signal processing circuit III.

The phase shifter 310 in the judging circuit III$_A$ of the signal processing circuit III produces an output signal which is the same as the steering wheel angle signal $X\delta h$, when the angular frequency is low, i.e., when the steering wheel is being rotated at a low speed. Conversely, when the angular frquency is high, i.e., when the steering wheel is being rotated at a high speed, the phase shifter 310 produces an output signal $-X\delta h$, which is formed by an inversion of the inputted steering wheel angle signal. The output from the phase shifter 310 is multiplied with Kf by the amplifier 320.

Meanwhile, in the multiplier amplifier circuit III$_B$ the signal processing circuit III, the multiplier 330 multiplies the vehicle velocity signal Xv and the yaw rate signal Xr with each other and the amplifier 340 amplifies the result of the multiplication by a factor Kr, thus producing and outputting a signal proportional to the lateral displacement of the vehicle. On the other hand, in the adder circuit III$_C$ of the signal processing circuit III, the adder 350 adds the output signal from the judging circuit III$_A$ and the output from the multiplier amplifier circuit III$_B$, thus forming and outputting a command signal $X\delta r$ representing the command value of the rear wheel steer angle. Thus, the signal processing circuit III outputs the rear wheel steer angle command signal $X\delta r$ in accordance with the formula (37) mentioned before.

$$X\delta r = -Kf\frac{S - \frac{1}{RC}}{S + \frac{1}{RC}} \cdot X\delta h + Kr \cdot Xv \cdot Xr$$

The rear wheel steer angle detector $IV_A$ of the rear wheel steering device IV momentarily detects the information concerning the steer angle $\delta r$ of rear wheels 12 and delivers the same to the controller $IV_B$ as the measured steer angle signal $X\delta^R r$ representing the actually measured value of the rear wheel steer angle.

In the differential amplifier circuit $IV_B$, the differential amplifier 410 forms a signal corresponding to the difference between the rear wheel steer angle command signal $X\delta r$ and the measured steer angle signal $X\delta^R r$, while this difference signal is amplified by a factor $K_A$ by the amplifier 420, thus forming and delivering the following offset signal $\Delta X\delta r$ to the actuator mechanism $IV_C$ such as to control the flow rate control valve 435 in the latter:

$$\Delta X\delta r = K_A(X\delta r - X\delta^R r) \tag{39}$$

The flow rate control valve 435 of the actuator mechanism $IV_C$ operates respective spool valves in accordance with the offset signal $\Delta X\delta r$ thus allowing the hydraulic pressure to be transmitted from the accumulator 434 into the hydraulic motor 436, thus driving the shaft of the hydralic motor. This rotation is transmitted through the universal joint 437 to the reduction gear 438 and the rotation of the reduced speed is converted into a linear motion by the rack-and-pinion 439. This linear motion is transmitted through the linkage 440 and the knuckle arms 442 to the rear wheels 14, thus turning the rear wheels 12 without delay thereby generating a rear wheel steer angle $\delta r$. When the measured steer angle signal $X\delta^R r$ which is the electric signal corresponding to the steer angle $\delta r$ has come equal to the command signal $X\delta r$ representing the command value of the rear wheel steer angle, the offset signal $\Delta X\delta r$ of the rear wheel steer angle is reduced to zero, so that the flow rate control valve 435 is changed from the "open" state to "close" state, thus stopping the supply and discharge of the hydraulic oil.

This operation is conducted momentarily so that the direction and the magnitude of the rear wheel steer angle can be controlled in accordance with the rotation speed or rate of operation of the steering wheel and the product of the vehicle velocity and the yaw rate.

An explanation will be made hereinunder as to the case where the vehicle is turned unintentionally by a disturbance such as lateral wind, despite the will of the driver who holds the steering wheel still to keep the course.

When the vehicle is running straight, the steering wheel 1 is not steered and held in the neutral position, i.e., in the state of $\delta h=0$. Therefore, the steer angle detector I transmits the steer angle signal $X\delta h=0$ to the judging circuit $III_A$ of the signal processing circuit III. Since the vehicle is running straight, the yaw rate r is zero, so that the yaw rate detector $II_B$ of the physical amount detecting means II delivers a yaw rate signal $Xr=0$ to the multiplier amplifier circuit $III_B$ of the signal processing circuit III. On the other hand, the vehicle speed signal Xv corresponding to the vehicle running velocity is detected by the vehicle velocity detector $II_A$ of the physical amount detector II and is delivered to the multiplier amplifier circuit $III_B$.

Thus, in the following formula (37) which was explained before, the first and second terms are zero because both the steer angle signal $X\delta h$ and the yaw rate signal Xr are zero, so that the signal processing circuit III produces a command signal $X\delta r=0$.

$$X\delta r = -Kf\frac{S - \frac{1}{RC}}{S + \frac{1}{RC}} \cdot X\delta r + Kr \cdot Xv \cdot Xr \tag{37}$$

As stated before, the rear wheel steer device controls the rear wheels 12 such as to make the measured steer angle signal $X\delta^R r$ coincide with the rear wheel steer angle command signal $X\delta r=0$, the steer angle $\delta r$ of rear wheels 12 is maintained zero during straight running of the vehicle.

It is assumed here that the vehicle running straight as described above is forcibly turned by a disturbance such as strong lateral wind. In such a case, the steering wheel is held still in the neutral state so that the steering wheel angle detector I delivers to the judging circuit $III_A$ a steering wheel angle signal $X\delta h=0$, representing the steering wheel angle $\delta h=0$. Actually, however, the vehicle is being turned by the disturbance, so that a yaw rate r is generated. Therefore, the yaw rate detector $II_B$ forms and delivers a yaw rate signal Xr to the multiplier amplifier circuit $III_B$, in accordance with the thus generated yaw rate r.

Therefore, the second term of the formula (37) showing the operation characteristics of the signal processing circuit III has a certain value because the yaw rate signal Xr is not zero, although the first term is zero due to the condition of $\delta h=0$.

Consequently, the signal processing circuit III produces the rear wheel steer angle command signal $X\delta r$ as expressed by the following formula (40).

$$X\delta r = Kr \cdot Xv \cdot Xr \tag{40}$$

As stated before, the rear wheel steering system steers the rear wheels 12 such as to form a rear wheel steer angle $\delta r$ until this signal comes equal to the command signal $\Delta X\delta r$ expressed by the formula (40).

This control of the rear wheel steer angle is continued momentarily until the yaw rate r is reduced to zero. Thus, in this embodiment, the rear wheel can be controlled in accordance with the product of the vehicle velocity and the yaw rate which may be caused by an unintentional turn of the vehicle due to disturbance such as lateral wind.

This embodiment provides the following characteristics because the control signal is formed from both of the rotation speed or rate of operation of the steering wheel and the product of the vehicle velocity and the yaw rate.

When the driver keeps the steering wheel still such as to drive the vehicle straight, the rear wheels are controlled by the product of the vehicle velocity and the yaw rate, such as to form a rear wheel steer angle corresponding to the product of the vehicle velocity and the yaw rate, in the same direction as the generation of the yaw rate.

When the driver wishes to turn the vehicle gently by operating the steering wheel gently, the rear wheel steer angle is generated in the same direction as that of the front wheels such that the rear wheel steer angle is increased as the vehicle velocity gets higher.

When the driver operates the steering wheel for turning the vehicle quickly dring running at normal speed including low and high speed, the rear wheel steer angle is formed in the direction counter to the steer angle of front wheels and the level of the rear wheel steer angle is decreased as the vehicle speed gets higher. However, when the vehicle speed is above the normal high speed, the quick operation of the steering wheel causes the rear wheels to be steered in the same direction as the front wheels and the level of the rear wheel steer angle is increased as the vehicle speed gets higher.

Consequently, this embodiment is quite effective in minimizing any unintentional lateral displacement of the vehicle caused by disturbance such as ruts on the road surface or lateral wind, while improving the running stabilty during the straight running, as well as the response to the steering input for intentional turning. In addition, the maneuvering stability during running at high speed is enhanced remarkably.

A third basic embodiment of the rear wheel steer angle controlling apparatus for 4-wheel steering vehicles in accordance with the invention will be described hereinunder with reference to FIG. 20. As will be seen from this Figure, this embodiment has a judginng circuit similar to the judging circuit $III_4$ of the signal processing circuit III used in the second basic embodiment. However, the judging circuit used in this third basic embodiment is discriminated from that in the second basic embodiment by the provision of a dead zone circuit 360. Other portions are materially identical to those of the second basic embodiment, so that detailed description will be omitted with respect to these portions. For informations, these portions bear the same reference numerals as those in the second basic embodiment described before.

The steering wheel angle detector I employs a rotary potentiometer 101 which is similar to that used in the second basic embodiment. This potentiometer 101, however, is mounted in a manner which is different from that in the second basic embodiment. Namely, the rotary potentiometer 101 has a sliding end which is retained on the central portion of a disc-shaped small rubber tire having a diameter of about 5 cm, and is adapted to be rotated together with the rubber tire 106. The rubber tire 106 is held in contact with a belt-like rubber ring 105 which is fixedly wound perfectly round one end of the wheel pad 1a of the steering wheel 1, such as to rotate together with the rubber ring 105 without making any slip therebetween. Therefore, the rotation of the steering wheel is transmitted through the rubber ring 105 to the rubber tire 106 and, hence, to the sliding end of the potentiometer 101, so that the angle of rotation of the steering wheel is detected by the potentiometer 101.

Figure 20:
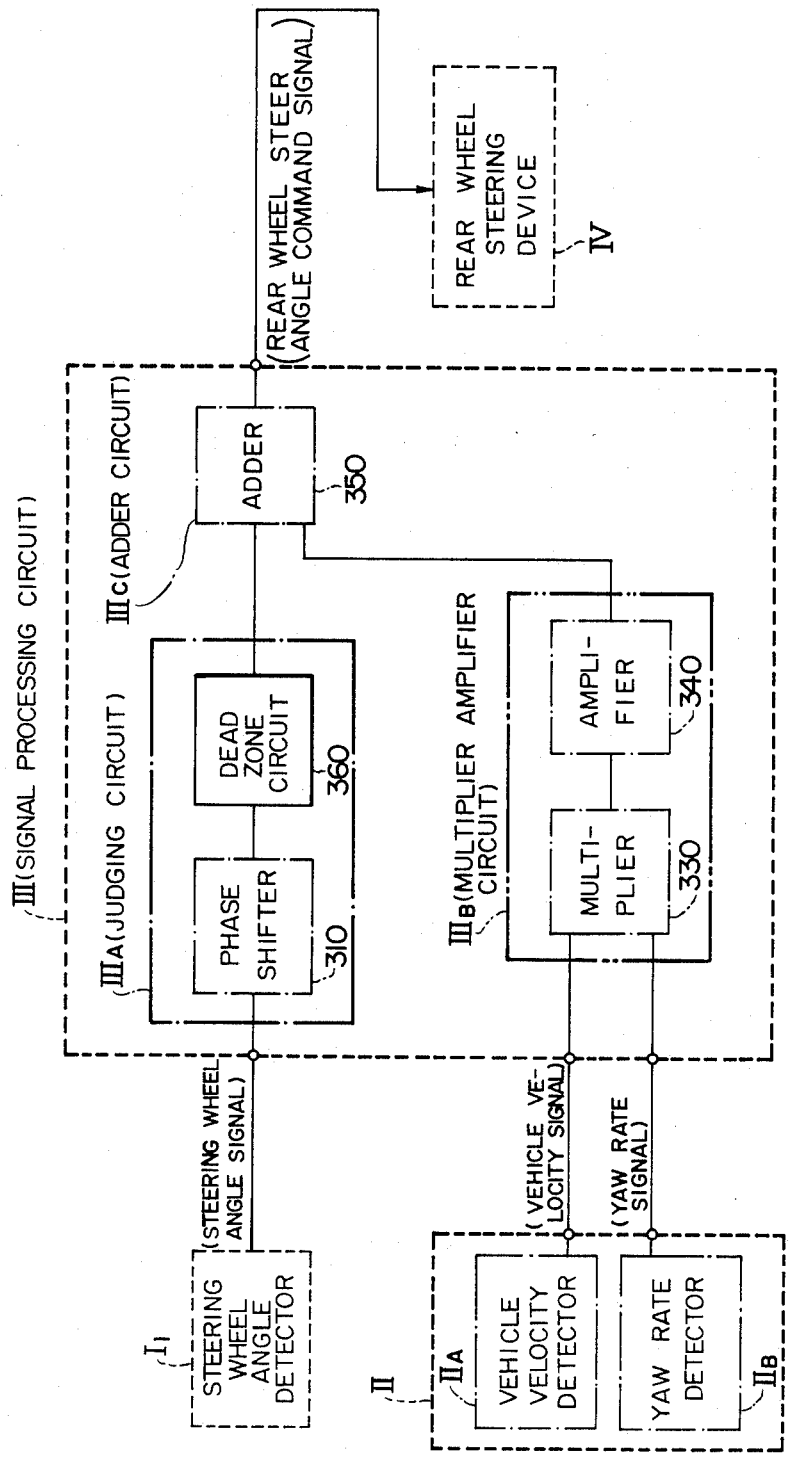
FIG. 20 is a block diagram of a signal processing circuit in a third basic embodiment of the invention.
Figure 21A:
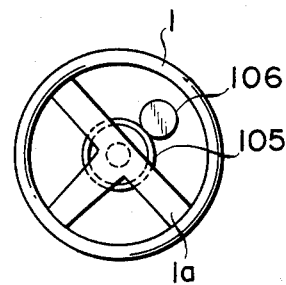
FIG. 21A is a plan view taken in the direction of arrows A—A in FIG. 21B.
Figure 21B:
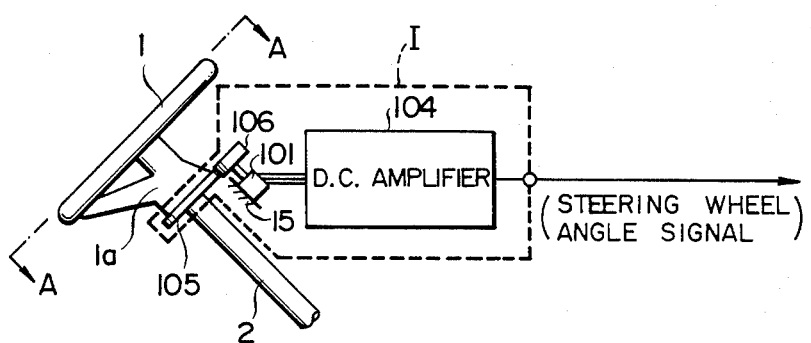
FIG. 21B is a view showing the detail of a steer angle detector used in the third basic embodiment.

As will be seen from FIGS. 20 and 22A, the judging circuit $III_4$ of the signal processing circuit III has a dead zone circuit 360 connected in series to the phase shifter 310. An adder amplifier 390, which is a modification of the amplifier 320 used in the second basic embodiment, constitutes a part of the dead zone circuit 360. This modification is required due to the provision of the dead zone circuit 360.

The dead zone circuit 360 is constituted by a couple of half-wave rectifier circuits 370, 380 and the adder amplifier 390 mentioned above.

The half-wave rectifier circuit 370 has an operation amplifier 371, negative voltage source 372, resistors 373, 374, 375 and diodes 376, 377, and operates to effect a half-wave rectification of the negative portion of the output signal from the phase shifter 310 received by one end of the resistor 375. The half-wave rectifier circuit 370 keeps its output at zero whenever the level of the output signal from the phase shifter 310 is below a set voltage E/Kf of the voltage source 372, and outputs a signal of a level corresponding to the difference between the set voltage E/Kf and the output signal from the phase shifter 310.

Similarly to the half-wave rectifier circuit 370, the half-wave rectifier circuit 380 has an operation amplifier 381, a positive power voltage source 382, resistors 383, 384, 385 and diodes 386, 387, and is adapted for effecting a half-wave rectification of only the positive portion of the output signal delivered by the phase shifter 310. In addition, this half-wave rectifier circuit 380 keeps its output at zero whenever the output from the phase shifter is below the set voltage E/Kf of the voltage source 382, and produces a signal of a level corresponding to the difference of level between the output signal from the phase shifter 310 and the set voltage E/Kf only when the level of the output signal from the phase shifter 310 exceeds the set voltage E/Kf.

The adder amplifier 390 is composed of an operation amplifier 391 and resistors 392, 393 and 394. The adder amplifier 390 functions to add the positive signal received by one end of the resistor 393 and the negative signal received by one end of the resistor 392, thus forming a signal having both polarities and amplifies this signal by a predetermined amplification factor Kf.

Therefore, the dead zone circuit 360 has a function to amplify the output from the phase shifter 310 by the amplification factor Kf and to keep the output signal thereof at zero when the voltage level of the amplified signal is below the set voltage $|E|$.

This third basic embodient of the rear wheet steer angle controlling apparatus for 4-wheel steering vehicle in accordance with the invention produces an effect substantially the same as those of the second basic embodiment described before, and provides an additional effect in that, due to the provision of the dead zone circuit in the signal processing circuit, the rear wheel steering system does not produce the rear wheel steer angle when the angle of the steering wheel is below a predetermined value. This feature offers the following advantage. Namely, in general, it is often experienced in the vehicles of the kind described that the rear wheel steer angle is generated undesirably in response to a slight unintentional turning of the front wheels caused by the roughness on the road surface, regardless of the steering operation of the driver. This problem, however, is avoided by virtue of the dead zone circuit which prevents the rear wheel steering system from responding to slight turning of the front wheels.

In addition, the dead zone circuit provided in the third basic embodiment eliminates the undesirable effect of non-linear element involved usually by steering systems such as the mechanical play and friction, which elements undesirably impair the steering stability particularly when the steering wheel angle is small, so that the rear wheels are steered highly stably.

In the third basic embodiment described herein before, the band or width of the dead zone can be suitably selected in accordance with the particular of the driver, such that, when the rotation angle of the steering wheel is smaller than a predetermined angle, the rear wheels are not steered to provide the steering characteristics similar to those of the conventional vehicles in which only the front wheels are steerable.

In the second and third basic embodiments described hereinabove, a rotary potentiometer is used as the steering wheel angle detector I. This, however, is not exclusive and the steering wheel angle may be detected by a linear potentiometer in combination with a gear box for converting the rotary motion of the steering wheel into a linear motion, or by means of other types of sensors such as an electromagnetic sensor for sensing a change in the magnetic flux caused by a change in the steering wheel angle, optical sensor or a displacement sensor including a telemeter.

It is to be understood also that the physical amount detector II can have any desired construction capable of sensing the vehicle running velocity and the yaw rate and transforming them into electric signals.

The analog type circuits used in the second and third basic embodiments may be substituted by a circuit capable of processing digital signals, e.g., a microcomputer. Furthermore, the rear wheel steering device used in the second and third basic embodiments is only illustrative and can be substituted by any type of device capable of controlling the steer angle of rear wheels in accordance with the rotation speed or rate of operation of the steering wheel and the product of the vehicle running velocity and the yaw rate. For instance, the rear wheel steering device may be constituted by a pneumatic circuit, hydraulic circuit, pneumatic actuator, hydraulic actuator and other types of actuator operable by electromagnetic force or other kinds of force.

The second and third basic embodiments have been described in connection with the fourth aspect of the invention. However, it will be clear to those skilled in the art that the second and third aspects of the invention are attainable by omitting the rear wheel steer angle detector $II_A$ and the differential amplifier circuit $IV_B$ from the second and third basic embodiments.

It will be clear to those skilled in the art also that all the aspects of the invention can be carried out by controlling the direction and the value of the steer angle of rear wheels in accordance with the arithmetic computations explained hereinbefore, by using only the yaw rate, vehicle running velocity and lateral acceleration or by detecting and multiplying the vehicle running velocity and the lateral acceleration.

What is claimed is:

1. A rear wheel steer angle controlling apparatus for automatically controlling a steer angle of rear wheels of a vehicle by controlling an actuator mechanism for generating the steer angle of the rear wheels in response to an operation of a steering wheel for generating a steer angle of front wheels of said vehicle, said apparatus comprising:
   a steering wheel displacement detecting means for detecting a steering wheel displacement and for generating a steering wheel displacement signal representing the steering wheel displacement;
   a judging means for judging a rotation speed of said steering wheel from said steering wheel displacement signal; and
   a controlling means for controlling said actuator mechanism in accordance with a result of judgement by said judging means such that:
   (a) said steer angle of the rear wheels is generated in the direction counter to a direction of steer angle of the front wheels when said steering wheel is operated at a high rotation speed; and
   (b) said steer angle of the rear wheels is generated in the same direction as the steer angle of the front wheels when said steering wheel is operated at a low rotation speed.

2. A rear wheel steer angle controlling apparatus according to claim 1, wherein said controlling means controls said actuator mechanism in accordance with a result of judgement by said judging means and said steering wheel displacement signal such that:
   (a) a steer angle of the rear wheels corresponding to the level of said steering wheel displacement signal is formed in the direction counter to a direction of the steer angle of the front wheels when said steering wheel is operated at a high rotation speed; and
   (b) a steer angle of the rear wheels corresponding to the level of said steering wheel displacement signal is generated in the same direction as the steer angle of the front wheels when said steering wheel is operated at a low rotation speed.

3. A rear wheel steer angle controlling apparatus according to claim 1, wherein said judging means comprises means for judging the angular frequency of said steering wheel displacement signals as said rotation speed of said steering wheel.

4. A rear wheel steer angle controlling apparatus according to claim 1, wherein said judging means judges the rotation speed of said steering wheel by using a transfer function G(S) expressed by the following formula and controls said actuator mechanism in accordance with the result of judgement:

$$G(S) = Kd - \frac{Ke}{1 + TS} \cdot TS$$

where, Kd and Ke are constants which meet the condition of $0 < Kd < Ke$, S is a complex frequency and T is a primary delay time constant.

5. A rear wheel steer angle controlling apparatus according to claim 1, wherein said judging means includes:
   a first sample hold circuit for sampling said steering wheel displacement signal at a predetermined period and holding the sampled signal thus producing a stepped voltage signal;
   a differential amplifier for subtracting said stepped voltage signal from said steering wheel displacement signal thus outputting a saw-tooth voltage signal;
   a second sample hold circuit for sampling said saw-tooth voltage signal at a predetermined period and holding the sampled signal thus outputting a voltage signal;
   an absolute value circuit for outputting the absolute value of said voltage signal outputted from said second sample hold circuit; and;
   a comparator circuit for comparing said absolute value outputted from said absolute value circuit with a predetermined voltage corresponding to a high steering wheel operation speed and another predetermined voltage corresponding to a low steering wheel operation speed.

6. A rear wheel steer angle controlling apparatus according to claim 1, wherein said steering wheel displacement detecting means is constituted by a potentiometer having a linear resistor to which a voltage is applied and a slider for sliding linearly on said resistor in accordance with the operation of said steering wheel, while said judging means and said controlling means include:

an operation amplifier having a resistor connected between an output terminal and an inversion terminal thereof;

a coefficient device having an input terminal connected to the output terminal of said operation amplifier and an output terminal connected to said actuator mechanism;

a first resistor connected at one end thereof to said inversion terminal of said operation amplifier and at the other end thereof to the output terminal of said potentiometer;

a second resistor connected at one end thereof to the non-inversion terminal of said operation amplifier and at the other end thereof to the output terminal of said potentiometer; and a capacitor connected at one end thereof to the non-inversion terminal of said operation amplifier and grounded at the other end thereof.

7. A rear wheel steer angle controlling apparatus for automatically controlling the steer angle of rear wheels of a vehicle by controlling an actuator mechanism for generating the steer angle of rear wheels in response to an operation of a steering wheel for generating a steer angle of front wheels of said vehicle, said apparatus comprising:

a steering wheel displacement detecting means for detecting a steering wheel displacement and for generating a steering wheel displacement signal representing the steering wheel displacement;

a judging means for judging a rotation speed of said steering wheel from said steering wheel displacement signal;

a physical amount detecting means for detecting a physical amount related to a velocity of said vehicle and outputting a physical amount signal; and a controlling means for controlling said actuator mechanism in accordance with a result of judgement by said judging means and said physical amount signal such that:

(a) when said steering wheel is operated at a high rotation speed, a steer angle of the rear wheels is formed in the direction counter to a direction of steer angle of the front wheels such as to provide a small radius of turning circle of said vehicle when said physical amount is small and, when said physical amount is large, said steer angle of the rear wheels is determined such as to provide a greater radius of turning circle than that obtained when said physical amount is small; and (b) when said steering wheel is operated at a low rotation speed, a steer angle of the rear wheels is formed in the same direction as the steer angle of the front wheels.

8. A rear wheel steer angle controlling apparatus according to claim 7, wherein said controlling means controls said actuator mechanism in accordance with the result of judgement by said judging means and said physical amount signal such that:

(a) when said steering wheel is operated at a high rotation speed and said physical amount is below a predetermined value, a steer angle of the rear wheels is generated in the direction counter to the direction of the steer angle of the front wheels;

(b) when said steering wheel is operated at a low rotation speed and said physical value is below said predetermined value, a steer angle of the rear wheels is formed in the same direction as the steer angle of the front wheels; and (c) when said physical amount exceeds said predetermined value, a steer angle of the rear wheels is generated in the same direction as the steer angle of the front wheels regardless of the rotation speed of said steering wheel.

9. A rear wheel steer angle controlling apparatus according to claim 7, wherein said controlling means controls said actuator mechanism in accordance with the result of judgement by said judging means and said physical amount signal such that:

(a) when said steering wheel is operated at a high rotation speed and said physical amount is below a predetermined value, a steer angle of the rear wheels is generated in the direction counter to a direction of steer angle of the front wheels;

(b) when said steering wheel is operated at a low rotation speed and said physical value is below said predetermined value, a steer angle of the rear wheels is formed in the same direction as the steer angle of the front wheels; and (c) when said physical amount exceeds said predetermined value, no steer angle of the rear wheels is generated regardless of the rotation speed of said steering wheel.

10. A rear wheel steer angle controlling apparatus according to claim 7, wherein said controlling means controls said actuator mechanism in accordance with the result of judgement by said judging means and said physical amount signal such that:

(a) when said steering wheel is operated at a high rotation speed a steer angle of the rear wheels which becomes smaller as said physical value is increased is generated in the direction counter to a direction of steer angle of the front wheels; and (b) when said steering wheel is operated at a low rotation speed a steer angle of the rear wheels which becomes smaller as said physical amount is increased is formed in the same direction as the steer angle of the front wheels.

11. A rear wheel steer angle controlling apparatus according to claim 7, wherein said controlling means controls said actuator mechanism in accordance with the result of judgement by said judging means and said physical amount signal such that:

(a) when said steering wheel is operated at a high rotation speed and said physical amount is below a predetermined value, a steer angle of the rear wheels which becomes smaller as said physical amount is increased is generated in the direction counter to a direction of steer angle of front wheels;

(b) when said steering wheel is operated at a high rotation speed and said physical value exceeds said predetermined value, a steer angle of the rear wheels which becomes greater as said physical amount is increased is formed in the same direction as the steer angle of the front wheels; and (c) when said steering wheel is operated at a low rotation speed, a steer angle of the rear wheels which becomes greater as said physical amount is increased is formed in the same direction as the steer angle of the front wheels.

12. A rear wheel steer angle controlling apparatus according to claim 7, wherein said controlling means controls said actuator mechanism in accordance with the result of judgement by said judging means and said physical amount signal to generate to steer angle δr of the rear wheels which meets the following conditions:

On condition of $V \leq Vc$ $\delta r = f(\delta h)$

On condition of $V > Vc$ $\delta r = K_1 \delta h$ where,
- V: vehicle running velocity
- Vc: predetermined value of vehicle running velocity
- δh: steering wheel angle
- f(δh): steer angle proportional to the steering wheel angle and set in the direction counter to a direction of steer angle of the front wheels when the steering wheel is operated at a high rotation speed and in the same direction as the steer angle of the front wheels when the steering wheel is operated at a low rotation speed
- $K_1$: small positive constant.

13. A rear wheel steer angle controlling apparatus according to claim 7, wherein said physical amount related to vehicle running velocity is one selected from the group consisting of the vehicle running velocity, yaw rate, lateral acceleration of vehicle, product of yaw rate and vehicle running velocity and product of the vehicle running velocity and the lateral acceleration.

14. A rear wheel steer angle controlling apparatus according to claim 7, wherein said controlling means controls said actuator mechanism in accordance with the result of judgement by said judging means and said physical amount signal to generate a steer angle δr of the rear wheels which meets the following conditions:

On condition of $|f(d)| > f(d)c$ $\delta r = f(\delta h)$

On condition of $|f(d)| > f(d)c$ $\delta r = K_1 \delta h$ where
- f(d): physical amount related to lateral displacement of the vehicle, representing one of a yaw rate, lateral accelration, product of the yaw rate and vehicle running velocity and product of the lateral acceleration and the vehicle running velocity
- $f(d)_c$: predetermined value of physical amount related to the lateral displacement corresponding to predetermined value Vc of the vehicle running velocity
- δh: steering wheel angle
- F(δh): steer angle proportional to the steering wheel angle and set in the direction counter to a direction of steer angle of the front wheels when the steering wheel is operated at a high rotation speed and in the same direction as the steer angle of the front wheels when the steering wheel is operated at a low rotation speed
- $K_1$: small positive constant.

15. A rear wheel steer angle controlling apparatus according to claim 7, wherein said controlling means controls said actuator mechanism in accordance with the result of judgement by said judging means and said physical amount signal to generate a steer angle δr of the rear wheels which meets the following conditions:

$$\delta r = f(\delta h)/(K_2 V + K_3)$$

where
- V: vehicle running velocity
- δh: steering wheel angle
- f(δh); steer angle proportional to the steering wheel angle and set in the direction counter to a direction of steer angle of the front wheels when the steering wheel is operated at a high rotation speed and in the same direction as the steer angle of the front wheels when the steering wheel is operated at a low rotation speed
- $K_2$: positive constant for attaining coincidence of dimension
- $K_3$: constant for preventing the denominator from becoming zero.

16. A rear wheel steer angle controlling apparatus according to claim 7, wherein said controlling means controls said actuator mechanism in accordance with the result of judgement by said judging means and said physical amount signal to generate a steer angle δr of the rear wheels which meets the following conditions:

$$\delta r = f(\delta h) \cdot K_4 \cdot (Vmax - V)$$

where,
- V: vehicle running velocity
- δh: steering wheel angle
- f(δh): steer angle proportional to the steering wheel angle and set in the direction counter to a direction of steer angle of the front wheels when the steering wheel is operated at a high rotation speed and in the same direction as the steer angle of the front wheels when the steering wheel is operated at a low rotation speed
- Vmas: maximum vehicle running velocity
- $K_4$: small positive constant.

17. A rear wheel steer angle controlling apparatus according to claim 7, wherein said controlling means controls said actuator mechanism in accordance with the result of judgement by said judging means and said physical amount signal to generate a steer angle δr of the rear wheels which meets the following condition:

$$\delta r = f(\delta h)/(K_2 |f(d)| + K_3)$$

where
- δh: steering wheel angle
- f(δh): steer angle proportional to the steering wheel angle and set in the direction counter to a direction of steer angle of the front wheels when the steering wheel is operated at a high rotation speed and in the same direction as the steer angle of the front wheels when the steering wheel is operated at a low rotation speed
- f(d); physical amount related to lateral displacement of the vehicle, representing one of a yaw rate, lateral acceleration, product of the yaw rate and vehicle running velocity and product of the lateral acceleration and thevehicle running velocity
- $K_2$: positive constant for attaining coincidence of demension
- $K_3$: constant for preventing the denominator from becoming zero.

18. A rear wheel steer angle controlling apparatus according to claim 7, wherein said controlling means controls said actuator mechanism in accordance with the result of judgement by said judging means and said physical amount signal to generate a steer angle δr of the rear wheels which meets the following condition:

$$\delta r = f(\delta h) \cdot K_4 \cdot (|f(d)max| - |f(d)|)$$

where
- δh: steering wheel angle f(δh): steer angle proportional to the steering wheel angle and set in the direction counter to a direction of steer angle of the front wheels when the steering wheel is operated at a high rotation speed and in the same direction as the steer angle of the front wheels when the steering wheel is operated at a low rotation speed f(d): physical amount related to lateral displacement of the vehicle, representing one of a yaw rate, lateral acceleration, product of the yaw rate and vehicle running velocity and product of the lateral acceleration and the vehicle running velocity f(d) max: maximum value of physical amount related to the lateral displacement of vehicle corresponding to maximum vehicle running velocity $K_4$: small positive constant.

19. A rear wheel steer angle controlling apparatus according to claim 7, wherein said controlling means controls said actuator mechanism in accordance with the result of judgement by said judging means and said physical amount signal to generate a steer angle δr of the rear wheels which meets the following condition:

$$\delta r = f(\delta h) + K_5 \cdot V \cdot \delta h$$

where,

V: vehicle running velocity

δh: steering wheel angle f(δh): steer angle proportional to the steering wheel angle and set in the direction counter to a direction of steer angle of the front wheels when the steering wheel is operated at a high rotation speed and in the same direction as the steer angle of the front wheels when the steering wheel is operated at a low rotation speed $K_5$: small positive constant.

20. A rear wheel steer angle controlling apparatus according to claim 7, wherein said controlling means controls said actuator mechanism in accordance with the resuslt of judgement by said judging means and said physical amount signal to generate a steer angle r of the rear wheels which meets the following condition:

$$\delta r = f(\delta h) + K_5 \cdot |f(d)| \cdot \delta h$$

where

δh: steering wheel angle f(δh): steer angle proportional to the steering wheel angle and set in the direction counter to a direction of steer angle of the front wheels when the steering wheel is operated at a high rotation speed and in the same direction as the steer angle of the front wheels when the steering wheel is operated at a low rotation speed f(d): physical amount related to lateral displacement of the vehicle, representing one of a yaw rate, lateral acceleration, product of the yaw rate and vehicle running velocity and product of the lateral acceleration and the vehiclee runing velocity $K_5$: small positive constant.

21. A rear wheel steer angle controlling apparatus for automatically controlling a steer angle of rear wheels of a vehicle by controlling an actuator mechanism for generating the steer angle of the rear wheels in response to an operation of a steering wheel for generating a steer angle of front wheels of said vehicle, said apparatus comprising:

a steering wheel displacement detecting means for detecting a steering wheel displacement and for generating a steering wheel displacement signal representing the steering wheel displacement;

a judging means for judging a rotation speed of said steering wheel from said steering wheel displacement signal;

a physical amount detecting means for detecting a physical amount related to a lateral displacement of said vehicle and outputting a physical amount signal; and a controlling means for controlling said actuator mechanism in accordance with a result of judgement by said judging means and said physical amount signal, such that a steer angle of rear wheels is genrated as the sum of:

(a) a first angle proportional to said steering wheel displacement and set in the direction counter to a direction of steer angle of the front wheels when said steering wheel is operated at a high rotation speed and in the same direction as the steer angle of the front wheels when said steering wheel is operated at a low rotation speed; and (b) a second angle proportional to said physical amount and set in the same direction as generation of said physical amount.

22. A rear wheel steer angle controlling apparatus according to claim 21, wherein said physical amount related to the lateral displacement of the vehicle is one selected from the group consisting of yaw rate, later acceleration of vehicle, product of the yaw rate and vehicle running velocity and product of the vehicle running velocity and the lateral acceleration.

23. A rear wheel steer angle controlling apparatus according to claim 22, wherein said controlling means controls said actuator mechanism in accordance with the result of judgement by said judging means, said steering wheel displacement signal and said physical amount signal to generate a steer angle δr of the rear wheels which meets the following condition;

$$\delta r = f(\delta h) + K_6 \cdot r$$

where, r: yaw rate

F(δh): steer angle proportional to the steering wheel displacement and set in the direction counter to a direction of steer angle of the front wheels when the steering wheel is operated at a high rotation speed and in the same direction as the direction of steer angle of the front wheels when the steering wheel is operated at a low rotation speed.

$K_6$: small constant.

24. A rear wheel steer angle controlling apparatus according to claim 22, wherein said controlling means controls said actuator mechanism in accordance with the result of judgement by said judging means, said steering wheel displacement signal and said physical amount signal to generate a steer angle δr of the rear wheels which meets the following condition:

$$\delta r = f(\delta h) + K_7 \cdot V \cdot r$$

where,

V: vehicle running velocity r: yaw rate f(δh): steer angle proportional to the steering wheel displacement and set in the direction counter to a direction of steer angle of the front wheels when the steering wheel is operated at a high rotation speed and in the same direction as the direction of steer angle of the front wheels when the steering wheel is operated at a low rotation speed $K_7$: small constant.

25. A rear wheel steer angle controlling apparatus according to claim 22, wherein said controlling means controls said actuator mechanism in accordance with the result of jdugement by said judging means, said steering wheel displacement signal and said physical amount signal to generate a steer angle δr of the rear wheels which meets the following conditions:

On condition of $V \leq Vc$  $\delta r = f(\delta h) + K_6 \cdot r$

On condition of $V > VC$  $\delta r = K_1 \cdot \delta h$ where,
V: vehicle running velocity
Vc: predetermined value of vehicle running velocity
r: yaw rate
Sh: steering wheel angle
f(δh): steer angle proportional to the steering wheel displacement and set in the direction counter to a direction of steer angle of the front wheels when the steering wheel is operated at a high rotation speed and in the same direction as the direction of steer angle of the front wheels when the steering wheel is operated at a low rotation speed $K_1, K_6$: small constants.

26. A rear wheel steer angle controlling apparatus according to claim 22, wherein said controlling means controls said actuator mechanism in accordance with the result of judgement by said judging means, said steering wheel displacement signal and said physical amount signal to generate a steer angle δr of the rear wheels which meets the following condition:

$\delta r = f(\delta h)/(K_1 \cdot V + K_3) + K_8 \cdot r$ where,
V: vehicle running velocity
r: yaw rate
f(δh): steer angle proportional to the steering wheel displacement and set in the direction counter to a direction of steer angle of the front wheels when the steering wheel is operated at a high rotation speed and in the same direction as the direction of steer angle of the front wheels when the steering wheel is operated at alow rotation speed $K_1, K_8$: small constants
$K_3$: constant used for preventing denominator from becoming zero.

27. A rear wheel steer angle controlling apparatus according to claim 22, wherein said controlling means controls said actuator mechanism in accordance with the result of judgement by said judging means, said steering wheel displacement signal and said physical amount signal to generate a steer angle δr of the rear wheels which meets the following condition:

$\delta r = f(\delta h)/(K_1 \cdot V + K_3) + K_9 \cdot V \cdot V$ where,
V: vehicle running velocity
r: yaw rate
f(δh): steer angle proportional to the steering wheel displacement and set in the direction counter to a direction of steer angle of the front wheels when the steering wheel is operated at a high rotation speed and in the same direction as the direction of steer angle of the front wheels when the steering wheel is operated at a low rotation speed $K_1, K_9$: small constants
$K_3$: constant used for preventing denominator from becoming zero.

28. A rear wheel steer angle controlling apparatus according to claim 22, wherein said controlling means controls said actuator mechanism in accordance with the result of judgement by said judging means, said steering wheel displacement signal and said physical amount signal to generate a steer angle δr of the rear wheels which meets the folloing condition:

$\delta r = f(\delta h) \cdot K_4 \cdot (Vmax - V) + K_{10} \cdot r$ where
V: vehicle running velocity
Vmax: maximum vehicle running velocity
r: yaw rate
f(δh): steer angle proportional to the steering wheel displacement and set in the direction counter to a direction of steer angle of the front wheels when the steering wheel is operated a high rotation speed and in the same direction as the direction of steer angle of the front wheels when the steering wheel is operated at a low rotation speed $K_4, K_{10}$: small constant.

29. A rear wheel steer angle controlling apparatus according to claim 22, wherein said controlling means controls said actuator mechanism in accordance with the result of judgement by said judging means, said steering wheel displacement signal and said physical amount signal to generate a steer angle r of the rear wheels which meets the following condition:

$\delta r = f(\delta h) \cdot K_4 \cdot (Vmax - V) + K_{11} \cdot V \cdot r$ where,
V: vehicle running velocity
Vmax: maximum vehicle running velocity
r: yaw rate
f(δh): steer angle proportional to the steering wheel displacement and set in the direction counter to a direction of steer angle of the front wheels when the steering wheel is operated at a high rotation speed and in the same direction as the direction of steer angle of the front wheels when the steering wheel is operated at a low rotation speed $K_4, K_{11}$: small constants.

30. A rear wheel steer angle controlling apparatus according to claim 22, wherein said controlling means controls said actuator mechanism in accordance with the result of judgement by said judging means, said steering wheel displacement signal and said physical amount signal to generate a steer angle δr of the rear wheels which meets the following conditions:

On condition of $\delta r \leq \delta rc$  $\delta r = f(\delta h) + K_7 \cdot V \cdot r$ On condition of $\delta r > \delta rc$  $\delta r = \delta rc$ where,
V: vehicle running velocity
r: yaw rate
f(δh): steer angle proportional to the steering wheel displacement and set in the direction counter to a direction of steer angle of the front wheels when the steering wheel is operated at a high rotation speed and in the same direction as the direction of steer angle of the front wheels when the steering wheel is operated at a low rotation speed rc: predetermined steer angle of the rear wheels $K_7$: a small constant.

31. A rear wheel steer angel controlling apparatus for automatically controlling a steer angle of rear wheels of a vehicle by controlling an actuator mechanism for generating the steer angle of the rear wheels in response to an operation of a steering wheel for generating a steer angle of front wheels of said vehicle, said apparatus comprising:

a steering wheel displacement detecting means for detecting a steering wheel displacement and for generating a steering wheel displacement signal representing the steering wheel displacement;

a judging means for judging a rotation speed of said steering wheel from said steering wheel displacement signal;

a physical amount detecting means for detecting a physical amount related to a lateral displacement of said vehicle and outputting a physical amount signal;

a steer angle detecting means for detecting the steer angle of the rear wheels and outputting a steer angle signal; and a controlling means for controlling said actuator mechanism in accordance with the result of judgement by said judging means, said physical amount signal and said steer angle signal, such that a steer angle of the rear wheels is generated as the sum of:

(a) a first angle proportional to said steering wheel dislacement and set in the direction counter to a direction of steer angle of the front wheels when said steering wheel is operated at a high rotation speed and in the same direction as the steer angle of the front wheels when said steering wheel is operated at a low rotation speed; and (b) a second angle proportional to said physical amount and set in the same direction as generation of said physical amount.

32. A rear wheel steer angle controlling apparatus according to claim 31, wherein said controlling means controls said actuator mechanism such that no steer angle of the rear wheels is formed when the level of said steering wheel displacement signal is below a predetermined level.

33. A rear wheel steer angle controlling apparatus according to claim 31, wherein said sum $\delta r$ of said first and second angles is given by the following formula:

$$\delta r = \left( Kd - \frac{Ke}{1+TS} \cdot T \cdot S \right) \cdot N \cdot \delta f + Kr \cdot V \cdot r$$

where,

Kd, Ke: constants which meet the condition of $0 < Kd < Ke$

S: complex frequency

T: time constant of primary delay

N: steering gear ratio $\delta f$: steer angle of front wheels

Kn: proportional constant

V: vehicle running speed r: yaw rate.

34. A rear wheel steer angle controlling apparatus according to claim 31, wherein said physical amount detecting means includes a velocity detector for detecting the vehicle running velocity and outputting a vehicle running velocity signal, a yaw rate detector for detecting the yaw rate and outputting a yaw rate signal, and a multiplier circuit for multiplying said vehicle running velocity signal and said yaw rate signal with each other, said judging means includes a phase shifting circuit for outputting a signal which has a phase delay with respect to said steering wheel displacement signal, said phase delay being increased within the range of ° to 180° as the angular frequency of said steering wheel displacement signal is increased, and said controlling means includes an adder circuit for adding the output from said multiplier circuit and the output of said phase shifting circuit to each other.

35. A rear wheel steer angle controlling apparatus according to claim 34, wherein said controlling means further includes a dead zone circuit which does not produce output when the output of said phase shifting circuit falls within a predetermined range around 0 (zero) and produces an output corresponding to the output of said phase shifting circuit when said output of said shifting circuit falls out of said predetermined range.

* * * * *